(12) United States Patent
Ishii et al.

(10) Patent No.: US 10,833,994 B2
(45) Date of Patent: *Nov. 10, 2020

(54) ENHANCED LOCAL ACCESS IN MOBILE COMMUNICATIONS

(75) Inventors: Hiroyuki Ishii, Palo Alto, CA (US); Sean A. Ramprashad, Palo Alto, CA (US); Sayandev Mukherjee, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/118,473

(22) PCT Filed: May 31, 2012

(86) PCT No.: PCT/US2012/040279
§ 371 (c)(1),
(2), (4) Date: Feb. 6, 2014

(87) PCT Pub. No.: WO2012/166969
PCT Pub. Date: Dec. 6, 2012

(65) Prior Publication Data
US 2014/0153390 A1 Jun. 5, 2014

Related U.S. Application Data

(60) Provisional application No. 61/533,382, filed on Sep. 12, 2011, provisional application No. 61/512,132, (Continued)

(51) Int. Cl.
*H04L 12/801* (2013.01)
*H04W 52/24* (2009.01)
(Continued)

(52) U.S. Cl.
CPC ......... *H04L 47/12* (2013.01); *H04W 28/0289* (2013.01); *H04W 28/08* (2013.01);
(Continued)

(58) Field of Classification Search
CPC .... H04L 47/12; H04L 47/10; H04W 28/0289; H04W 28/02; H04W 76/023; H04W 76/02
(Continued)

(56) References Cited

U.S. PATENT DOCUMENTS 6,829,479 B1    12/2004   Chang et al.
8,493,887 B2 *   7/2013   Palanki ............... H04W 76/023
                                                      370/254
(Continued)

FOREIGN PATENT DOCUMENTS

CN    102067715 A    5/2011
EP     2192700 A1    6/2010
(Continued)

OTHER PUBLICATIONS

Extended European Search Report in counterpart European Application No. 12 79 451 dated Apr. 22, 2015 (9 pages).
(Continued)

*Primary Examiner* — Kwang B Yao
*Assistant Examiner* — Syed M Bokhari
(74) *Attorney, Agent, or Firm* — Osha Liang LLP

(57) ABSTRACT

A hybrid user equipment and advanced user equipment data offloading architecture is provided. In this hybrid architecture, the advanced user equipment includes a backhaul link to a telecommunication network and/or the Internet. The user equipment can send and receive data through the advanced user equipment using the backhaul link.

9 Claims, 57 Drawing Sheets

Related U.S. Application Data filed on Jul. 27, 2011, provisional application No. 61/505,955, filed on Jul. 8, 2011, provisional application No. 61/503,975, filed on Jul. 1, 2011, provisional application No. 61/502,023, filed on Jun. 28, 2011, provisional application No. 61/500,426, filed on Jun. 23, 2011, provisional application No. 61/492,321, filed on Jun. 1, 2011.

(51) Int. Cl.
*H04W 52/38* (2009.01)
*H04W 28/08* (2009.01)
*H04W 76/14* (2018.01)
*H04W 76/15* (2018.01)
*H04W 36/00* (2009.01)
*H04W 28/02* (2009.01)

(52) U.S. Cl.
CPC ..... *H04W 36/0069* (2018.08); *H04W 52/242* (2013.01); *H04W 52/383* (2013.01); *H04W 76/14* (2018.02); *H04W 76/15* (2018.02)

(58) Field of Classification Search
USPC ....... 370/336, 254, 230, 252, 235, 332, 329; 455/438, 414.1, 450
See application file for complete search history.

(56) References Cited

U.S. PATENT DOCUMENTS

| | | | |
|---|---|---|---|
| 2001/0031621 A1* | 10/2001 | Schmutz | H04B 7/155 455/7 |
| 2002/0089949 A1 | 7/2002 | Bjelland et al. | |
| 2006/0172742 A1 | 8/2006 | Chou et al. | |
| 2007/0097938 A1 | 5/2007 | Nylander et al. | |
| 2007/0109962 A1 | 5/2007 | Leng et al. | |
| 2008/0008093 A1* | 1/2008 | Wang | H04L 47/24 370/235 |
| 2008/0013558 A1 | 1/2008 | Ito et al. | |
| 2008/0076425 A1 | 3/2008 | Khetawat et al. | |
| 2009/0011784 A1 | 1/2009 | Kang et al. | |
| 2009/0059790 A1 | 3/2009 | Calvert et al. | |
| 2009/0232019 A1 | 9/2009 | Gupta et al. | |
| 2009/0232113 A1 | 9/2009 | Tamaki | |
| 2009/0285166 A1 | 11/2009 | Huber et al. | |
| 2009/0305699 A1 | 12/2009 | Deshpande et al. | |
| 2009/0310554 A1 | 12/2009 | Sun et al. | |
| 2009/0310561 A1 | 12/2009 | Grob et al. | |
| 2010/0027510 A1 | 2/2010 | Balasubramanian et al. | |
| 2010/0054237 A1 | 3/2010 | Han et al. | |
| 2010/0056160 A1 | 3/2010 | Kim et al. | |
| 2010/0128697 A1* | 5/2010 | Choi-Grogan | H04W 36/0044 370/332 |
| 2010/0135251 A1 | 6/2010 | Sambhwani et al. | |
| 2010/0137016 A1 | 6/2010 | Voyer | |
| 2010/0149347 A1 | 6/2010 | Kim et al. | |
| 2010/0195562 A1 | 8/2010 | Ishizu et al. | |
| 2010/0197298 A1 | 8/2010 | So et al. | |
| 2010/0197309 A1 | 8/2010 | Fang et al. | |
| 2010/0234023 A1 | 9/2010 | Bae et al. | |
| 2010/0265867 A1 | 10/2010 | Becker et al. | |
| 2010/0322146 A1 | 12/2010 | Liu et al. | |
| 2010/0323745 A1 | 12/2010 | Chen et al. | |
| 2011/0003597 A1* | 1/2011 | Budic | H04W 52/143 455/450 |
| 2011/0019634 A1 | 1/2011 | Fujii et al. | |
| 2011/0044244 A1 | 2/2011 | Etemad | |
| 2011/0075557 A1 | 3/2011 | Chowdhury et al. | |
| 2011/0075675 A1 | 3/2011 | Koodli et al. | |
| 2011/0076985 A1 | 3/2011 | Chami et al. | |
| 2011/0103337 A1 | 5/2011 | Bryant et al. | |
| 2011/0158171 A1 | 6/2011 | Centonza et al. | |
| 2011/0170517 A1 | 7/2011 | Bakker et al. | |
| 2011/0171949 A1 | 7/2011 | Liao et al. | |
| 2011/0188481 A1* | 8/2011 | Damnjanovic | H04W 72/04 370/336 |
| 2011/0237231 A1* | 9/2011 | Horneman | H04W 76/048 455/414.1 |
| 2011/0250892 A1 | 10/2011 | Gupta et al. | |
| 2011/0255425 A1* | 10/2011 | Pikkarainen | H04W 48/08 370/252 |
| 2011/0268007 A1 | 11/2011 | Barany et al. | |
| 2012/0015660 A1* | 1/2012 | Kawaguchi | H04W 36/0061 455/438 |
| 2012/0044870 A1 | 2/2012 | Mochizuki et al. | |
| 2012/0094682 A1 | 4/2012 | Ode et al. | |
| 2012/0135771 A1 | 5/2012 | Futaki | |
| 2012/0140714 A1* | 6/2012 | Koskela | H04W 56/00 370/329 |
| 2012/0183141 A1 | 7/2012 | Hapsari et al. | |
| 2012/0207105 A1 | 8/2012 | Geirhofer et al. | |
| 2012/0236977 A1 | 9/2012 | Zou et al. | |
| 2012/0282864 A1 | 11/2012 | Dimou et al. | |
| 2012/0309394 A1 | 12/2012 | Radulescu et al. | |
| 2013/0188604 A1 | 7/2013 | Chin et al. | |
| 2014/0079026 A1 | 3/2014 | Dimou et al. | |
| 2014/0161055 A1 | 6/2014 | Chitrapu et al. | |

FOREIGN PATENT DOCUMENTS

| | | |
|---|---|---|
| JP | 8-307934 A | 11/1996 |
| JP | 2006-094388 A | 4/2006 |
| JP | 2007-096862 A | 4/2007 |
| JP | 2007-143137 A | 6/2007 |
| JP | 2008-022089 A | 1/2008 |
| JP | 2009-017547 A | 1/2009 |
| JP | 2009-218638 A | 9/2009 |
| JP | 2009225137 A | 10/2009 |
| JP | 2010-501140 A | 1/2010 |
| JP | 2010-183376 A | 8/2010 |
| JP | 201115317 A | 1/2011 |
| JP | 2011041158 A | 2/2011 |
| JP | 2011-523329 A | 8/2011 |
| WO | 2008/042192 A1 | 4/2008 |
| WO | 2009-151871 A2 | 12/2009 |
| WO | 2010002100 A2 | 1/2010 |
| WO | 2010/013150 A2 | 2/2010 |
| WO | 2010/027308 A1 | 3/2010 |
| WO | 2010-060839 A1 | 6/2010 |
| WO | 2010/110240 A1 | 9/2010 |
| WO | 2010125738 A1 | 11/2010 |
| WO | 2011-007388 A1 | 1/2011 |
| WO | 2011016560 A1 | 2/2011 |
| WO | 2011/034966 A1 | 3/2011 |
| WO | 2011/041623 A1 | 4/2011 |
| WO | 2011056607 A1 | 5/2011 |
| WO | 2012/134567 A1 | 10/2012 |
| WO | 2012/166975 A1 | 12/2012 |
| WO | 2013/055430 A2 | 4/2013 |

OTHER PUBLICATIONS

3GPP TR 23.829 V10.0.0; 3rd Generation Partnership Project; Technical Specification Group Services and System Aspects; Local IP Access and Selected IP Traffic Offload (LIPA-SIPTO) (Release 10); Mar. 2011 (43 pages).

International Search Report for corresponding International Application No. PCT/US2012/04279, dated Aug. 27, 2012 (2 pages).

Written Opinion for corresponding International Application No. PCT/US2012/04279, dated Aug. 27, 2012 (12 pages).

3GPP TSG-RAN WG4 Meeting #58, R4-111298, Taipei, Taiwan, Feb. 21-25, 2011, "Handling of 3.4-3.6 GHz FDD Duplex GAP," 4 pages.

International Search Report issued in corresponding International Application No. PCT/US2012/054856, dated Feb. 11, 2013 (4 pages).

Written Opinion issued in corresponding International Application No. PCT/US2012/054856, dated Feb. 11, 2013 (8 pages).

Extended European Search Report issued in corresponding EP Application No. 12831801.1, dated Jun. 17, 2015 (8 pages).

(56) References Cited

OTHER PUBLICATIONS

International Search Report issued in corresponding International Application No. PCT/US2012/054912, dated Jan. 11, 2013 (3 pages).
Written Opinion issued in corresponding International Application No. PCT/US2012/054912, dated Jan. 11, 2013 (11 pages).
Extended European Search Report issued in corresponding EP Applicaiton No. 12831966.2, dated Jun. 15, 2015 (9 pages).
International Search Report for corresponding International Application No. PCT/US2012/040288, dated Sep. 7, 2012 (2 pages).
Written Opinion for corresponding International Application No. PCT/US2012/040288, dated Sep. 7, 2012 (6 pages).
Extended European Search Report in corresponding European Application No. 12 79 2917 dated Apr. 29, 2015 (9 pages).
LG Electronics Inc.; "Measurement Restriction for Macro-Pico Scenario"; 3GPP TSG-RAN2 Meeting #72, R2-106579; Jacksonville, Florida; Nov. 5-19, 2010 (3 pages).
3GPP TS 36.331 V10.1.0, Mar. 2011, "Protocol specification," (290 pages).
3GPP TS 36.101 V10.2.0, Mar. 2011, "User Equipment (UE) radio transmission and reception," (225 pages).
3GPP TS 36.211 V10.1.0, Mar. 2011, "Physical Channels and Modulation," (103 pages).
3GPP TS 36.213 V11.1.0, Dec. 2012, "Physical layer procedures," (160 pages).
Extended European Seach Report in counterpart European Application No. 12 83 1966.2 dated Oct. 12, 2015 (24 pages).
3GPP TS 25.331 v10.4.0; "3rd Generation Partnership Project; Technical Specification Group Radio Access Network; Radio Resource Control (RRC); Protocol specification (Release 10)"; Jun. 2011 (1879 pages).
Office Action in counterpart Japanese Patent Application No. 2014-513711 dated Mar. 8, 2016 (3 pages).
Final Office Action issued in corresponding U.S. Appl. No. 14/344,492, dated Jan. 22, 2016 (25 pages).
Office Action in counterpart Chinese Patent Application No. 201280038270.0 dated May 19, 2016 (36 pages).
Office Action dated Apr. 13, 2017, in corresponding European Patent Application No. 12794051.8 (5 pages).
First Office Action issued in corresponding Chinese Application No. 201280038695.1, dated Nov. 18, 2016 (37 pages).
Notification of Reasons for Refusal issued in corresponding Japanese Application No. 2014-530752, dated Aug. 9, 2016 (9 pages).
Office Action in counterpart Japanese Patent Application No. 2014-513714 dated Apr. 19, 2016 (18 pages).
Office Action dated Apr. 18, 2017, in corresponding European Patent Application No. 12792917.2 (5 pages).
Third Office Action issued in corresponding Chinese Patent Application No. 201280038270.0, dated Jun. 9, 2017 (30 pages).
Office Action issued in the counterpart Japanese Patent Application No. 2016-223978, dated Aug. 15, 2017 (9 pages).
Notification of Reasons for Rejection issued in corresponding Japanese Patent Application No. 2016-223978, dated Nov. 7, 2017 (5 pages).
HTC Corporation; "Relay Node Access Link with different Carriers"; 3GPP TSG-RAN WGI #59 RI-094452; Jeju, Korea, Nov. 9-13, 2009 (3 pages).
CATT; "Improvement of Handover Procedure for Architecture Alt2"; 3GPP TSG RAN WG3#65bis R3-092247; Miyazaki, Japan, Oct. 12-15, 2009 (4 pages).
Office Action issued in corresponding Korean Application No. 10-2014-7000037, dated Mar. 20, 2018 (49 pages).
Extended European Search Report issued in the counterpart European Patent Application No. 18204318.2, dated Dec. 17, 2018 (10 pages).
Mitsubishi Electric; "CoMP in heterogeneous network deployment"; 3GPP TSG RAN WG3 Meeting #65Bis R3-092539; Miyazaki, Japan, Oct. 12-16, 2009 (3 pages).

\* cited by examiner

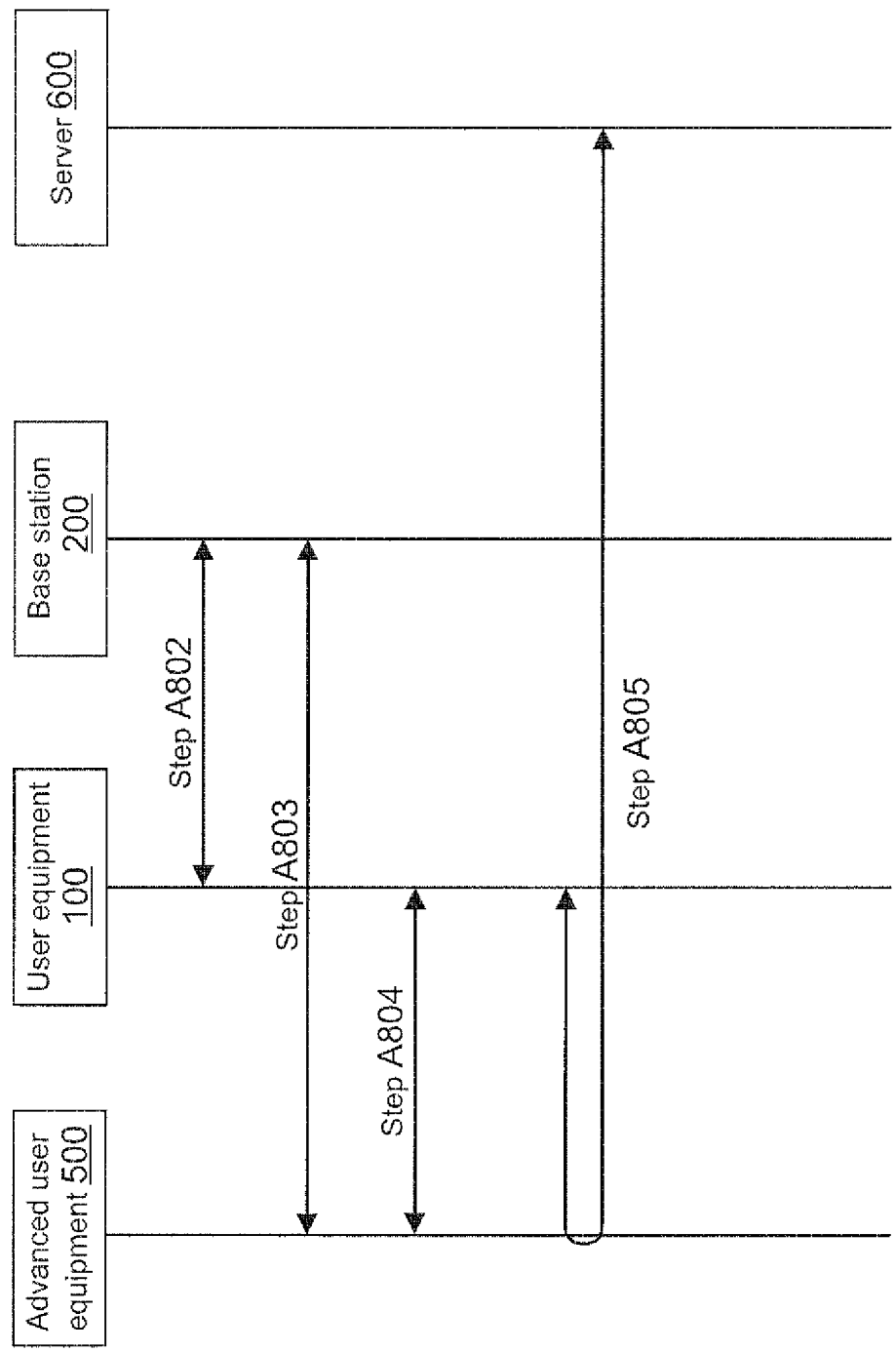

| Index | Modulation scheme | Coding rate | Target SIR | Number of MIMO layers | Number of Resource blocks | Path loss |
|---|---|---|---|---|---|---|
| #0 | QPSK | 1/3 | 0 dB | 1 | 10 | ~ 100 dB |
| #1 | QPSK | 2/3 | 4 dB | 1 | 20 | 80 dB ~ 100 dB |
| #2 | 16QAM | 1/2 | 10 dB | 1 | 50 | 60 dB ~ 80 dB |
| #3 | 64QAM | 2/3 | 15 dB | 1 | 50 | 50 dB ~ 60 dB |
| #4 | 64QAM | 2/3 | 20 dB | 2 | 100 | ~ 50 dB |

FIG. 28

| Index | Measurement item | Note |
|---|---|---|
| #0 | Number of D2D connections | |
| #1 | Amount of ratio resource in D2D connections | |
| #2 | Data rate in D2D connections | |
| #3 | Success rate of D2D connection establishment | |
| #4 | Success rate of handover in D2D connections | |
| #5 | Success rate of connection re-establishment in D2D connections | |
| #6 | Number of Handover in D2D connections | |
| #7 | Number of ratio link failures | |
| #8 | Number of connection re-establishment | |

FIG. 32

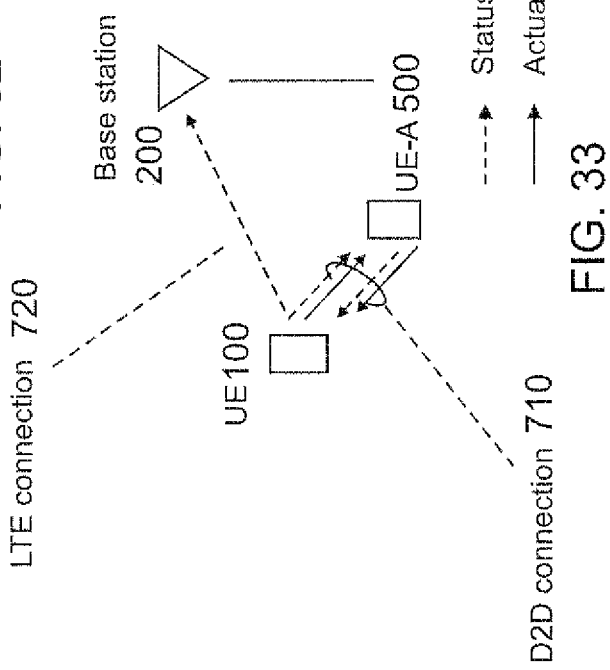

FIG. 33

| Index | Measurement item | Note |
|---|---|---|
| #A0 | Usage rate of CPU (Central processing unit) | |
| #A1 | Usage rate of memory | |
| #A2 | Usage rate of buffer | |
| #A3 | Usage rate of base band processing | |
| #A4 | Amount of radio resource in D2D connections | |
| #A5 | Usage rate of backhaul link | |
| #A6 | Data rate in D2D connections | |
| #A7 | Time duration for communications | Time duration in which there is traffic data to be transferred |
| #A8 | Time duration for no communications | Time duration in which there is no traffic data to be transferred |
| #A9 | Path loss for the D2D connections | |
| #A10 | Radio link quality for the D2D connections | Radio link quality corresponds to SINR or CQI for example. |
| #A11 | Block error rate for the D2D connections | |
| #A12 | Received signal power for the D2D connections | |
| #A13 | Transmitted signal power for the D2D connections | |
| #A14 | Interference power for the D2D connections | |
| #A15 | Location information | |
| #A16 | Number of user equipment for which data to be transmitted is present in transmission buffer | |
| #A17 | Number of user equipment whose data rate is lower than a threshold | |
| #A18 | Number of inactive user equipment | |

FIG. 34

| #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|
| DL | DL | DL | DL | UL | UL | UL | UL | DL | DL | DL | DL | UL | UL | UL | UL | DL | DL | DL | DL |

Sub-frame number in the D2D data transmission time duration #n

Information which indicates DL or UL for each sub-frame

FIG. 38

| #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|
| DL | DL | DL | DL | UL | UL | UL | UL | DL | DL | DL | DL | N/A | N/A | N/A | N/A | UL | UL | UL | UL |

Sub-frame number in the D2D data transmission time duration #n

Information which indicates DL or UL for each sub-frame

FIG. 38A

Pattern #0

| #0 | #1 | #2 | #3 | #4 | #5 | #6 | #7 | #8 | #9 | #10 | #11 | #12 | #13 | #14 | #15 | #16 | #17 | #18 | #19 |
|----|----|----|----|----|----|----|----|----|----|-----|-----|-----|-----|-----|-----|-----|-----|-----|-----|
| DL | DL | DL | DL | UL | UL | UL | UL | DL | DL | DL  | DL  | UL  | UL  | UL  | UL  | DL  | DL  | DL  | DL  |

Sub-frame number in the D2D data transmission time duration #n

Information which indicates DL or UL for each sub-frame

Pattern #1

| #0 | #1 | #2 | #3 | #4 | #5 | #6 | #7 | #8 | #9 | #10 | #11 | #12 | #13 | #14 | #15 | #16 | #17 | #18 | #19 |
|----|----|----|----|----|----|----|----|----|----|-----|-----|-----|-----|-----|-----|-----|-----|-----|-----|
| DL | DL | DL | DL | DL | DL | DL | DL | DL | DL | UL  | UL  | UL  | UL  | UL  | UL  | UL  | UL  | UL  | UL  |

Sub-frame number in the D2D data transmission time duration #n

Information which indicates DL or UL for each sub-frame

FIG. 39

| Transport format # | Modulation | Coding rate | Path loss |
|---|---|---|---|
| #0 | QPSK | 1/6 | 70 ~ |
| #1 | QPSK | 1/3 | 60 ~ 70 |
| #2 | QPSK | 2/3 | 50 ~ 60 |
| #3 | 16QAM | 1/2 | 40 ~ 50 |
| #4 | 16QAM | 2/3 | 30 ~ 40 |
| #5 | 64QAM | 3/4 | ~ 30 |

FIG. 40

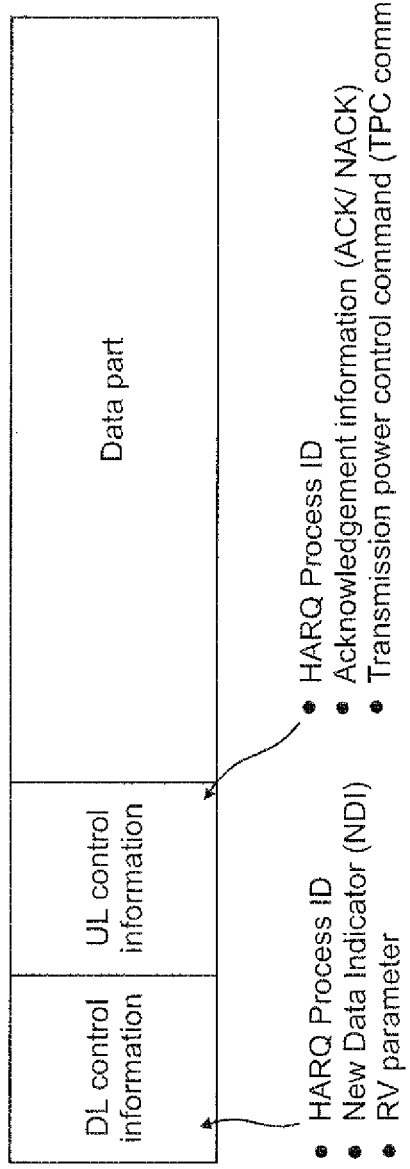
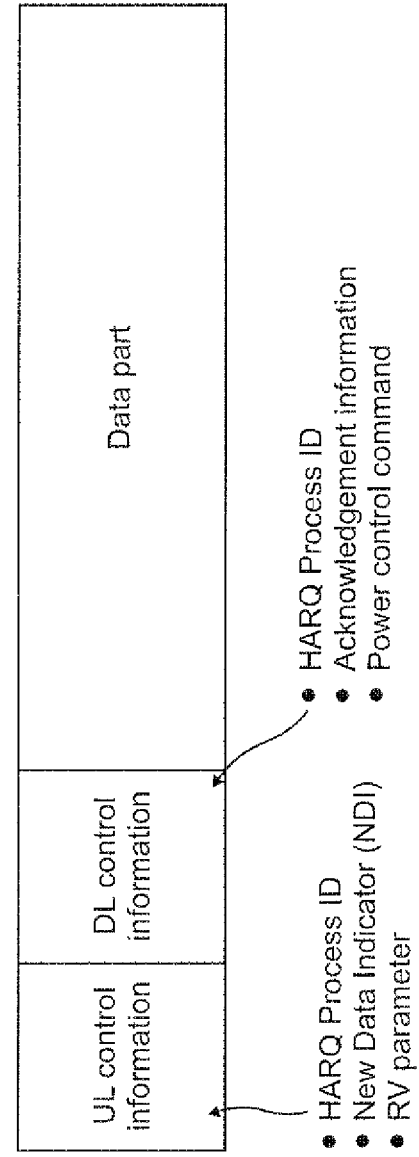
FIG. 42

|  | D2D DL transmission | | | | D2D UL transmission | | | | | | |
|---|---|---|---|---|---|---|---|---|---|---|---|
|  | DL control information | | | | UL control information | | | | DL control information | | |
|  | Process ID | NDI | RV parameters | | Process ID | ACK/NACK | TPC command | | Process ID | ACK/NACK | TPC command |
| #0 | 0 | 0 | 0 | | 0 | ACK | UP | | | | |
| #1 | 1 | 0 | 0 | | 1 | ACK | UP | | | | |
| #2 | 2 | 0 | 0 | | 2 | ACK | DOWN | | | | |
| #3 | 3 | 0 | 0 | | 3 | ACK | DOWN | | | | |
| #4 | | | | | 0 | | | 0 | 0 | ACK | UP |
| #5 | | | | | 1 | | | 0 | 1 | ACK | DOWN |
| #6 | | | | | 2 | | | 0 | 2 | NACK | UP |
| #7 | | | | | 3 | | | 0 | 3 | NACK | DOWN |
| #8 | 0 | 1 | 0 | | 0 | NACK | DOWN | | | | |
| #9 | 1 | 1 | 0 | | 1 | ACK | DOWN | | | | |
| #10 | 2 | 0 | 1 | | 2 | NACK | UP | | | | |
| #11 | 3 | 0 | 1 | | 3 | ACK | UP | | | | |
| #12 | | | | | | | | | | | |
| #13 | | | | | Sub-frame used neither for DL nor UL | | | | | | |
| #14 | | | | | | | | | | | |
| #15 | | | | | | | | | | | |
| #16 | | | | | 0 | | | 1 | 0 | ACK | UP |
| #17 | | | | | 1 | | | 0 | 1 | ACK | UP |
| #18 | | | | | 2 | | | 1 | 2 | ACK | DOWN |
| #19 | | | | | 3 | | | 0 | 3 | ACK | DOWN |

FIG. 43

Control information for D2D-PDCCH

| Frequency domain resource information | Time domain resource information | Transport format information |

FIG. 44

ENHANCED LOCAL ACCESS IN MOBILE COMMUNICATIONS

TECHNICAL FIELD

This application is directed to the operation of the Physical and Link Layer in mobile communication protocols.

BACKGROUND

One option to increase capacity in a wireless network is to increase the density (number of devices per unit area) of deployed base stations or remote antenna units. If the density of the deployed base stations or remote antenna units increases, cell capacity increases due to frequency reuse effects. However, there are some difficulties that come with increasing the deployment density, especially if such deployed units must be able to operate as conventional base stations on their own. These difficulties include:

1) If the cost of each deployed unit is high, the total system cost is quite high as the deployment density increases. Thus, the deployed unit cost should be relatively low to feasibly increase cell capacity.
2) As the deployment density increases, the number of handovers increases because the user equipment changes its serving unit (base station) quite frequently. As a result, quality of connectivity/mobility is expected to be degraded. Thus, the deployed unit for increasing cellular capacity should have high-quality interworking with the macro base station.
3) The conventional macro base stations transmit some required signals, such as pilot signals, synchronization signals, broadcast signals, paging signals, and so on, all of which have the potential to cause interference problems. Such interference limits the number of deployed base stations and thus lowers cellular capacity.
4) Furthermore, radio resources for the required conventional macro base station signals are typically static. Thus, dynamic and efficient interference coordination through dynamic allocation of the radio resources is difficult, which also limits the number of the deployed base stations and associated cellular capacity.
5) Network operators need to assign cell ID or other cell-specific parameter to each cell. For example, the root sequences for random access channels in LTE uplink (UL) are an example of such cell-specific parameters. Such cell planning for the cell ID, the root sequences and the like is cumbersome, which also limits the number of the deployed base stations and associated cellular density.
6) The required cell capacity is region-specific. For example, a significantly large capacity is required in urban areas whereas a relatively small enhancement of cell capacity may be sufficient in suburban or rural areas. To efficiently satisfy such divergent density needs, the deployed unit should be easily installed with low cost/complexity Various architectures have thus been proposed to increase wireless network capacity. For example, distributed base stations using the Remote Radio Head (RRH) technology communicate with a base station server using optical fiber. Because the base station server performs the baseband processing, each RRH distributed base station thus acts as a power amplifier with regard to its base station server. As the density of the RRH distributed base stations is increased, the baseband processing complexity is increased at the base station server. Thus, the number of RRH cells corresponding to each distributed RRH base stations is limited due to this RRH complexity.

Another alternative for increasing wireless network capacity involves the use of picocells or femtocells. Unlike the RRH approach, baseband processing is distributed across the pico/femtocells. But there is no high-quality interworking between picocells/femto cells and macrocell base stations. Thus, connectivity and mobility may not be sufficient because conventional intra-frequency or inter-frequency handover between picocells/femtocells and macrocell base stations is required. Furthermore, the picocells/femtocells are indeed base stations and thus they transmit the signals mentioned above such as pilot signals, synchronization signals, broadcast signals, paging signals, and so on. As a result, as the deployment density for pico/femtocells is increased, interference problems, difficulties in dynamic and efficient interference coordination, cell planning problems, and related issues cannot be solved.

Yet another alternative for increasing wireless network capacity is the use of conventional WiFi. But there is no interworking between WiFi nodes and macrocell base stations. Thus, connectivity and mobility is limited for a dual macrocell and WiFi user. Moreover, the use of WiFi in macrocell networks introduces the complications of multiple IP addresses being assigned to a single user.

Accordingly, there is a need in the art for improved architectures and techniques for increasing wireless network capacity.

SUMMARY

The invention focuses on the Physical (PHY) and Link Layer design of systems such as 3GPP's Long Term Evolution (LTE). The design uses a hybrid Device to UE (D2UE) and Macro to UE (Macro2UE) architecture wherein some functions are maintained by the Macro2UE link and others are supported by the D2UE link. Therefore, according to the invention, it is possible to provide a radio communication system for enabling high capacity, high connectivity, low costs and low planning complexity.

In accordance with a first aspect of the disclosure, an advanced user equipment for offloading data traffic in a cellular telecommunications system is provided that includes: a macro-base-station-to-the-advanced-user-equipment (Macro2D) communication section configured to receive a first control-plane message from a base station over a wireless Macro2D communication link; a user-equipment-to-the-advanced-user-equipment (D2D) communication section configured to transmit user-plane data to a user equipment over a wireless D2D communication link established responsive to the first control-plane message; and a backhaul communication section configured to receive the user-plane traffic data from a network server over a backhaul link.

In accordance with a second aspect of the disclosure, a mobile station (user equipment) configured to receive offloaded data from an advanced user equipment in a cellular telecommunication system is provided that includes: a macro-base-station-to-the-user-equipment (Macro2D) communication section configured to receive both control-plane data and first user-plane data from the base station over a wireless Macro2D communication link; and an advanced-user-device-to-the-user-equipment (D2D) communication section configured to receive second user-plane data from a remote server through the advanced user device using a wireless D2D communication link, wherein the Macro2D communication section is further configured to receive a first control message from the base station over the Macro2D communication link, and wherein the D2D communication section is further configured to establish the D2D communication link responsive to the first control message.

In accordance with a third aspect of the disclosure, a macro base station for controlling a user equipment (UE) and an advanced user equipment (UE-A) in a cellular telecommunications network is provided that includes: a macro-base-station-to-the-UE-and-to-the-UE-A (Macro2D) communication section configured to exchange user-plane and control-plane data with the UE using a first wireless Macro2D communication link and to exchange control-plane data with the UE-A using a second wireless Macro2D communication link; and a control unit configured to control an establishment and also a release of a UE-to-UE-A (D2D) communication link through a first control message transmitted to at least one of the UE and the UE-A using the respective one of the Macro2D communication links, wherein the control unit is further configured to identify user-plane data to be exchanged between the UE and the UE-A using the D2D communication link.

BRIEF DESCRIPTION OF THE DRAWINGS

FIG. 12A illustrates the operations for the flowchart of FIG. 12.

FIG. 18 (b) illustrates an advanced user equipment that is not interfering with a neighboring base station.

FIG. 27 (b) illustrates a serving advanced user equipment having a high interference with a neighbor advanced user equipment.

FIG. 28 is a table for a transport format configuration based upon path loss.

FIG. 32 is a table of D2D measurement items

FIG. 33 illustrates the traffic measurement report flow between a base station and the user equipment and the advance user equipment.

FIG. 34 is a table of traffic measurement items

FIG. 38 illustrates a plurality of D2D data transmission sub-frames.

FIG. 38A illustrates a plurality of D2D data transmission sub-frames.

FIG. 39 illustrates a plurality of D2D data transmission patterns.

FIG. 40 is a table for determining the transport format in the D2D link based upon path loss.

FIG. 42 (*a*) illustrates a sub-frame format for the D2D DL.

FIG. 42 (*b*) illustrates a sub-frame format for the D2D UL.

FIG. 43 illustrates a plurality of sub-frames for both the UL and DL in the D2D link.

FIG. 44 illustrates a control information format for the D2D-PDCCH.

DETAILED DESCRIPTION

Figure 1:
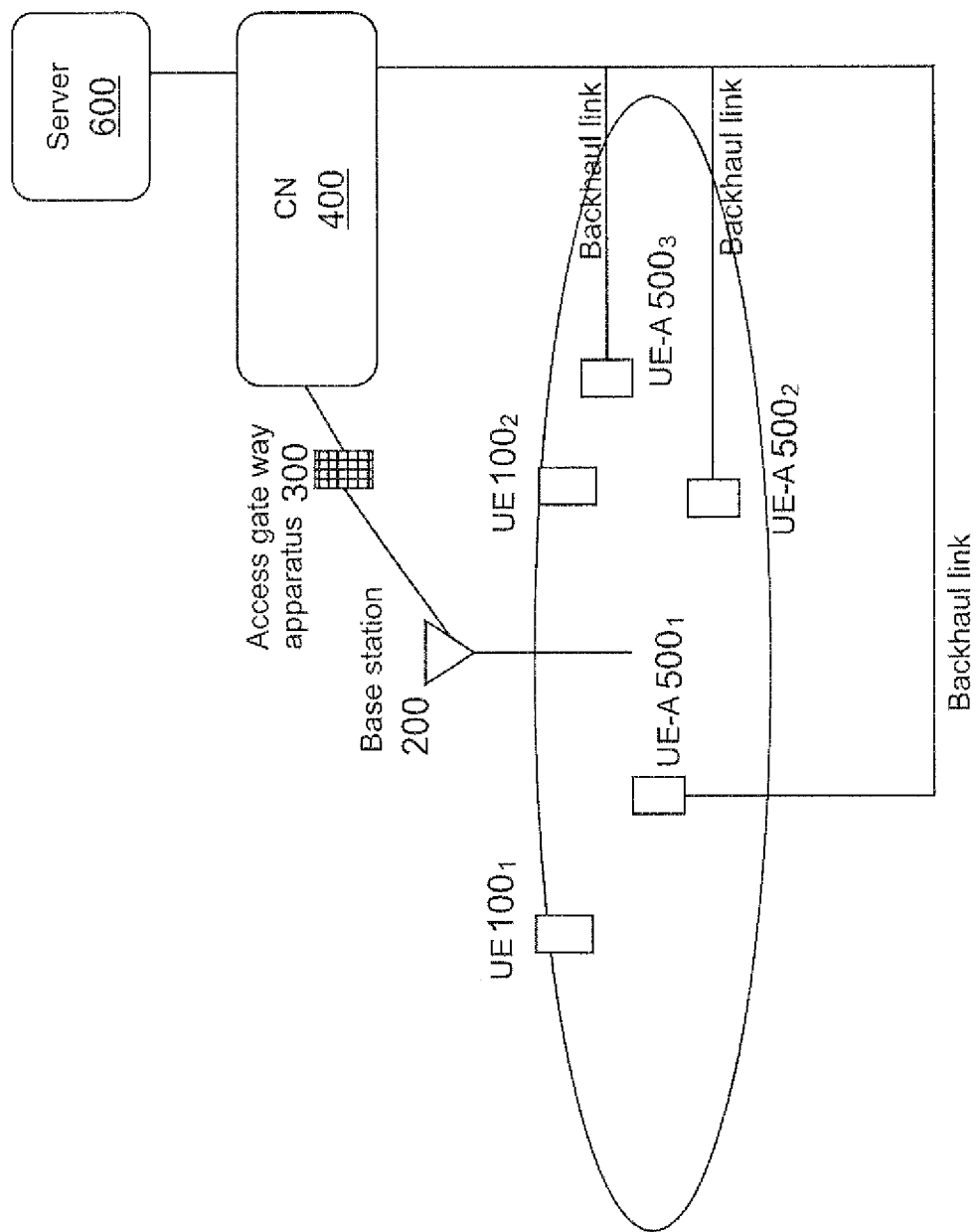
FIG. 1 is an example architecture for an enhanced local area radio access system.

A cellular network device is disclosed that enables a user to offload traffic from a macrocell base station without the drawbacks discussed earlier. As explained further herein, these devices are very similar to user equipment (UE), i.e., similar to a cell-phone so as to share much of a cell phone's structure and functions. The cellular network devices opportunistically offload traffic from the macro base stations and are denoted as advanced user equipment (UE-A) hereinafter. The UE-A devices allow offloading of data traffic that would ordinarily have to be carried by the link between the macrocell base station and the UE (which may be denoted as a Macro2UE link). When a UE-A is deployed, the offloaded data may then be carried over a UE-A to UE link (which may be denoted as a D2UE or a D2D link). Although a UE-E has features in common with a user equipment, it will be appreciated that, with respect to a UE, a UE-A is a network-side device analogous to a base station or other network-side nodes.

To perform this offloading of data traffic, the UE-A devices have a backhaul link, which is connected to the Internet or the core network so as to communicate with a server in the Internet or the core network. The backhaul link to the UE-A is not limited to a wired connection to the Internet, but may be a wireless connection to the Internet, such as a WiFi or cellular connection. The server transfers some of data to the user equipment (which would otherwise be transferred using the base station) utilizing the backhaul link and the D2UE connections. The D2UE connections are controlled by the macro base station (which will be referred to merely as a "base station" hereinafter) such that a D2UE connection is very similar to or the same as a UE-to-UE connection. As a result, high quality interworking between Macro2UE and D2UE connections is readily achieved. Moreover, a number of functions that are essential in conventional base stations may be omitted in the UE-A devices. For example, the UE-A devices need only support functions for D2UE connections. Therefore the cost and complexity of the UE-A devices can be kept low. For example, the operation of complicated functions such as the Radio Resource Control (RRC) connection state control and Non-Access Stratum (NAS) control is performed by the base station. Thus, most of the functions for conventional Macro2UE links such as transmitting broadcast channels, transmitting pilot and synchronization signals, controlling connections and the like, may be omitted in the D2UE connection.

A UE-A device is configured to support UE-A-to-user-equipment (D2UE) transfer of data. The UE-A device supports a base-station-to-UE-A link (a Macro2D link) and the D2UE link is controlled by the base station. A UE as disclosed herein also supports a base-station-to-user-equipment link (a Macro2UE link) and its D2UE link is controlled by the base station as well. Control signaling for the D2UE connections can be transmitted to the UE via the Macro2UE connection. In an analogous fashion, control signaling for the D2UE connections can be transmitted to the UE-A via the Macro2D connection. The Macro2D connection may be the same as or similar to the Macro2UE connection. Conversely, the Macro2D connection may be a wired link instead of a wireless link. If the Macro2D link is analogous to the Macro2UE link, the D2UE link is also analogous to the UE-A-to-UE-A connection (a D2D connection).

To achieve high quality connectivity, more important functions such as the RRC connection state control and also NAS control are maintained by the base station using the Macro2UE association. More specifically, control for the radio interface in the D2UE connections is conducted by the Macro2D and the macrocell-base-station-to-user device (Macro2UE) associations. The control includes at least one of connection establishment, connection management, connection reconfiguration, handover, connection release, radio resource selection management, power control, link adaptation, call admission control, radio bearer assignment, traffic measurement, radio measurement control, bearer management, security association and so on.

In some embodiments, D2UE connections are maintained by a time domain duplex (TDD) physical layer design. In such embodiments, in the band(s) used for D2UE transmissions, the user device and the UE-A device time-share the use of radio resources on the band(s). In alternative embodiments, D2UE connections may be maintained by a frequency domain duplex (FDD) physical layer resource sharing instead of TDD. When D2UE connections are maintained by FDD, the UE-A device may have an additional ability over a UE to transmit on the downlink band and to receive on the uplink band as will be explained further herein.

D2UE and Macro2UE transmissions can operate in different bands exploiting Carrier Aggregation Functions. In this fashion, D2UE transmissions can operate in one band, and Macro2UE transmissions can operate in another band, simultaneously in time.

Alternatively, D2UE and Macro2UE transmissions can operate in different bands exploiting time division multiplexing functions, wherein the D2UE transmission occur only at selected times and the Macro2UE transmissions occur at the remaining time. As yet another alternative, D2UE and Macro2UE transmission can operate in the same band by exploiting TDD The following discussion is organized into sections. A first section addresses the overall architecture of the macrocell/hybrid device system. In this architecture, the base station may assign and control the radio resources dedicated to the D2D link (which may also be denoted as the D2UE link). A subsequent section is directed to this radio resource management as well as radio bearer assignment. To efficiently assign the radio resources in the D2D link and efficiently operate the cellular telecommunications system, the base station needs to have some measure of the data traffic that will be offloaded on the D2D link. Thus, another following section discusses the traffic measurements in more detail. Finally, an additional section discusses the backhaul link.

The System Architecture

Various UE-A embodiments will now be discussed in further detail. Turning now to the drawings, FIG. 1 shows a plurality of UE-A units $500_1$ through $500_3$ within a cellular communication system. This system also includes a base station 200 as well as user equipment (UE) $100_1$ and $100_2$. As used herein, components having the same base element number (e.g., $100_1$ and $100_2$) have the same configuration, function, and state unless otherwise specified. Evolved Universal Terrestrial Radio Access (E-UTRA)/Universal Terrestrial Radio Access Network (UTRAN) (also denoted as Long Term Evolution (LTE)) is applied in the system of FIG. 1 but it will be appreciated that a wide variety of other wireless protocols such as WiMAX, WiFi, or LTE Advanced may also be implemented in the system.

Base station 200 is connected to a higher layer station, for example, an access gateway apparatus 300. In turn, access gateway 300 is connected to a core network (CN) 400. Access gateway 300 may also be referred to as MME/SGW (Mobility Management Entity/Serving Gateway). A server 600 may also be connected to the core network 400.

User equipment 100 communicates with the advanced user equipment 500 by Device-to-Device (D2D) communication, which may also be referred to as peer-to-peer (P2P) communication. In other words, D2UE communication is supported by the D2D connection from a physical layer point of view. The D2D communication between user equipment 100 and advanced user equipment 500 may be provided in a Time Division Multiplexing manner (TDD). Alternatively, the D2D communication between the user equipment and the advanced user equipment 500 may be provided in a Frequency Division Multiplexing (FDD) manner. Advanced user equipment 500 may communicate with base station 200 using LTE. Alternatively, a wired link X2 interface link or an enhancement of an X2 interface link may connect the advanced user equipment to the base station. The enhancement of the X2 interface link accommodates a master-slave relationship between the base station 200 and advanced user equipment 500.

Figure 2:
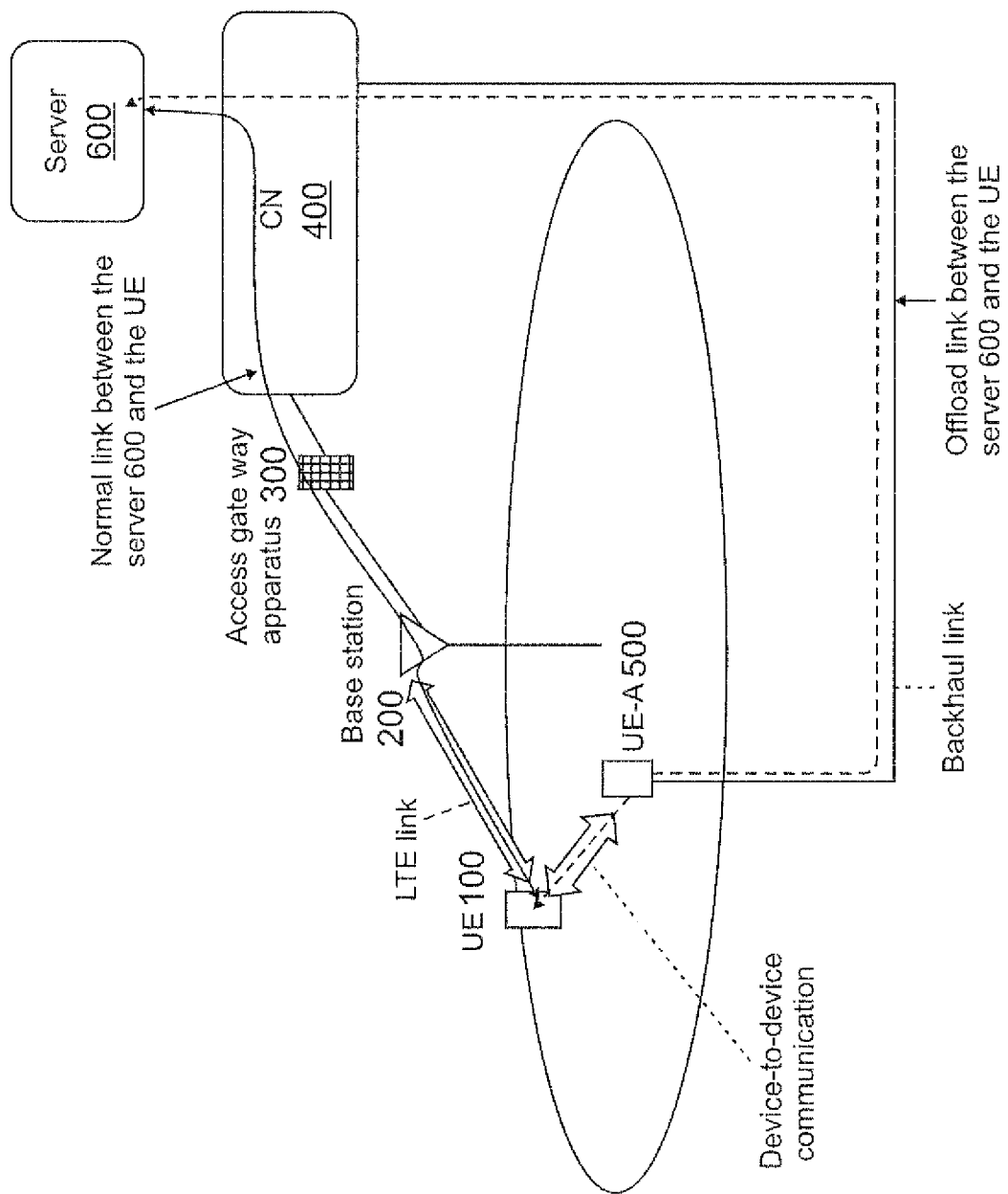
FIG. 2 illustrates the backhaul data path in the system of FIG. 1 for offloading data traffic to an advanced user equipment.

To provide greater capacity, advanced user equipment (UE-A) 500 is connected to the core network 400 through backhaul links. Each of these backhaul links may be an Ethernet link, a WiFi link, a cellular network link, and may be wired or wireless. Data plane traffic can thus flow between core network 400 and UE-A 500 without burdening base station 200. In this fashion, the user equipment can access data from server 600 without the data passing through base station 200. In other words, advanced user equipment 500 communicates with the user equipment 100 utilizing the D2D communication for data off load purposes. In contrast, control plane information as well as data plane traffic (e.g., real time data such as VoIP) can continue to flow to UE 100 via base station 200, access gateway 300, core network 400, and server 600. FIG. 2 is an annotated version of FIG. 1 having a dashed line to illustrate the backhaul data offloading that UE-500 provides to UE 100.

Figure 3:
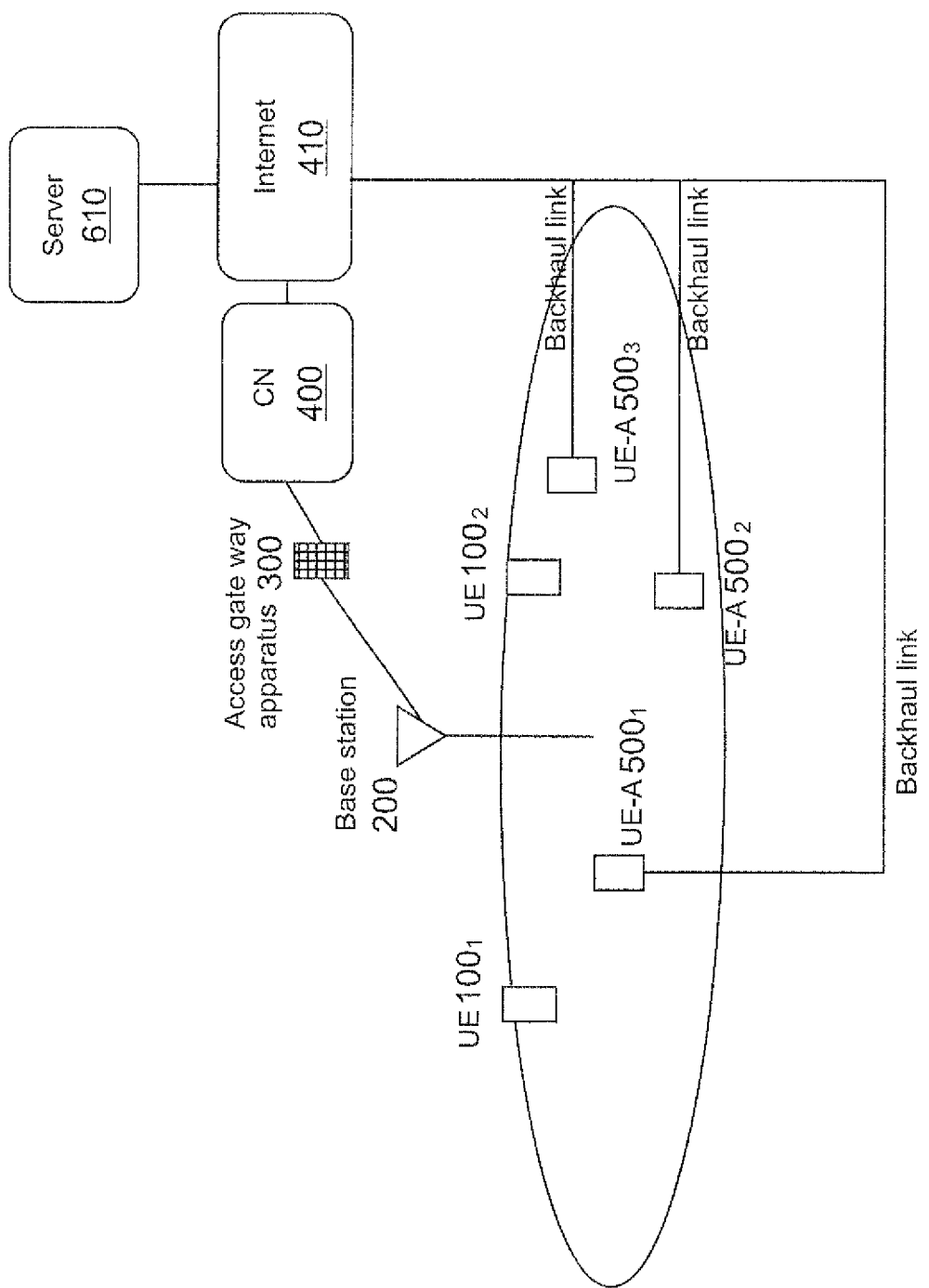
FIG. 3 illustrates a modification of the architecture of FIG. 1 in which the backhaul for the advanced user equipment couples to the Internet.

FIG. 3 illustrates an alternative embodiment in which advanced user equipment 500 may be connected to a server 610 via Internet 410. In this case, core network 400 may be regarded as a network controlled by a network operator. Core network 400 may include MME, S/P-GW, a Node for billing system, HLS (database for customers) and the like.

Figure 4:
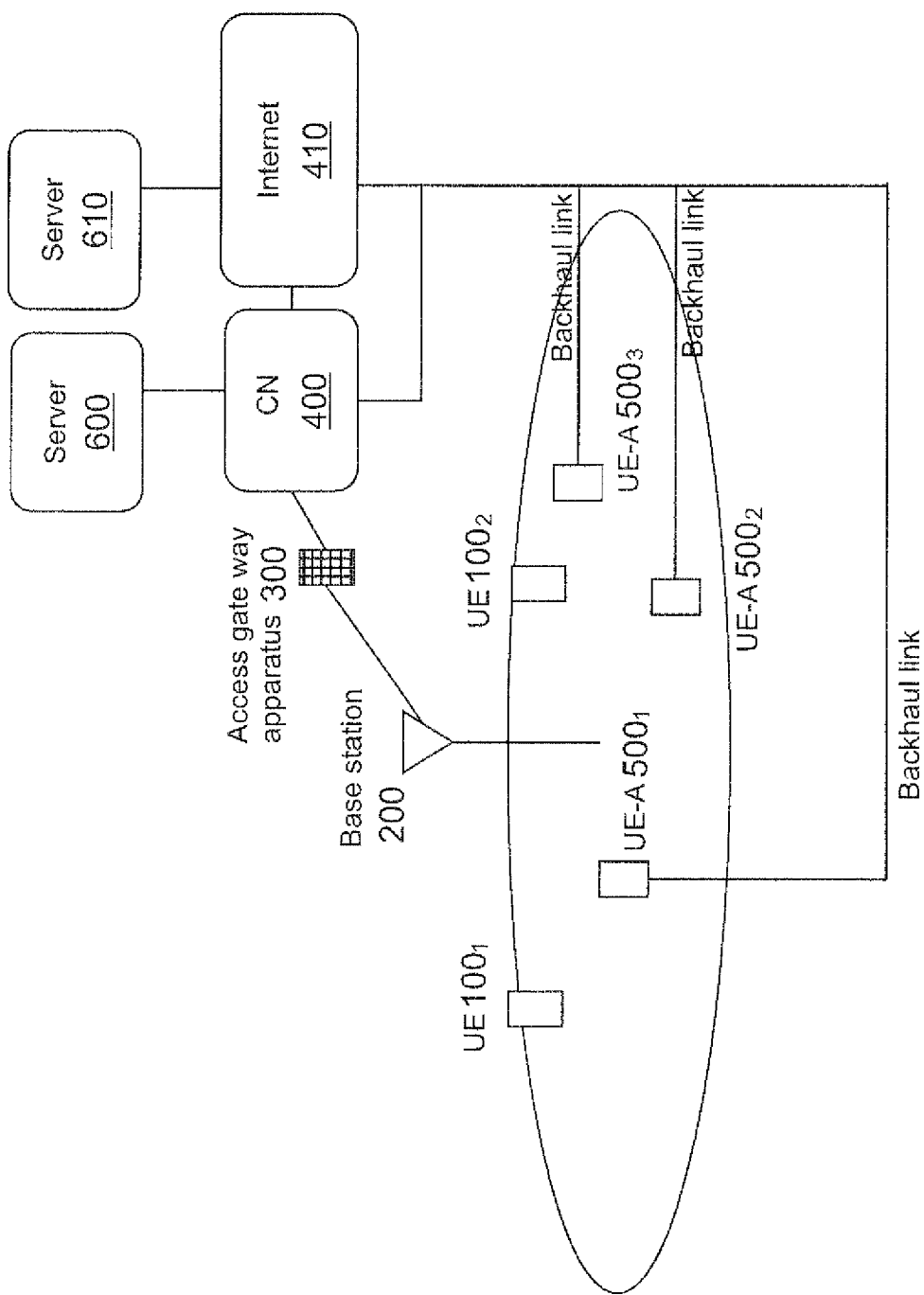
FIG. 4 illustrates an architecture that combines the features shown for the embodiments in FIGS. 1 and 3.
Figure 5:
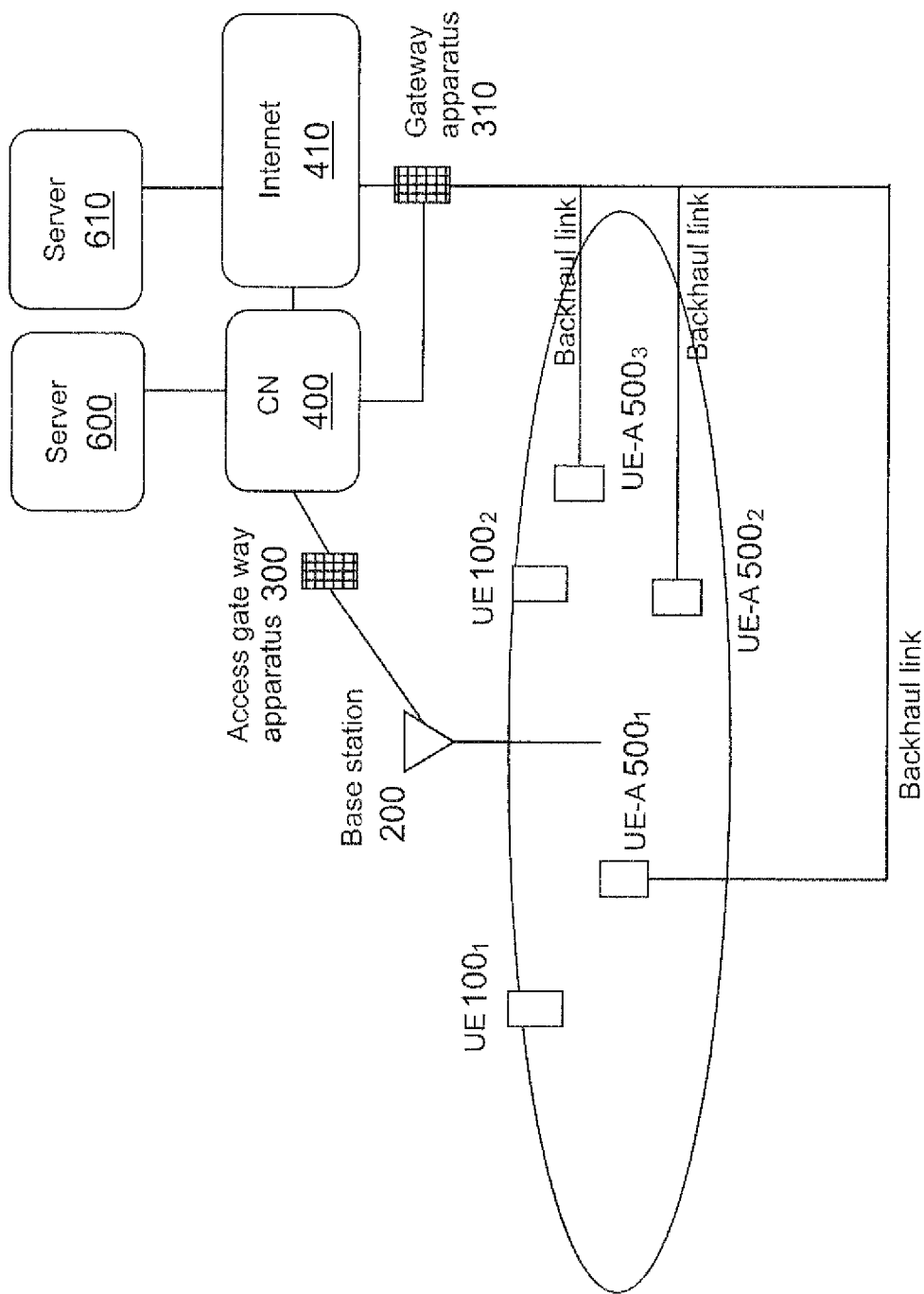
FIG. 5 illustrates a modification of the architecture of FIG. 4 to include a gateway between the advanced user equipment and the core network/Internet.
Figure 5A:
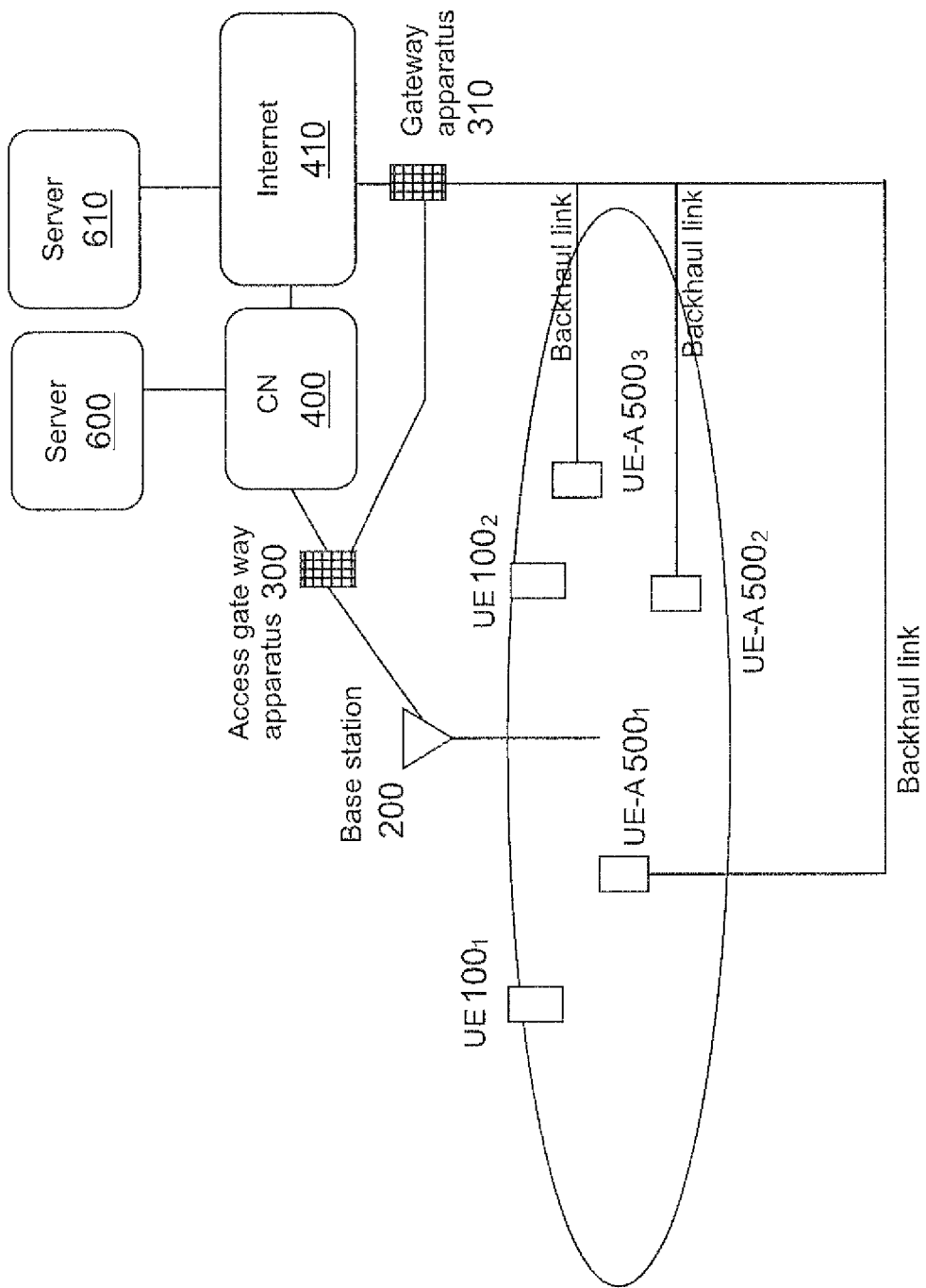
FIG. 5A illustrates a modification of the architecture of FIG. 5 in which the backhaul for the advanced user equipment also couples to the access gateway.
Figure 5B:
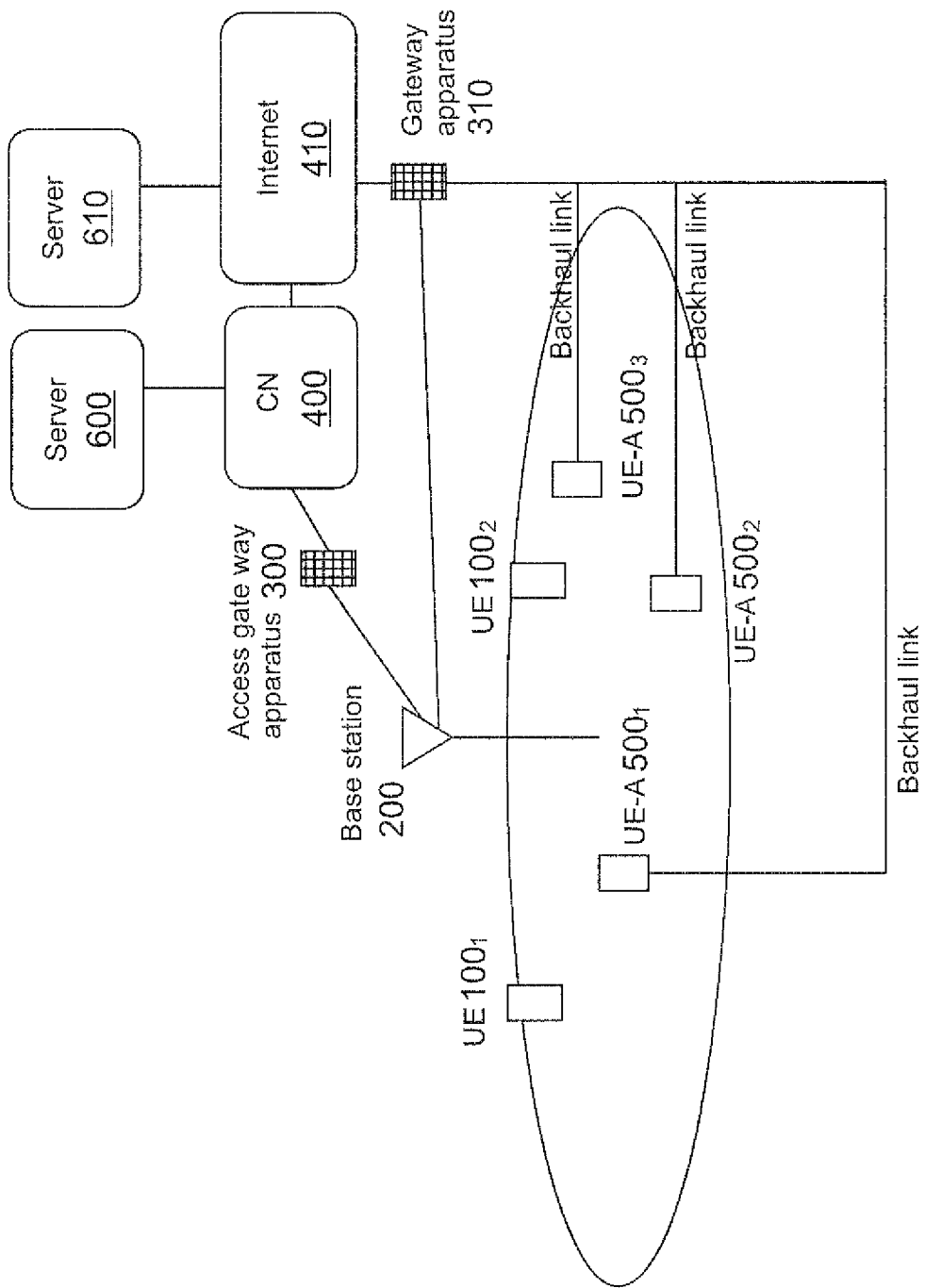
FIG. 5B illustrates a modification of the architecture of FIG. 5 in which the backhaul for the advanced user equipment also couples to the base station.
Figure 6:
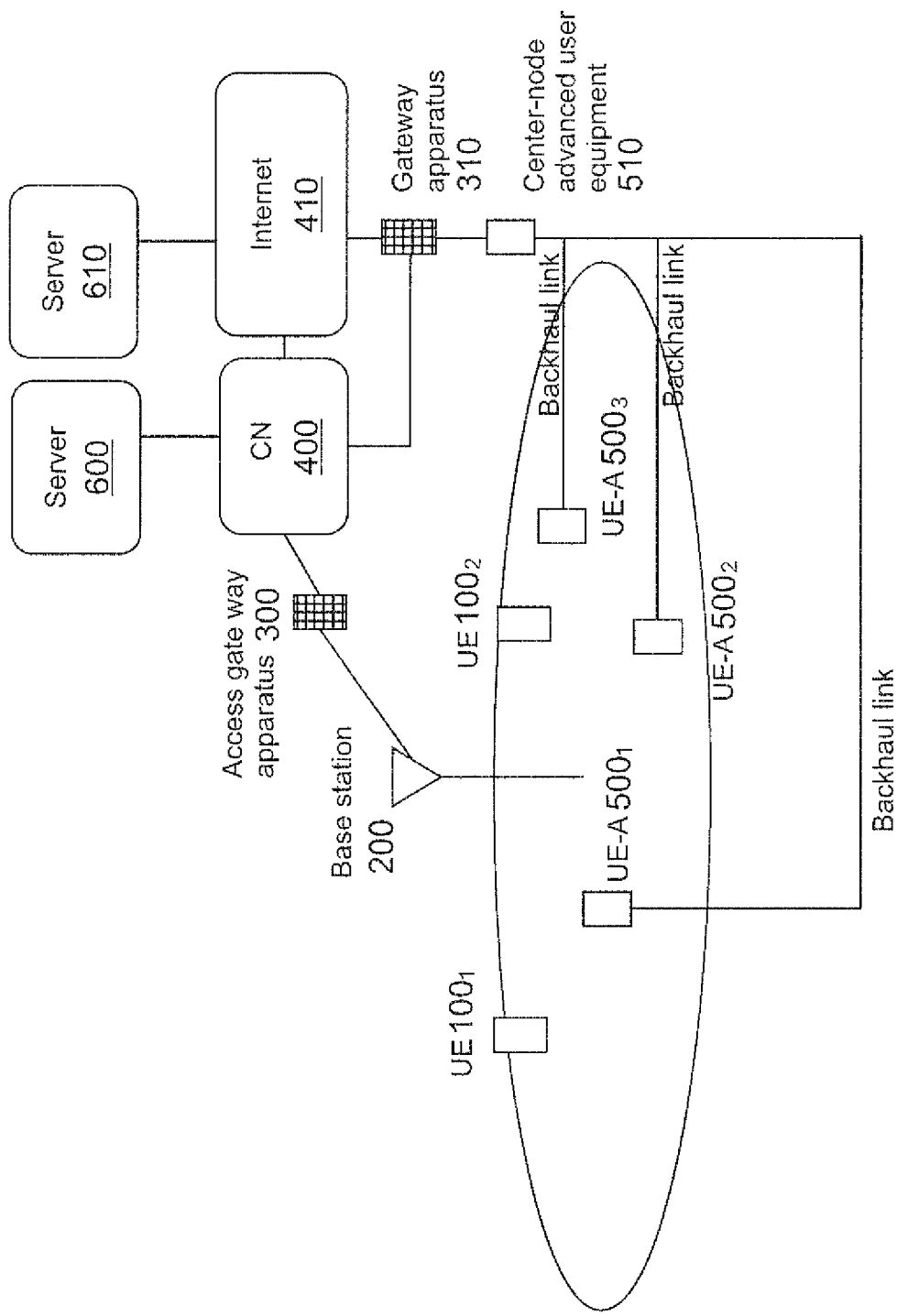
FIG. 6 illustrates a modification of the architecture of FIG. 6 to include a center-node advanced user equipment.

FIG. 4 illustrates another alternative embodiment that may be considered as a mixture of the FIG. 1 and FIG. 3 embodiments. In this embodiment, advanced user equipment 500 may be connected to server 600 via core network 400 or server 610 via the Internet. Advanced user equipment 500 may be connected to network equipment, which in turn is connected to server 600 via core network 400 or server 610 via the internet. The network equipment may be an S-GW or a P-GW or other nodes in the core network. Alternatively, the network equipment may be a node in the internet. The presence of gateway 310 between core network 400/Internet 410 and UE-A 500 is optional as shown in FIG. 5. Alternatively, as illustrated in FIG. 5A, the advanced user equipment 500 may be connected to gateway apparatus 300, to which the base station 200 is connected. Alternatively, as illustrated in FIG. 5B, the advanced user equipment 500 may be connected to the base station 200. In this embodiment, the Macro2D connection may be the same as the backhaul link. Moreover, the presence of a center node UE-A 510 through which UE-A(s) 500 communicate to the backhaul links is optional as well as shown in FIG. 6. Should center node UE-A 510 be included, a layer sharing protocol may be implemented in which center node UE-A 510 implements the RLC/PDCP layer whereas the UE-A devices handle the Physical/MAC layers. Other layer sharing methods may be implemented. For example, center node UE-A 510 may implement the PDCP layer whereas the UE-A devices implement the Physical/MAC/RLC layers. It may be determined by data bearers whether data should be transferred via advanced user equipment 500 and the Internet or via base station 200 and core network 400. Alternatively, it may be determined by data bearers whether data should be transferred via advanced user equipment 500 and the Internet or via advanced user equipment 500 and the core network 400.

In one embodiment, an LTE connection between base station 200 and user equipment 100 is maintained during the D2D communications so that radio resource control for the communications can be conducted by base station 200. Advanced user equipment 500 is configured to communicate with base station 200 utilizing LTE, to communicate with user equipment 100 utilizing a D2D communication, and to communicate with core network 400 utilizing a backhaul link. In this fashion, UE-A 500 transports traffic data between user equipment 100 and servers 600 and 610 for off load purpose utilizing the D2D communication and the backhaul.

The carrier frequency in a D2D connection may be different from that used in the LTE connection between base station 200 and user equipment 100. Similarly, the carrier frequency in the D2D connection may be different from that used in the LTE connection between base station 200 and the advanced user equipment 500. Alternatively, the carrier frequency in the D2D connection may be the same as that used in the LTE connection between base station 200 and user equipment 100 as well as between the base station 200 and the advanced user equipment 500.

Figure 7:
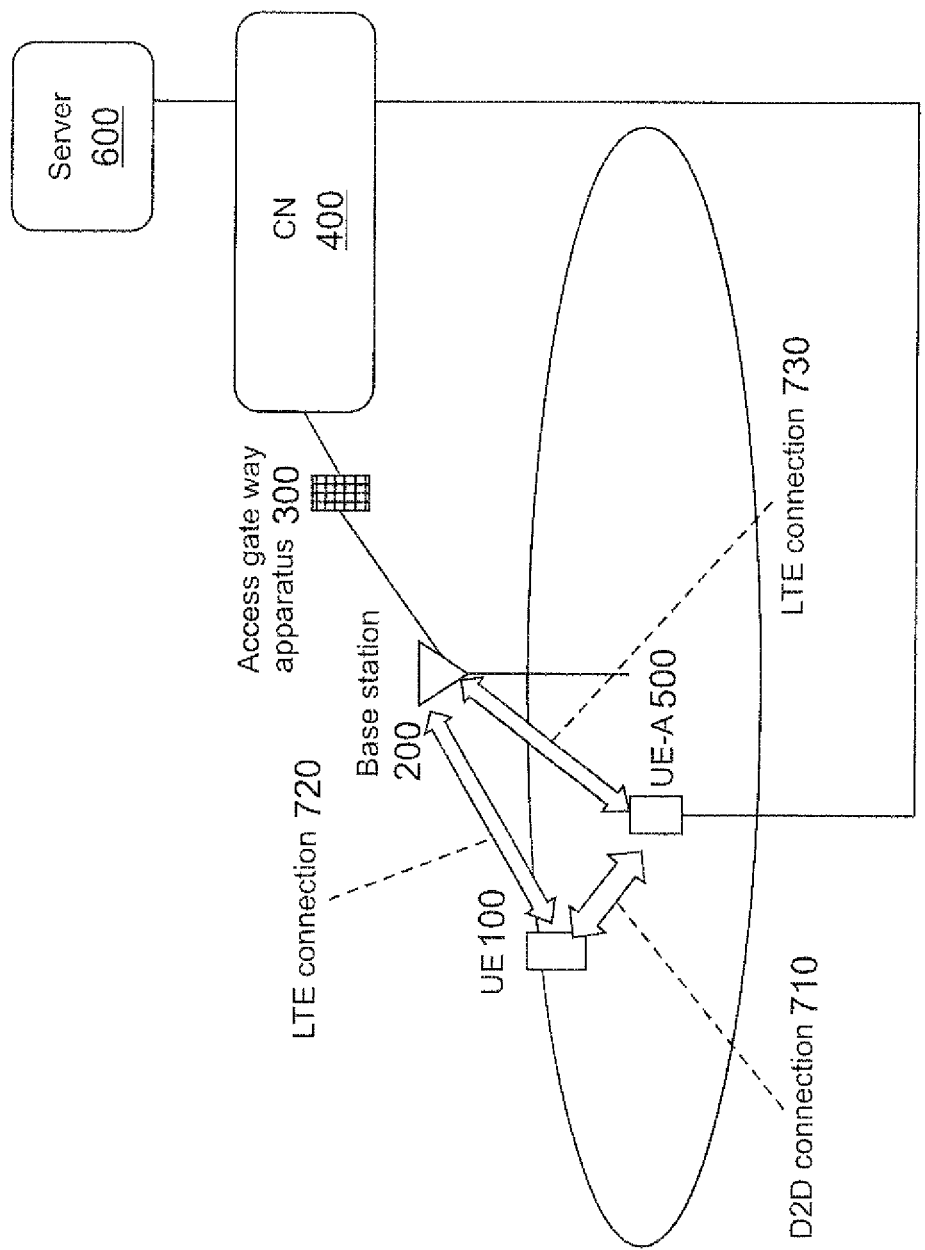
FIG. 7 illustrates an example architecture for the enhanced local area access system with the Macro2D and D2D links highlighted.

In the following examples, it is assumed without loss of generality that the carrier frequency in the D2D connection is 3.5 GHz and that TDD is applied to the D2D connection. Furthermore, it is also assumed that the carrier frequency in the LTE connection between base station 200 and user equipment 100 is 2 GHz, and that the carrier frequency in the LTE connection between base station 200 and advanced user equipment 500 is 2 GHz. As shown in FIG. 7, when user equipment 100 communicates with server 600, base station 200 not only configures an LTE connection 720 between base station 200 and user equipment 100 but also configures a D2D connection 710 between user equipment 100 and advanced user equipment 500. Similarly, base station 200 configures an LTE connection 730 between base station 200 and advanced user equipment 500. To initiate such a configuration, user equipment 100 may send an RRC connection request to base station 200 at the beginning of the communication so that base station 200 configures LTE connection 720 between base station 200 and user equipment 100. Alternatively, base station 200 may send a paging signal to user equipment 100 such that user equipment 100 sends an RRC connection request corresponding to the paging signal to base station 200. In response, base station 200 configures a connection between user equipment 100 and server 600 via base station 200, access gateway 300, and core network 400.

Similarly, base station 200 configures LTE connection 730 between base station 200 and advanced user equipment 500. In some embodiments advanced user equipment 500 has the ability to power-down or enter a sleep state when not in use. In such embodiments base station 200 is configured to send advanced user equipment 500 a wakeup signal using LTE connection 730. Alternatively, base station 200 may be configured to send advanced user equipment 500 a wake up signal over the backhaul connection to configure connection 730 between base station 200 and advanced user equipment 500. Such a backhaul-carried wakeup signal is supported by an additional protocol design. In some embodiments advanced user equipment 500 is able to use power-saving modes, such as stand-by modes, equivalent to UE 100. Exiting such power-saving modes is done in the same fashion as for conventional UEs and possibly in response to signals expected by or sent by base-station 200.

Base station 200 commands user equipment 100 and/or the advanced user equipment 500 to configure D2D connection 710 between user equipment 100 and advanced user equipment 500. Base station 200 controls D2D connection 710 as well as LTE connection 720 and LTE connection 730. For example, base station 200 may order for user equipment 100 and advanced user equipment 500 to establish D2D connection 710. In addition, base station 200 may order for user equipment 100 and advanced user equipment 500 to reconfigure or re-establish D2D connection 710. Conversely, base station 200 may order for user equipment 100 and advanced user equipment 500 to release D2D connection 710. Similarly, base station 200 may order for user equipment 100 to change the D2D connection to another advanced user equipment. That is, base station 200 may order for user equipment 100 to conduct a handover to another advanced user equipment 500 using a carrier in which the D2D communication is conducted. Base station 200 may control the above procedures utilizing RRC signaling in LTE. Furthermore, when D2D connection 710 is dropped, base station 200 maintains the communications between user equipment 100 and server 600 utilizing LTE connection 720.

Base station 200 also controls the radio resource for D2D connection 710. The details of the radio resource control for D2D connection 710 are discussed further below.

Base station 200 configures one or more radio bearers for the communications. The radio bearer may be denoted as a logical channel. Base station 200 also configures radio bearers for LTE connection 720 and radio bearers for D2D connection 710. The radio bearers for LTE connection 720 may be the same as the ones for the D2D connection 710. Alternatively, the radio bearers for the LTE connection 720 may be different from those used for D2D connection 710. For example, radio bearers for packets of non-real-time services, such as web browsing, e-mail, and FTP, may be configured in D2D connection 710. Conversely, radio bearers for packets of real-time services, such as VoIP and streaming, may be configured for LTE connection 720. Alternatively, the radio bearers for packets of non-real-time services are configured for both D2D connection 710 and in LTE connection 720 such that packets of non-real-time services may be transmitted preferentially in D2D connection 710. In yet another alternative, the radio bearers for the packets of real-time services are configured both in D2D connection 710 and in LTE connection 720 such that the real-time services packets may be transmitted preferentially in LTE connection 720. Such prioritization or priority for the packets may be configured by base station 200. In that regard, base station 200 may configure which connection: D2D connection 710 or LTE connection 720 that should be preferentially utilized in the communications for each radio bearer.

Control plane (C-plane) signaling, such as Non Access Stratum (NAS) signaling and Radio Resource Control (RRC) signaling, may be transmitted in LTE connection 720. For example, RRC signaling includes signaling messages for RRC connection establishment, initial security activation, RRC connection reconfiguration, RRC connection release, RRC connection re-establishment, radio resource configuration, measurement reports, handover command, and so on. A radio bearer for C-plane signaling may be denoted as a signaling radio bearer. C-plane signaling may be transmitted also in the D2D connection 710. Alternatively, one part of a radio bearer data may be transmitted in the D2D connection 710 and the other part of the radio bearer data may be transmitted in the LTE connection 720.

To save power and bandwidth, advanced user equipment 500 may be placed in an idle mode when there is no D2D connection with user equipment 100. During the idle mode, advanced user equipment 500 does not transmit any signals since there is no D2D connection with user equipment 100. Alternatively, advanced user equipment 500 does not transmit any signals except for a pilot signal, which is described later.

Alternatively, advanced user equipment 500 may maintain LTE connection 730 and may be in a DRX mode in LTE connection 730 when there is no D2D connection with user equipment 100. In the DRX mode, advanced user equipment 500 does not transmit signals to user equipment 100. Alternatively, advanced user equipment 500 does not transmit any signals except for a pilot signal.

Figure 8:
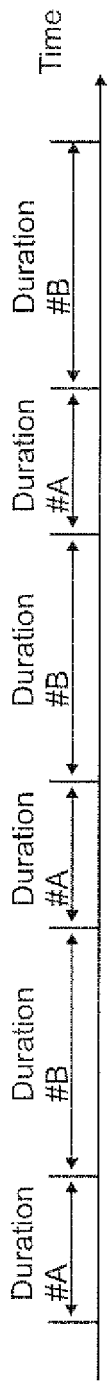
FIG. 8 illustrates time slots for the D2D link and the user equipment's Macro2D link.

User equipment 100 conducts communication in D2D connection 710 and communication in LTE connection 720 simultaneously. In one embodiment, user equipment 100 communicates over D2D connection 710 and over LTE connection 720 simultaneously utilizing carrier aggregation functions. In that regard, user equipment 100 may have two radio frequency (RF) interfaces to conduct communication in D2D connection 710 and communication in LTE connection 720 simultaneously. Alternatively, user equipment 100 may conduct communication in D2D connection 710 and communication in LTE connection 720 in a time division multiplexing manner as shown in FIG. 8. Two sets of time slots, Duration # A and Duration # B, are shown in FIG. 8. User equipment 100 may communicate in LTE connection 720 in the time slots corresponding to Duration # A and may communicate in D2D connection 710 in the time slots corresponding to Duration # B.

The time duration for D2D connection may be larger than the one for the LTE connection so that the data off load effects can be increased. For example, the length of Duration # A may be 8 msec whereas the length of Duration # B may be 1.28 sec. The time duration for LTE connection 720 (Duration # A in FIG. 8) may correspond to an on-duration in a DRX control over LTE connection 720. The time duration for D2D connection 710 may correspond to an off-duration in the DRX control over LTE connection 720. The off-duration means a sleep mode in DRX control, in which user equipment 100 does not have to monitor physical control channels transmitted from base station 200 over LTE connection 720. In case that the user equipment 100 uses time division multiplexing with regard to connections 710 and 720, it does not have to support a capability of simultaneously communicating over these connections, i.e. user equipment 100 can switch the RF interface from LTE connection 720 to that for D2D connection 710 and vice versa.

Base station 200 controls the radio resource for D2D connection 710. The radio resource may be configured selectively in the time domain, frequency domain, and code resource. For example, the base station 200 may configure D2D connection 710 to use a non-overlapping spectrum with regard to any other D2D connections. As a result, interference problems caused by other D2D connections can be mitigated. Similarly, base station 200 may configure the time resource in D2D connection 710 so that it does not overlap with the time resource utilized in other D2D connections. Alternatively, base station 200 may configure the code resource in D2D connection 710 so that it does not overlap with the code resource utilized in other D2D connections. As a result, interference problems caused by other D2D connections can be mitigated.

Base station 200 controls the maximum transmission power in D2D connection 710 based on the number of the D2D connections in the cell. For example, base station 200 sets the maximum transmission power to be higher if the number of D2D connections in the cell is relatively small. Conversely, base station 200 sets the maximum transmission power to be lower if the number of D2D connections in the cell is relatively large. In an alternative embodiment, base station 200 sets the maximum transmission power to be higher if no system is operated in a carrier adjacent to the D2D connection carrier. Conversely, base station 200 sets the maximum transmission power to be lower if another system is operated in a carrier adjacent to the D2D connection carrier. In that regard, interference in its own system or to another system can be reduced.

User equipment 100 is configured to measure and detect the nearest advanced user equipment 500 so that the data throughput in the D2D connection can be maximized and the interference caused by the D2D connection can be minimized. Furthermore, user equipment 100 may be configured to report results of the measurements and detections of the nearest advanced user equipment to base station 200. Base station 200 controls the D2D connection based on the measurements and the detected nearest neighbor advanced user equipment. For example, if the nearest neighbor advanced user equipment changes, base station 200 may order for user equipment 100 to stop communications with the currently serving advanced user equipment so as to start new communications with the newly-detected nearest neighbor advanced user equipment.

Similarly, advanced user equipment 500 may also measure and detect the nearest user equipment 100 so that the data throughput in the D2D connection can be maximized and the interference caused by the D2D connection can be minimized. Furthermore, advanced user equipment 500 may be configured to report the measurements and detections of the nearest user equipment to base station 200. In this fashion, base station 200 controls the D2D connection based on the results and the detected nearest user equipment. For example, when the identity of the nearest user equipment changes, base station 200 may order for advanced user equipment 500 to stop communications with the currently served user equipment so as to start new communications with the newly-detected nearest user equipment.

Figure 9:
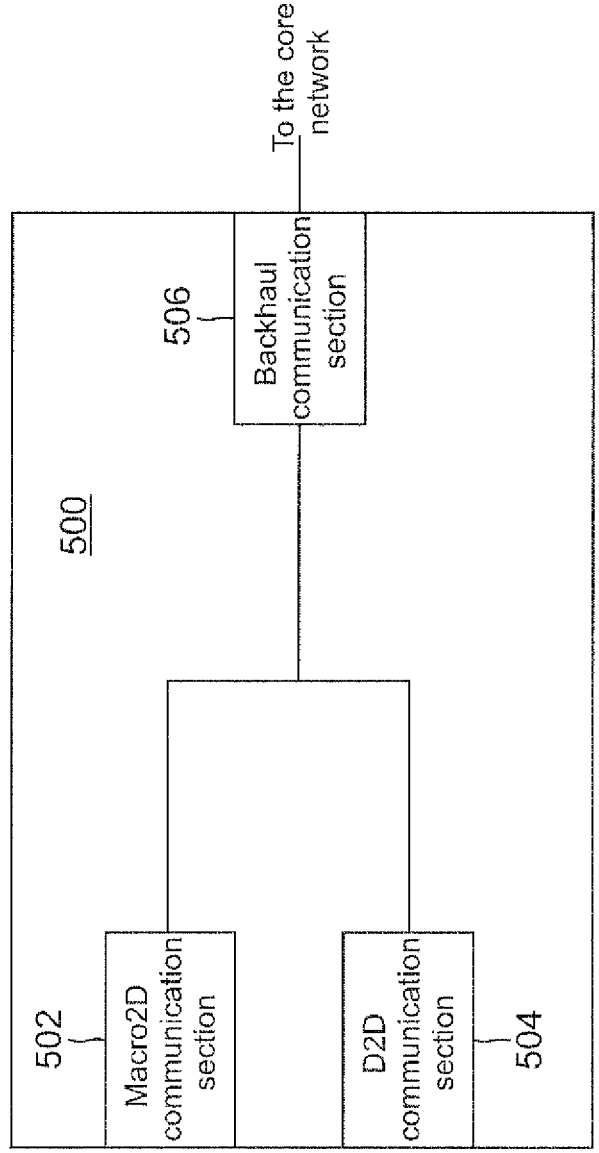
FIG. 9 is a block diagram for an example advanced user equipment.

A block diagram of an advanced user equipment 500 is shown in FIG. 9. In this embodiment, advanced user equipment 500 includes a Macro2D communication section 502, a D2D communication section 504, and a Backhaul communication section 506. Macro2D communication section 502, D2D communication section 504, and Backhaul communication section 506 are all connected to each other. Macro2D communication section 502 communicates with base station 200 utilizing LTE connection 730. More specifically, Macro2D communication section 502 receives control signaling for D2D connection 710 from base station 200 and transmits control signaling for D2D connection 710 to base station 200. The control signaling includes signaling for establishing/configuring/re-configuring/re-establishing/ and releasing D2D connection 710. Signaling for D2D connection handover may also be included in the control signaling. The control signaling may be an RRC layer signaling in LTE. The control signaling is transmitted to the D2D communication section 504. The control signaling may include parameters for at least one of physical layer, MAC layer, RLC layer, PDCP layer, or RRC layer. The control signaling may include information for the radio bearers.

Furthermore, the control signaling may include radio resource control information for D2D connection 710. As described above, the radio resource control information for D2D connection 710 may include radio resource information that can be utilized by D2D connection 710 or may include radio resource information that cannot be utilized by the D2D connection. The radio resource may include at least one of a time domain resource, a frequency domain resource, and a code domain resource. The radio resource control information may also be transmitted to the D2D connection.

In addition, the control signaling may include information for a link adaptation of D2D connection 710. More specifically, the control signaling may include information for power control or adaptive modulation and coding in D2D connection 710. The power control information may include information on the maximum transmission output power in D2D connection 710.

In some embodiments, the control signaling may include measurement results for D2D connection 710. More specifically, Macro2D communication section 502 may transmit measurement results, which are obtained by D2D communication section 504. The measurement results include radio link quality between the advanced user equipment and the user equipment. The user equipment measurements may concern the currently-connected connected user equipment over the D2D connection or may concern a user device that is not currently connected to the advanced user equipment using the D2D connection. Alternatively, the measurement results include radio link quality between the reporting advanced user equipment and other advanced user equipment.

D2D communication section 504 communicates with user equipment 100 utilizing D2D connection 710. More specifically, D2D communication section 504 establishes/configures/re-configures/re-establishes/and releases D2D connection 710 between advanced user equipment 500 and user equipment 100. This management of D2D connection 710 may be based on the control signaling transmitted by base station 200.

D2D communication section 504 may conduct a link adaptation for D2D connection 710, such as power control and adaptive modulation and coding. The link adaptation may be conducted based on the control signaling transmitted by base station 200. Furthermore, D2D communication section 504 transmits data to user equipment 100 and receives data from user equipment 100 utilizing the D2D connection 710. As described above, data for some of the radio bearers may be transmitted in D2D connection 710.

Hereinafter, data transferred from the user equipment 100 to server 600 (or server 610) is called "uplink data" and data transferred from the server 600 (or server 610) to user equipment 100 is called "downlink data." D2D communication section 504 transmits the downlink data to the user equipment 100 using the D2D connection 710. The downlink data is transferred from server 600 via core network 400 and backhaul communication section 506. D2D communication section 504 receives the uplink data from user equipment 100 over D2D connection 710. The uplink data is then transferred to server 600 via Backhaul communication section 506 and core network 400. D2D communication section 504 also conducts measurements for D2D connection 710. More specifically, D2D communication section 504 make measurements of the radio link quality for D2D connection 710 between advanced user equipment 500 and user equipment 100 or between advanced user equipment 500 and other user equipment. Furthermore, D2D communication section 504 make measurements of the radio link quality for D2D connection 710 between advanced user equipment 500 and other advanced user equipment. The radio link quality may be at least one of pilot signal received power, path loss, signal-to-interference ratio, channel state information, channel quality indicator, and received signal strength indicator. The radio link quality may be calculated using the pilot signal transmitted by the currently-connected user equipment, by the neighbor user equipment, or by the neighbor advanced user equipment. The path loss is between advanced user equipment 500 and the currently-connected user equipment, or between advanced user equipment 500 and the neighbor user equipment, or between advanced user equipment 500 and the neighbor advanced user equipment. The measurements may include the interference power level in the frequency band over which the D2D communication operates. D2D communication section 504 reports the measurement results to base station 200 via Macro2D communication section 502 and LTE connection 730.

The downlink data which is transferred from the core network 400 over the backhaul connection to backhaul communication section 506 is provided to D2D communication section 504. In turn, D2D communication section 504 receives the uplink data over the D2D connection and provides the uplink data to Backhaul communication section 506, which then transmits the uplink data over the backhaul connection to core network 400.

Figure 9A:
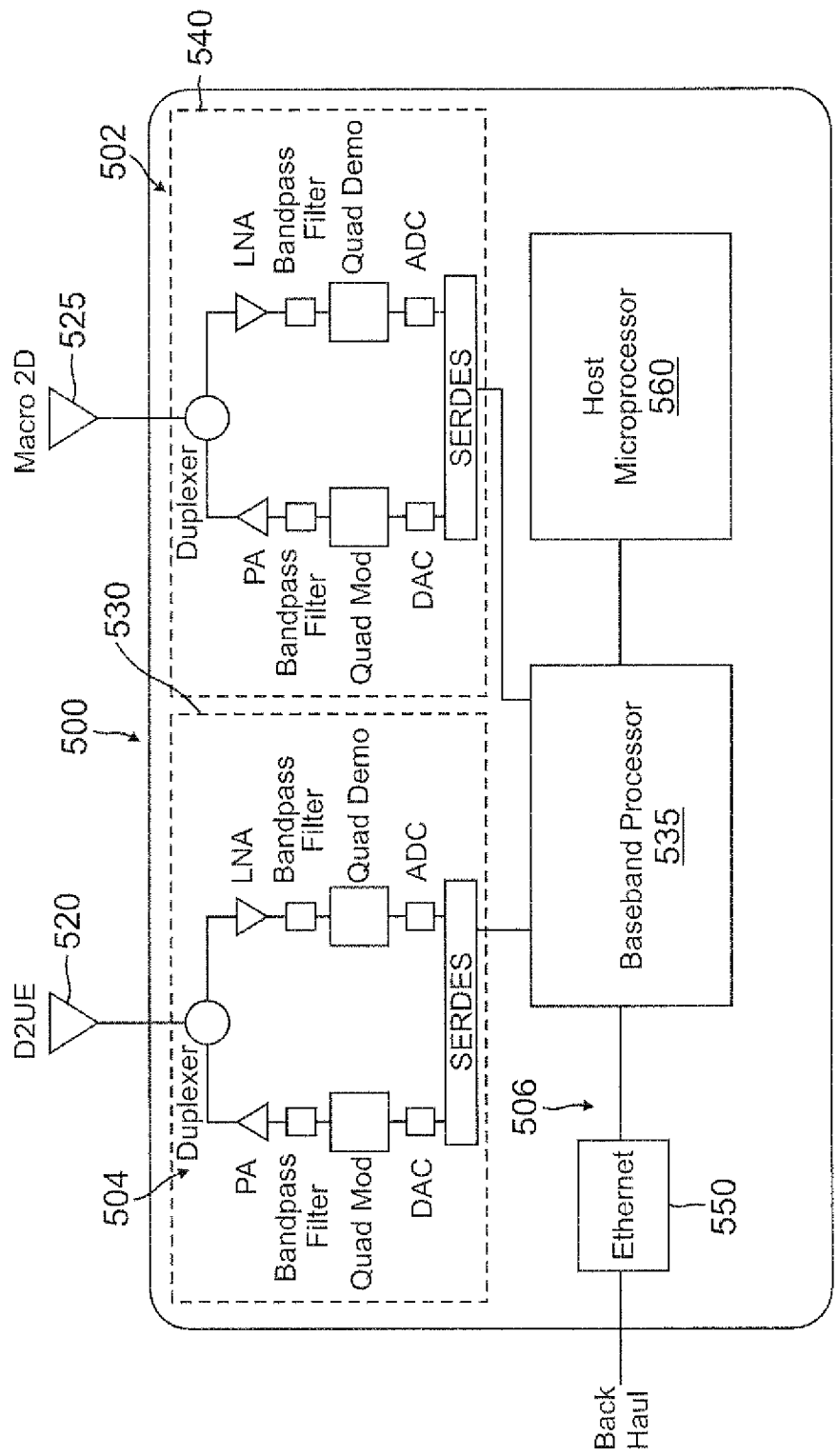
FIG. 9a is a more detailed block diagram for the advanced user equipment of FIG. 9.

One of ordinary skill in the art will readily appreciate that the functional blocks shown in FIG. 9 would comprise appropriate hardware and software. For example, FIG. 9A shows an example instantiation of these blocks. As seen in FIG. 9A, UE-A 500 includes two radio interfaces for the D2UE and Macro2D radio links. Each radio interface is analogous to the remaining interface. For example, data from the UE would be received over the D2UE (D2D) link at an antenna 520 that couples to an RF interface 530. RF interface 530 includes a duplexer to enable both receive and transmit functionality at antenna 520. Baseband data to be transmitted to the UE is received at RF interface 530 from a baseband processor 535. A SERDES serializes the baseband data followed by a conversion to analog form in a digital-to-analog converter (DAC). The resulting analog signal is then processed by a quadrature modulator to modulate the desired carrier frequency. After passing through a bandpass filter and a power amplifier (PA), the resulting RF signal is then ready for transmission to the UE. Reception of data from the UE is similar except that the PA is replaced by a low noise amplifier (LNA) and the quadrature modulator is replaced by a quadrature demodulator. The resulting analog baseband data is then converted to digital form in an analog-to-digital converter (ADC) before being de-serialized in the SERDES.

An RF interface 540 that drives an antenna 525 for the Macro2D link is analogous to RF interface 530 except that the carrier frequencies differ (in some embodiments, the modulation schemes also differ). In FIG. 9A, the backhaul link is a wired Ethernet link that is received by an Ethernet interface 550. Downlink data from the backhaul link thus passes from the Ethernet interface to the baseband processor, which in turn is controlled by a host microprocessor 560. Backhaul communication section 506 of FIG. 9 thus maps to Ethernet interface 550 as well as the supporting functions carried out by baseband processor 535 and host microprocessor 560. Similarly, macro2D communication section 502 maps to antenna 525, RF interface 540, and the supporting functions performed by baseband processor 535 and host microprocessor 560. Finally, D2D communication section 505 maps to antenna 520, RF interface 530, and the supporting functions performed by baseband processor 535 and host microprocessor 560.

Figure 10:
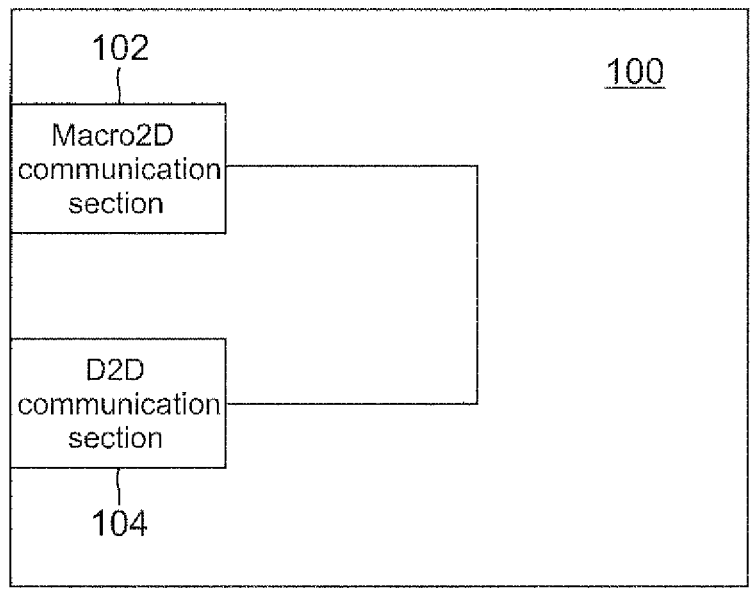
FIG. 10 is a block diagram for an example user equipment.

A block diagram for an example user equipment 100 embodiment is shown in FIG. 10. User equipment 100 includes a Macro2D communication section 102 and a D2D communication section 104, which are connected to each other. Macro2D communication section 102 communicates with base station 200 utilizing LTE connection 720. As described above, data for some of radio bearers are transmitted in LTE connection 720. For example, control signaling such as RRC signaling, NAS signaling, and MAC layer signaling may be transmitted in LTE connection 720. Furthermore, packets for Voice over IP (VoIP) may also be transmitted in LTE connection 720. Macro2D communication section 102 may transmit/receive data for all radio bearers to and from the base station 200 if D2D connection 710 is dropped or not available. Furthermore, Macro2D communication section 102 receives control signaling for D2D connection 710 from base station 200 and transmits control signaling for D2D connection 710 to the base station 200. Such control signaling is the same or analogous to that described above for advanced user equipment 500 of FIG. 9.

D2D communication section 104 communicates with advanced user equipment 500 over D2D connection 710. More specifically, D2D communication section 104 establishes/configures/re-configures/re-establishes/releases D2D connection 710 between advanced user equipment 500 and user equipment 100. The management of D2D connection 710 may be based on the control signaling transmitted by base station 200. D2D communication section 104 may conduct a link adaptation for D2D connection 710, such as power control and adaptive modulation and coding. The link adaptation may be conducted based on the control signaling transmitted by base station 200. Furthermore, D2D communication section 104 transmits data to advanced user equipment 500 and receives data from the advanced user equipment 500 utilizing D2D connection 710. As described above, data for some of the radio bearers may be transmitted in D2D connection 710.

D2D communication section 104 receives the downlink data from advanced user equipment 500 over D2D connection 710. Similarly, D2D communication section 104 transmits the uplink data to advanced user equipment 500 using D2D connection 710.

D2D communication section 104 also conducts measurements for D2D connection 710. More specifically, D2D communication section 104 makes measurements of radio link quality for the D2D connection between user equipment 100 and neighbor user equipment, the connection between user equipment 100 and neighbor advanced user equipment, or the connection between user equipment 100 and the currently-connected advanced user equipment. The radio link quality may be at least one of pilot signal received power, path loss, signal-to-interference ratio, channel state information, channel quality indicator, and received signal strength indicator. The radio link quality may be calculated by the pilot signal transmitted by the neighbor user equipment, the neighbor advanced user equipment, or the currently-connected advanced user equipment. The path loss is the one between the user equipment 100 and the neighbor user equipment, the one between the user equipment 100 and neighbor advanced user equipment, or the one between the user equipment 100 and the currently-connected advanced user equipment. D2D communication section 104 reports the measurement results to base station 200 via Macro2D communication section 102 and LTE connection 720.

Figure 11:
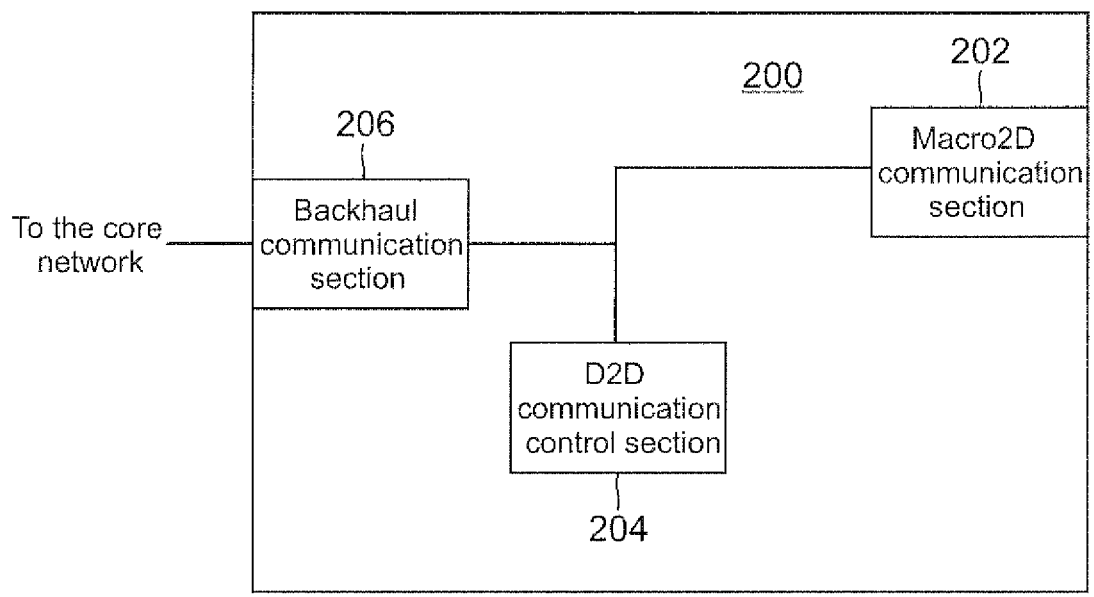
FIG. 11 is a block diagram for an example base station.

A block diagram for an example base station 200 is shown in FIG. 11. Base station 200 includes a Macro2D communication section 202, a D2D communication control section 204, and a Backhaul communication section 206, which are all connected to each other. Macro2D communication section 202 communicates with user equipment 100 utilizing LTE connection 720 and communicates with advanced user equipment 500 utilizing LTE connection 730. As described above, data for some of radio bearers are transmitted in the LTE connection 720. For example, control signaling such as RRC signaling, NAS signaling, and MAC layer signaling may be transmitted in LTE connection 720. Furthermore, packets for Voice over IP (VoIP) may also be transmitted in the LTE connection 720. Macro2D communication section 202 may transmit/receive data for all radio bearers to/from user equipment 100 if D2D connection 710 is dropped or not available. Some data, such as user plane (U-plane) data transmitted from user equipment 100 are transferred to core network 400 via Macro2D communication section 202 and backhaul communication section 206. Conversely, U-plane data transmitted from server 600 are transferred to user equipment 100 via backhaul communication section 206 and Macro2D communication section 202. Furthermore, Macro2D communication section 202 receives control signaling for D2D connection 710 from user equipment 100 and transmits control signaling for D2D connection 710 to user equipment 100. This control signaling is the same or analogous to that discussed above for advanced user equipment 500.

Macro2D communication section 202 communicates with advanced user equipment 500 utilizing LTE connection 730. Macro2D communication section 202 receives control signaling for D2D connection 710 from advanced user equipment 500 and transmits control signaling for D2D connection 710 to advanced user equipment 500. This control signaling is also the same or analogous to that discussed above for advanced user equipment 500. The control signaling for the D2D connection 710 is produced by D2D communication control section 204 as described below and is transferred to user equipment 100 or advanced user equipment 500 via Macro2D communication section 202.

D2D communication control section 204 conducts radio link connection control for the D2D connection 710. The radio link connection control includes at least one of establishing/configuring/re-configuring/re-configuring/re-establishing/releasing D2D connection 710. The parameters for the radio link connection control are transmitted to advanced user equipment 500 and to user equipment 100 via Macro2D communication section 202. These parameters may include at least one of physical layer, MAC layer, RLC layer, PDCP layer, and RRC layer parameters. The parameters may include the information for the radio bearers. The radio link connection control may be denoted herein as radio resource control.

D2D communication control section 204 also controls handover of the D2D connection between the user equipment 100 and the advanced user equipment 500.

More specifically, D2D communication control section 204 receives the measurement reports from advanced user equipment 500 or user equipment 100 and determines whether or not user equipment 100 should hand over to closer neighboring advanced user equipment. Here, the designation of a "serving advanced user equipment" refers to that advanced user equipment that currently has the D2D connection with the user equipment. Alternatively, D2D communication control section 204 may receive the measurement reports from advanced user equipment 500 or user equipment 100 to determine whether or not the serving advanced user equipment should hand over to closer neighbor user equipment. In that regard, a connected user equipment denotes one that currently has the D2D connection with the advanced user equipment 500.

In addition, D2D communication control section 204 may control the radio resource for the D2D connections. More specifically, D2D communication control section 204 may assign the radio resource for a D2D connection so that it will not interfere with other D2D connection and vice versa. In this fashion the radio resource of one D2D connection will not overlap with remaining D2D connections. The radio resource may be indicated to the user equipment 100 and advanced user equipment 500 by radio resource control parameters. The parameters may include at least one of ID of the frequency domain resource, ID of identification of the time domain resource, and ID of identification of the code domain resource. The radio resource, which is assigned to the D2D connection, may be determined based on the number of the D2D connections in the cell or interference level in the frequency band in which the D2D communication operates.

Backhaul communication section 206 provides the downlink data received from core network 400 to Macro2D communication section 202. Similarly, Macro2D communication section 202 provides uplink data to backhaul communication section 206, which then transmits the uplink data to core network 400.

One of ordinary skill will readily appreciate that the functional blocks shown in FIGS. 10 and 11 for user equipment 100 and base station 200, respectively, would map to analogous components as discussed with regard to advanced user equipment 500. For example, the user equipment would require two analogous RF interfaces for Macro2D communication section 102 and D2D communication section 104. These RF interfaces would cooperate with appropriate processor such as a baseband processor and a host microprocessor.

Figure 12:
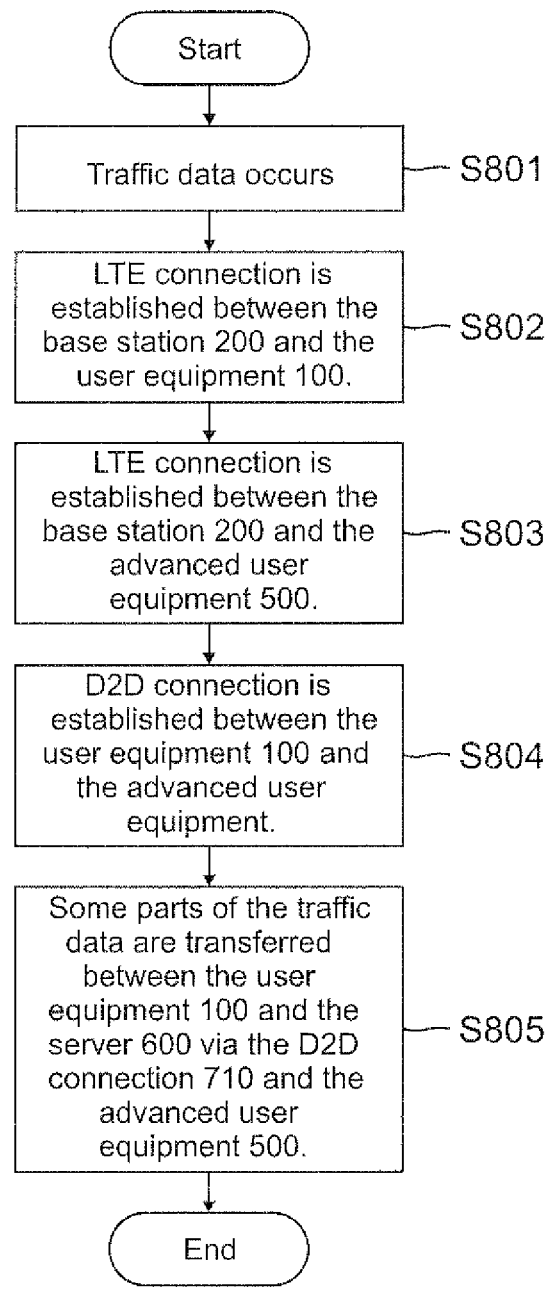
FIG. 12 is a flowchart for a D2D connection establishment method.

Operation of the mobile communication system described herein may be better understood with reference to the flowchart shown in FIGS. 12 and 12A, which address the establishment of connections in response to the occurrence of traffic data to be transmitted. The flowchart begins with a step S801 with the occurrence of traffic data, either uplink and/or downlink data. For example, the traffic data may correspond to sending/receiving e-mails, browsing web sites, downloading files, or uploading files.

In a step S802, an LTE connection 720 between base station 200 and user equipment 100 is established. If the connection is triggered by the user equipment, the user equipment may initiate the connection by random access procedures. If the connection is triggered by server 600, the base station may send a paging message to initiate the connection. Step S802 corresponds to Step A802 in FIG. 12A.

In a step S803, an LTE connection 730 between base station 200 and advanced user equipment 500 is established. Step S803 corresponds to Step A803 in FIG. 12A. The connection may be triggered by base station 200 using control signaling such as through RRC signaling. More specifically, it may be a paging signal. Step S803 may be conducted simultaneously with step S802. Alternatively, an LTE connection 730 may need to be continuously established. In such an embodiment, step S803 is omitted. If LTE connection 730 is continually established, advanced user equipment 500 may be turned on all the time, or it may be turned on only for predetermined on-duration. The predetermined on-duration may occur periodically. Even if advanced user equipment 500 is turned on all the time, it does not transmit signals in general when there is no traffic data or there is no D2D connection so as to not interfere with other communications in the frequency band. In addition to establishing LTE connection 730, various kinds of operations may be conducted in step S803. For example, advanced user equipment 500 may start measurements for D2D connection. In addition, advanced user equipment 500 may start sending pilot signals for D2D connection. Alternatively, the base station may communicate with the advanced user equipment 500 via a wired network or other wireless network instead of the LTE connection 730 in lieu of performing step S803. Such an alternative connection may be permanently maintained or intermittently maintained.

In a step S804, the D2D connection between the user equipment and the advanced user equipment (D2D connection 710) is established. The base station orders the user equipment and/or the advanced user equipment to configure D2D connection 710. The parameters for D2D connection 710 are transmitted from base station 200 to the user equipment and the advanced user equipment. Furthermore, the establishment of the D2D connection may be reported to the base station by the user equipment and/or the advanced user equipment. The advanced user equipment may send pilot signals for initial access so that the user equipment may detect the advanced user equipment by receiving the pilot signals, and vice versa. Step S804 corresponds to Step A804 in FIG. 12A.

In a step S805, at least a portion of the traffic data is transferred between the user equipment and server 600 via D2D connection 710 and the advanced user equipment. The data transmitted in the D2D connection 710 may be data for some parts of radio bearers that are configured for the communication between user equipment 100 and server 600. More specifically, the data transferred via D2D connection 710 may be at least one of best effort packets, non-real time service packets, and real time service packets. The data transferred via D2D connection 710 includes U-plane data. Furthermore, C-plane data may be transmitted in LTE connection 720 instead of D2D connection 710. The backhaul link from the advanced user equipment need not carry all the uplink U-plane data from the user equipment. Thus, a portion of the U-plane data may be transmitted in LTE connection 720 instead of D2D connection 710. Step S805 corresponds to Step A805 in FIG. 12A.

The process flow shown in FIG. 12 may be described in terms of the operations by the base station, the user equipment, and the advanced user equipment. For example, advanced user equipment 500 operations comprise establishing the LTE connection with base station 200 (step S803), establishing the D2D connection with user equipment 100, and transferring at least a portion of the uplink and downlink U-plane data. Similarly, user equipment 100 operations include establishing the LTE connection with the base station (step S802), establishing the D2D connection with the advanced user equipment, and transferring at least a portion of the uplink U-plane data over D2D connection 710 to the advanced user equipment. Finally, the base station operations include establishing LTE connection 720 with user equipment 100 (step S802), establishing LTE connection 730 with advanced user equipment 500 (step S803), and transmitting control signaling for establishing D2D connection 710.

Figures 13, 14:
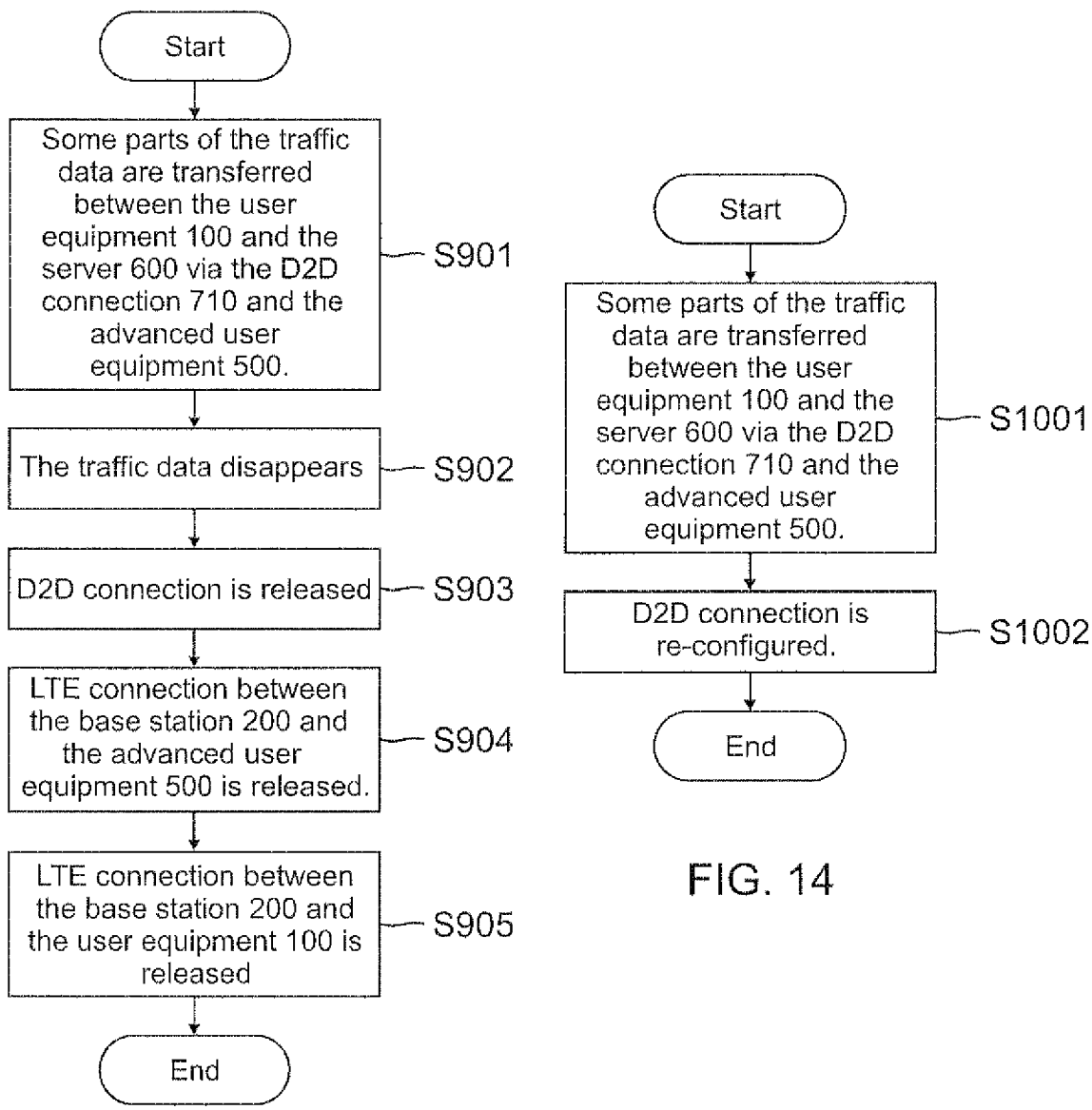
FIG. 13 is a flowchart for a D2D link release method.
FIG. 14 is a flowchart for a D2D link reconfiguration method.

The process flow of FIG. 12 may be continued in FIG. 13, which is directed to the release of connections in response to the lack of traffic data to be transmitted. The process continues with a step S901, which is the same as step S805 of FIG. 12.

In a step S902, there is no more traffic data to be transmitted through advanced user equipment 500. More specifically, such a lack of traffic data may correspond to the end of sending/receiving e-mails, browsing web sites, downloading files, or uploading files.

In a step S903, D2D connection 710 between user equipment 100 and advanced user equipment 500 may be released. Base station 200 orders user equipment 100 and/or the advanced user equipment 500 to release the D2D connection 710. Alternatively, user equipment 100 or advanced user equipment 500 may themselves trigger the release of D2D connection 710. The release of the D2D connection may be reported to the base station by the user equipment and/or the advanced user equipment.

In a step S904, LTE connection 730 between base station 200 and advanced user equipment 500 is released. The release may be triggered by base station 200 or advanced user equipment 500 using control signaling. The control signaling may comprise RRC signaling. Step S904 may be conducted simultaneously with the step S905. In embodiments in which LTE connection 730 is continually maintained, step S904 is omitted. In addition to releasing LTE connection 730, some other operations may be conducted. For example, advanced user equipment 500 may stop measurements for the D2D connection. In addition, advanced user equipment 500 may stop sending pilot signals for D2D connection. In embodiments in which the base station communicate with the advanced user equipment 500 via a wired network or other wireless network instead of the LTE connection 730, step S904 may comprise the release of the wired network or the other wireless network. Alternatively, the base-station-to-advanced-user-equipment connection through a wired network or the other wireless network may be continually maintained such that step S904 may be omitted.

In a step S905, LTE connection 720 between base station 200 and user equipment 100 is released. This release may be triggered by base station 200 or user equipment 100.

The process flow shown in FIG. 12 may be described in terms of the operations by the base station, the user equipment, and the advanced user equipment. For example, the advanced user equipment operations comprise transferring data over the D2D connection in step S901, releasing the D2D connection in step S903, and releasing the LTE connection with base station 200 in step S904. Similarly, the user equipment operations comprise transferring uplink data over (and receiving downlink data via) D2D connection in step S901, releasing the D2D connection with user equipment 100 in step S903, and releasing the LTE connection with the base station in step S905. Finally, the base station operations comprise transmitting control signaling for releasing the D2D connection 730 in step S903, releasing the LTE connection with advanced user equipment 500 in step S904, and releasing the LTE connection with user equipment 100 in step S905.

The D2D connection may need to be reconfigured as shown in the flowchart of FIG. 14. This reconfiguration takes place with regard to data traffic over an existing D2D connection in an initial step S1001. Step S1001 of FIG. 14 is the same as step S805 of FIG. 12.

In a step S1002, the D2D connection 710 is re-configured. More specifically, some of the parameters for D2D connection 710 are changed. The parameters may include at least one of parameters for: frequency domain resource, time domain resource, code domain resource, pilot signals for D2D connection 710, initial access for D2D connection 710, the radio bearers, or power control for D2D connection 710. Base station 200 may order for user equipment 100 and/or the advanced user equipment 500 to reconfigure the D2D connection 710. That is, the base station 200 transmits control signaling for reconfiguration to the user equipment 100 and/or the advanced user equipment 500, and the user equipment 100 and the advanced user equipment 500 reconfigures D2D connection 710 accordingly. The parameters for the power control include the information on the maximum transmission output power in D2D connection 710.

Figure 15:
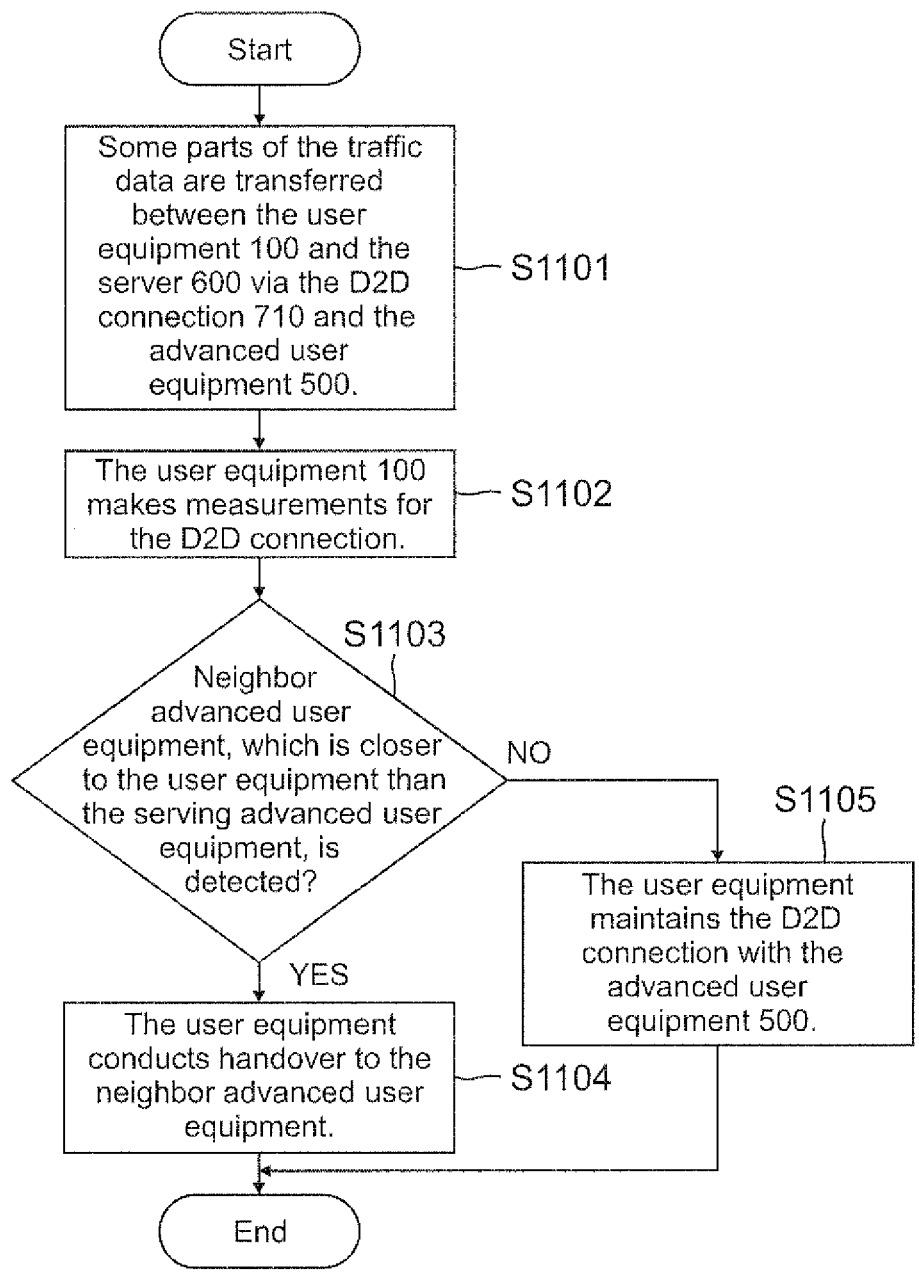
FIG. 15 is a flowchart for a D2D link handover method.

Not only may D2D connection 710 be reconfigured but the connection may also be handed off to a new advanced user equipment as shown by the flowchart of FIG. 15. This flowchart begins with data traffic over an existing D2D connection in a step S1101, which is thus the same as step S805 of FIG. 12. In a step S1102, user equipment 100 makes measurements for neighbor advanced user equipment. More specifically, user equipment 100 measures for the radio link quality of signals transmitted by the neighbor advanced user equipment. The radio link quality may be at least one of: pilot signal received power, path loss, signal-to-interference ratio, channel state information, channel quality indicator, and received signal strength indicator.

In a step S1103, user equipment 100 determines whether or not a neighboring advanced user equipment is closer to user equipment 100 than the current serving advanced user equipment. As used herein, a "serving advanced user equipment" refers to the advanced user equipment that is currently communicating with the user equipment 100. Should the determination in step S1103 be positive, user equipment 100 conducts a handover to the closest neighbor advanced user equipment in a step S1104. With regard to steps S1103 and S1104, user equipment 100 may send base station 200 measurement reports, which indicate that a closer neighbor advanced user equipment has been detected. In this case, base station 200 may order user equipment 100 to conduct the handover to the detected closer neighbor advanced user equipment. Base station 200 may also order for the serving advanced user equipment and the detected closer advanced user equipment to conduct the handover.

Figure 23:
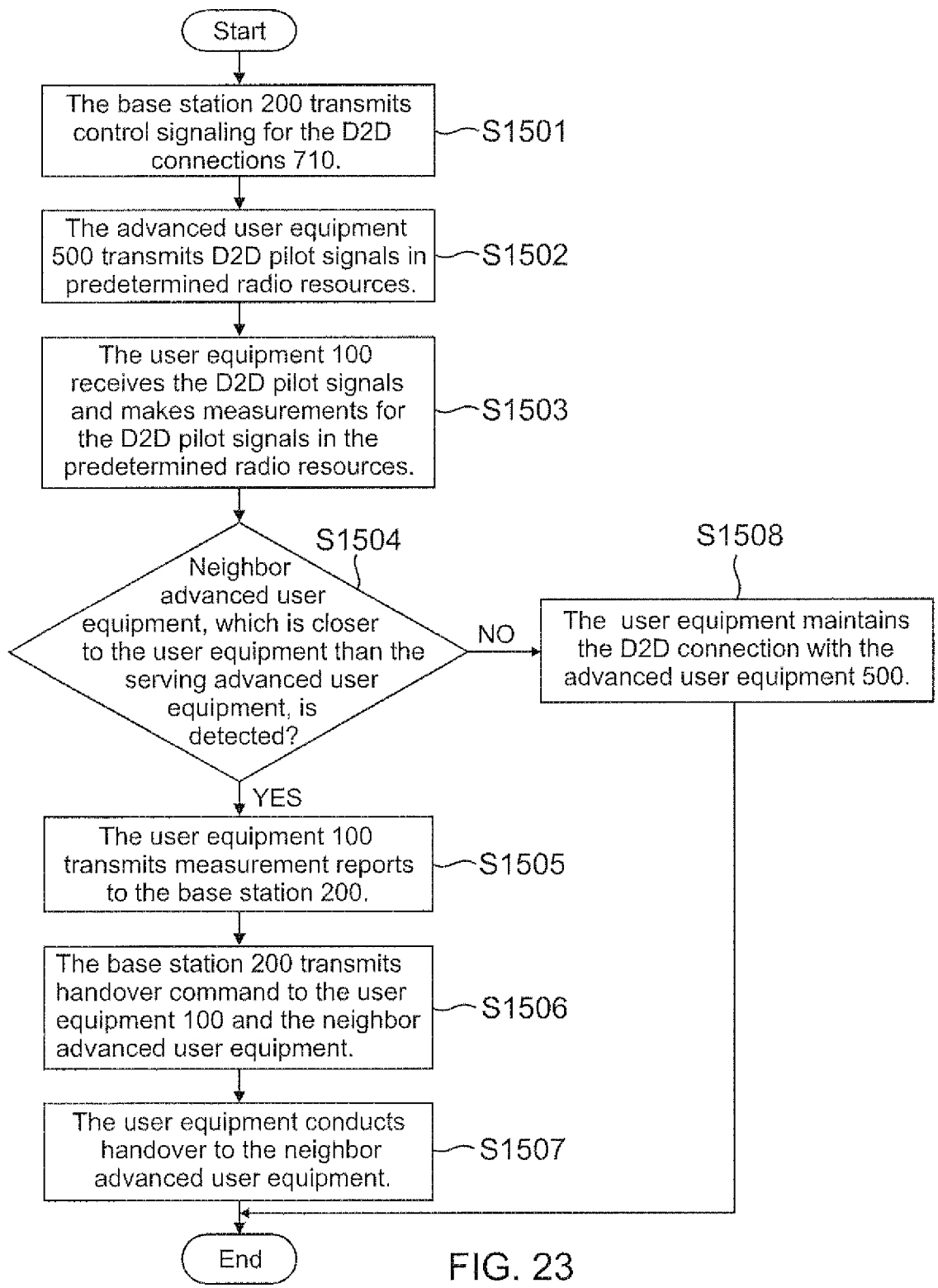
FIG. 23 is a flowchart for a D2D handover method.

As used herein, the phrase "the neighbor advanced user equipment is closer to the user equipment than the serving advanced user equipment" has the same meaning as "the radio link quality for the neighbor advanced user equipment is better than the radio link quality for the serving advanced user equipment." Handover in such a case is discussed further with regard to FIG. 23.

If the determination in step S1103 is negative, user equipment 100 maintains the D2D connection with serving advanced user equipment 500 in a step S1105. In steps S1101 to S1105, advanced user equipment 500 may make measurements for neighbor user equipment in place of the user equipment.

The operations shown in FIG. 15 may be described in terms of the operations in advanced user equipment 500 as follows. Advanced user equipment 500 operations comprise transferring data via D2D connection 710 (step S1101) and conducting handover procedures in step S1104. Similarly, user equipment 100 operations comprise transferring data via D2D connection 710 (step S1101), making measurements of D2D connection (step S1102), determining whether or not neighbor advanced user equipment is closer to the user equipment than the serving advanced user equipment (step S1103), conducting handover if the neighbor advanced user equipment is closer than the serving advanced user equipment (step S1104), and maintaining the D2D connection with the serving advanced user equipment (step S1105). Base station operations comprise transmitting control signaling for handover of the D2D connection (Step S1104).

Figure 16:
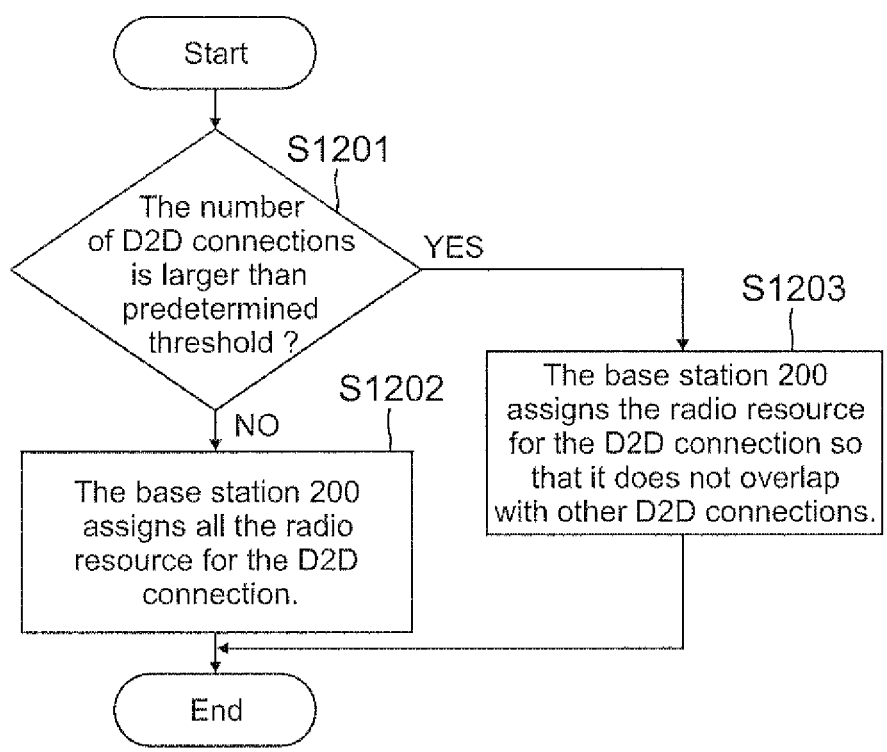
FIG. 16 is a flowchart for a radio resource allocation method for the D2D link.

Methods of operation also include monitoring to prevent D2D connections from interfering with one another. Such a scenario would arise if multiple user equipment are uploading or downloading through corresponding advanced user equipment such that the D2D connections could conflict with each other. Referring to FIG. 16, a flowchart is shown concerning a D2D connection conflict abatement method. In a step S1201, base station 200 determines whether or not the number of the D2D connections is larger than a predetermined threshold. Alternatively, base station 200 may define a congestion level, which may be determined based upon: the number of active user equipment, the number of the D2D connections, amount of traffic data, interference level in the D2D connection frequency band, and so on, to determine whether or not the congestion level is higher than a predetermined threshold. Should the determination in step S1201 be negative, base station 200 assigns all the available radio resources for D2D connection 710. To do so, base station 200 may send control signaling to user equipment 100 and advanced user equipment 500 to inform them of the assigned radio resources. Such a procedure may correspond to the reconfiguration procedures described in the step S1002 in FIG. 14.

If the determination in step S1201 is positive such that the number of the D2D connections is larger than the predetermined threshold, base station 200 assigns the radio resources for D2D connection 710 through control signaling so that the assigned radio resources do not overlap with the resources for other D2D connections. Such a partitioning of the radio resource can be in the time domain, frequency domain, or code domain. This procedure may also correspond to the reconfiguration procedures described in the step S1002 in FIG. 14.

Figure 17:
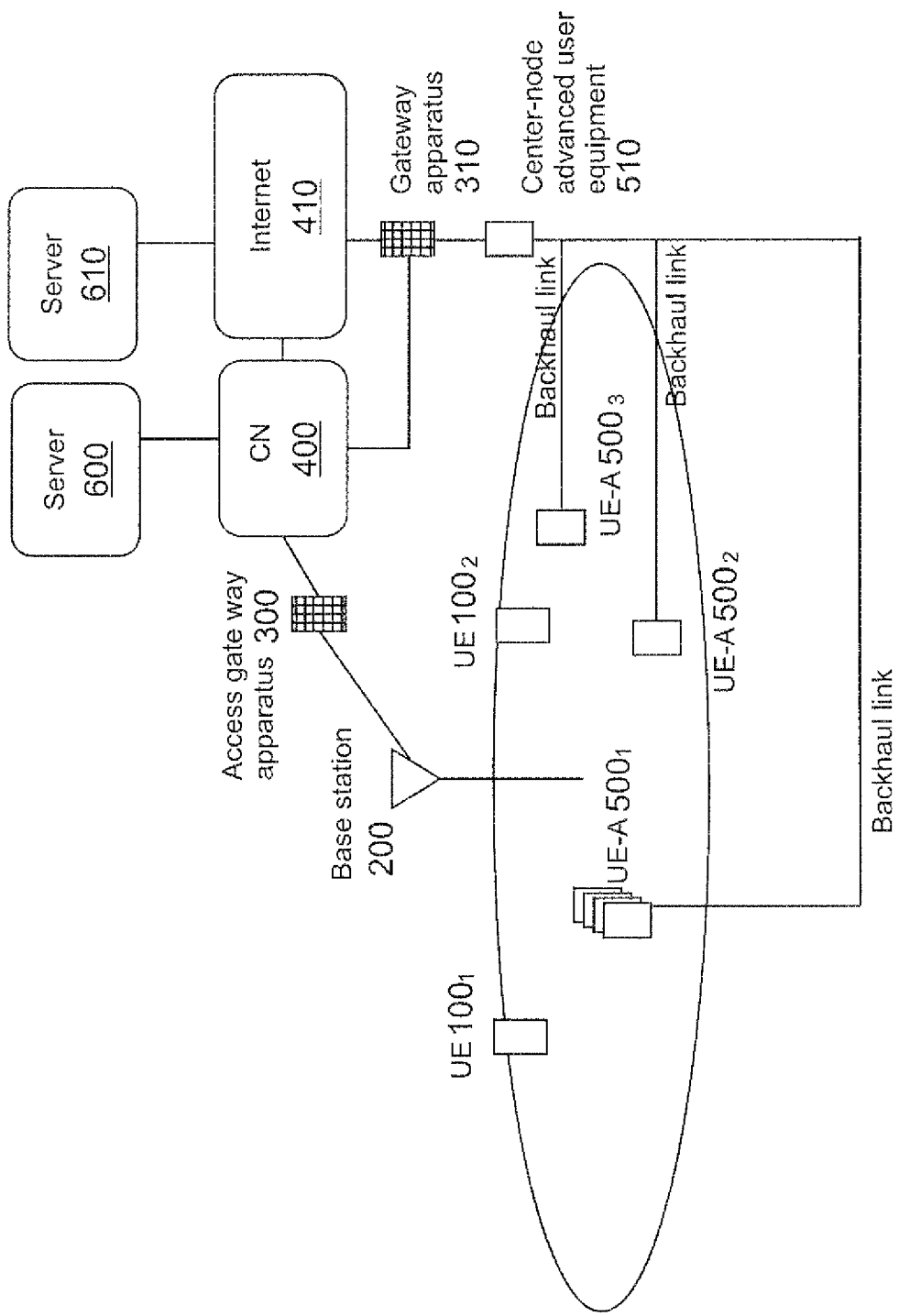
FIG. 17 illustrates an example architecture for the enhanced local area access system.

In the above examples, advanced user equipment 500 has a single D2D connection with a single user equipment 100, but it may be configured to have more than one D2D connections with more than one user equipment. More specifically, as illustrated in FIG. 17, advanced user equipment $500_1$ may support more than one D2D connections with more than one user equipment by consisting of more than one advanced user equipment within a single housing. Alternatively, advanced user equipment 500 may have multiple D2D communication sections 104 (FIG. 10) to support more than one D2D connection with more than one user equipment.

In the above examples, D2UE (D2D connection 710) and Macro2UE (LTE connections 720/730) transmissions can operate in different bands, but D2UE may operate concurrently in the same band as the Macro system (Macro2UE), in situations in which the distance between the UE-A and the UE is small enough to allow for a low transmit power that does not interfere with the Macro network.

In co-channel embodiments in which the D2D connection and the LTE connections share the same channel, base station 200 is aware that user equipment 100 will not respond to signaling by the base station in various frequency/time slots since the base station configures the D2D connection. In such embodiments, the D2D connection may be configured so as to allow transmission slots in which the Macro2UE (base station 200 to user equipment 100) and Macro2D (base station 200 to advanced user equipment 500) communications support continued connection and management by base station 200. For example, user equipment 100 can communicate with base station 200 in certain time slots, and user equipment 100 can communicate with the advanced user equipment in remaining time slots. In other co-channel embodiments, OFDM Resource Elements (RE) in various resource blocks (RBs) are reserved for each link. In one embodiment REs used for control signaling are not used by the D2UE link and thus are left blank in any D2UE link transmission. D2UE link transmissions, including its own control signaling to user equipment 100, are sent in other REs. In such an embodiment user equipment 100 is able to receive REs, e.g. control REs, from base station 200 concurrently with communication from advanced user equipment 500.

In the above examples, the D2UE link uses an LTE-based radio interface but in alternative embodiments the D2UE link may use another radio-system-based interface. For example, the D2UE link may comprise a WCDMA interface, a CDMA2000 interface, a WiFi or WiMAX interface, a TD-SCDMA interface, or a TD-DCMDA-based interface. For example, if the D2UE link uses a WiFi-based radio interface, a WiFi access point may be regarded as the advanced user equipment. In such an embodiment, D2D communication section 504 in advanced user equipment 500 communicates with user equipment 100 utilizing the WiFi radio interface, and the radio resource control of the WiFi radio interface may be controlled by base station 200. Control signaling for the radio resource control may be transmitted in the LTE connection 720 and the LTE connection 730.

Mobility Procedures, Radio Resource Management, and Radio Bearer Assignment

In mobile communication systems, mobility procedures, such as cell identification, measurements, handover, cell selection/reselection and the like, are quite important, because mobile communication connectivity should be maintained even when a mobile station (user equipment) moves from cell to cell. Note that if a mobile station tries to detect and measure neighbor cells very frequently, the connectivity is improved at the cost of battery consumption, which degrades service quality in the mobile communication system. A mobile station has to minimize the battery consumption in spite of its mobility procedures.

Figure 18:
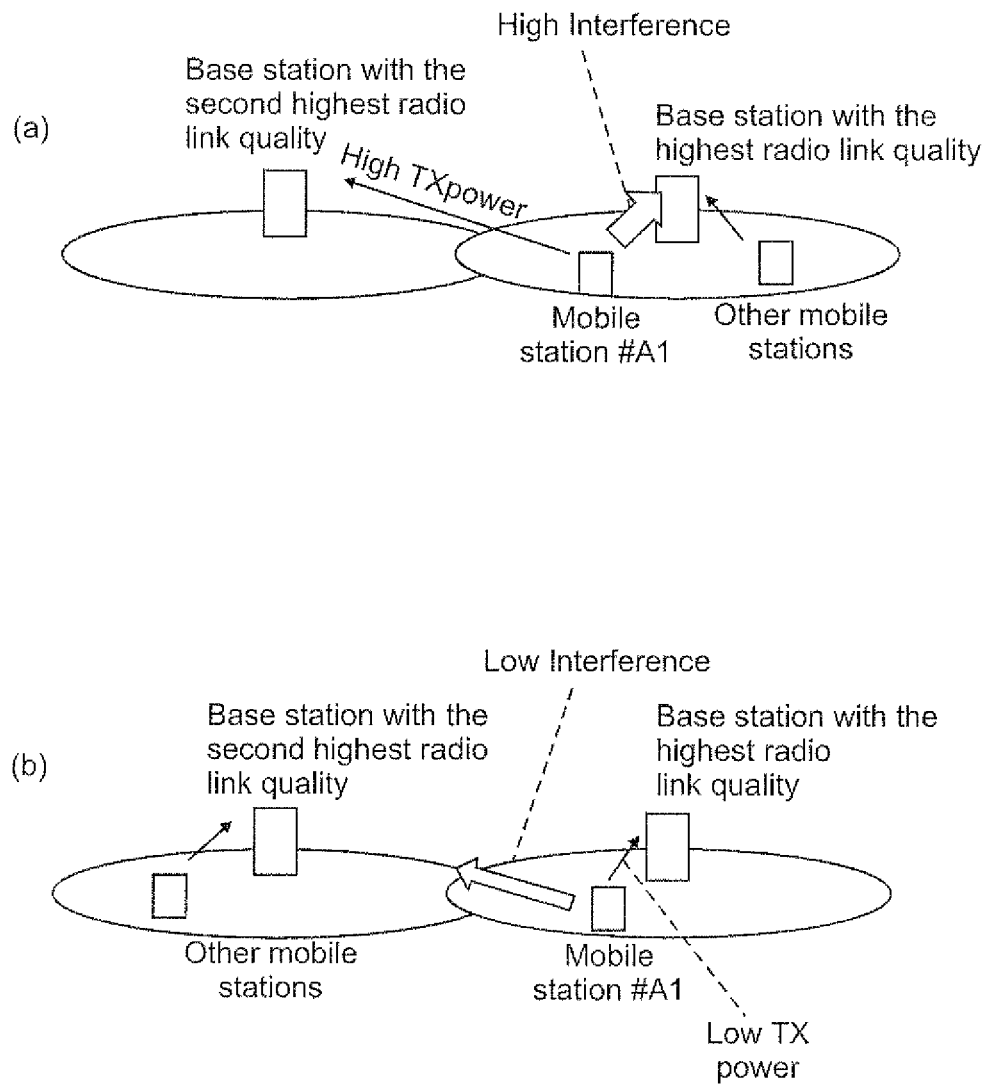
FIG. 18 (a) illustrates an advanced user equipment interfering with a neighboring base station.

Furthermore, mobility procedures are quite important also in terms of interference in the mobile communication systems. In particular, it is quite important that the mobile station communicate with a base station with the best possible radio link quality. The radio link quality is equivalent to at least one of path loss between the base station and the user equipment, pilot signal received power, and signal-to-interference ratio. If the mobile station does not communicate with the base station with the best possible link quality, i.e. it communicates with a second-best quality base station, it may interfere with other communications because its transmit power may be too high for other radio links, as illustrated in FIGS. 18 (a) and 18 (b). In particular, as seen in FIG. 18 (a), a mobile station A1 is linking with a base station that has a second-best link quality. This means mobile station A1 must transmit with relatively high power that then interferes with the base station having the best link quality. In contrast, mobile station A1 in FIG. 18 (b) is linking with the base station having the best link quality. Thus, mobile station A1 in FIG. 18 (b) may transmit at a relatively low power level that causes reduced interference at the neighboring base station.

The resulting interference may be intra-frequency interference, or may be inter-frequency interference. In the inter-frequency interference case, adjacent channel interference in the transmitter side or receiver blocking characteristics in the receiver side may degrade the quality in other communication bands. The interference issues may be handled by not only the mobility procedures, but also other radio resource management procedures. In short, the mobility procedures and other radio resource management procedures should be appropriately conducted in the mobile communication systems to achieve good quality connectivity, long battery life, less interference in the system, and other benefits.

Furthermore, pilot pollution problems may take place in addition to the abovementioned interference problems. If a pilot signal transmitted by one cell collides with the pilot signal transmitted by another cell, the colliding pilot signals interfere with each other if they are not orthogonal with each other. If the user equipment needs to make measurements for multiple cells for which received signal power is strong in the user equipment receiver, signal-to-interference ratio (SIR) for each cell is degraded due to the interference and cell search/measurement performance is deteriorated. It is noted that the cell search and measurements for low SIR cells need more power consumption than those for high SIR cells, because it needs more time for cell search and measurements.

Embodiments for mobility procedures and radio resource management such as cell identification, measurements, handover, cell selection/reselection, changing transport formats, call admission control, radio resource control, link adaptation control, power control, releasing connections and the like will now be discussed. The following procedures are more detailed examples for the RRC connection state control for D2D connection 710. In the hybrid D2UE and Macro2UE system disclosed herein, such mobility procedures and radio resource management procedures are conducted in the D2UE link and/or in the Macro2UE link. In the following examples, it is assumed that the carrier frequency in the D2D connection is 3.5 GHz, and the LTE connections between the base station and the user equipment/advance user equipment is 2 GHz. It will be appreciated that the frequency bands are just examples such that other frequency bands can be applicable in other embodiments.

It will be appreciated that base station 200 controls the establishment and release of D2D connection 710. In that regard, base station 200 controls the RRC layer for D2D connection 710. In the following embodiments, base station 200 also controls the MAC layer for D2D connection 710 with regards to radio resource allocation and also transport format selection. However, in alternative embodiments, UE-A could control the MAC layer. Thus, in such alternative embodiments, UE-A would manage radio resource allocation and transport format selection in an analogous fashion as discussed below for base-station-controlling-the-MAC-layer embodiments or in a fashion analogous to conventional LTE base station controlling the MAC/physical layers.

In one embodiment, the base station also determines what portion of the user-plane data that will be transmitted through the base station as opposed to being offloaded to the D2D connection. Because the base station receives traffic measurements indicating the radio link quality and other parameters for the D2D link, the base station is a convenient node for such a "data gateway" decision (whether the user equipment should exchange user-plane data with the base station in a convention fashion or whether the user equipment should instead exchange the user-plane data with the advanced user equipment using the D2D communication link). However, in alternative embodiments, other network nodes can make this data allocation decision.

Figure 19:
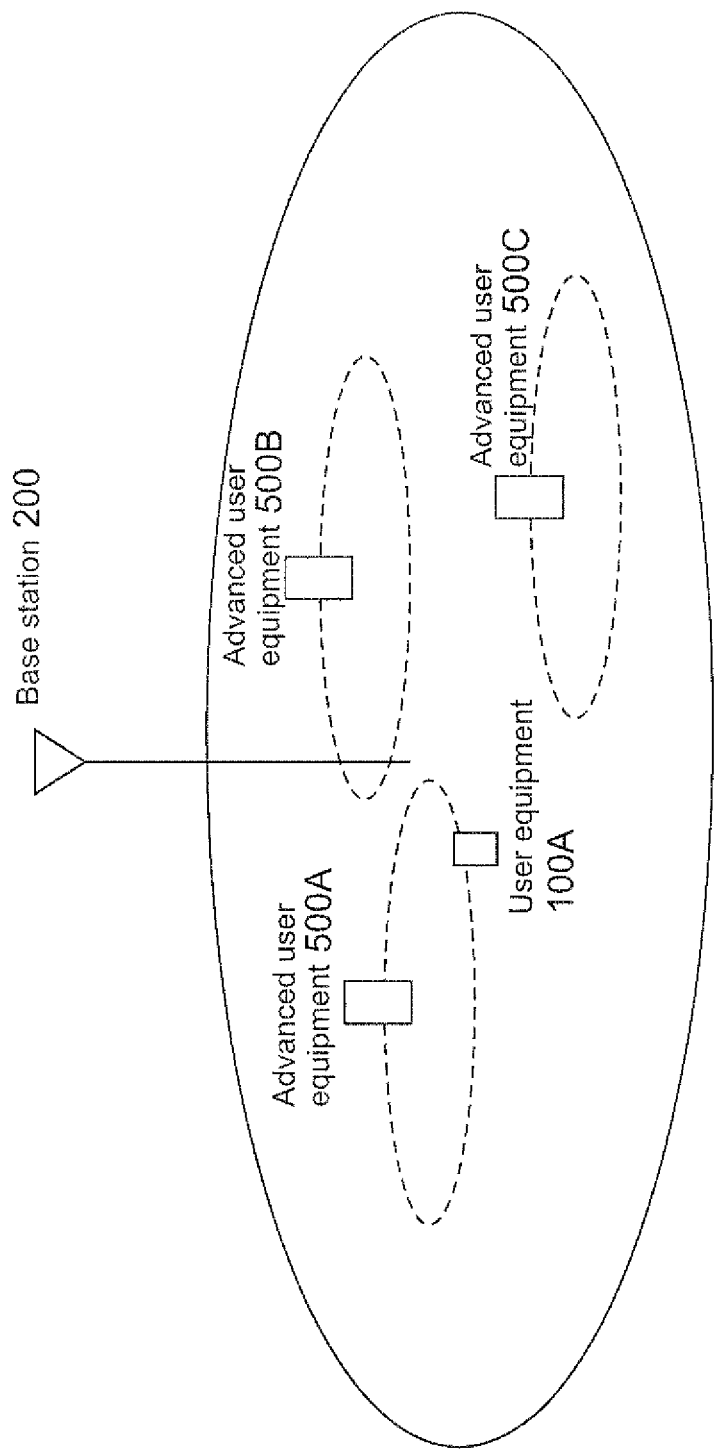
FIG. 19 illustrates a plurality of advanced user equipment arrayed about a base station.

FIG. 19 illustrates a radio communication system embodiment. The illustrated system is analogous to that described earlier with regard to FIG. 1 but is slightly modified so that the mobility procedures and radio resource management for the radio communication system can be illustrated. In FIG. 19, three advanced user equipment (500A, 500B, 500C) are shown for illustrative purposes.

Figure 20:
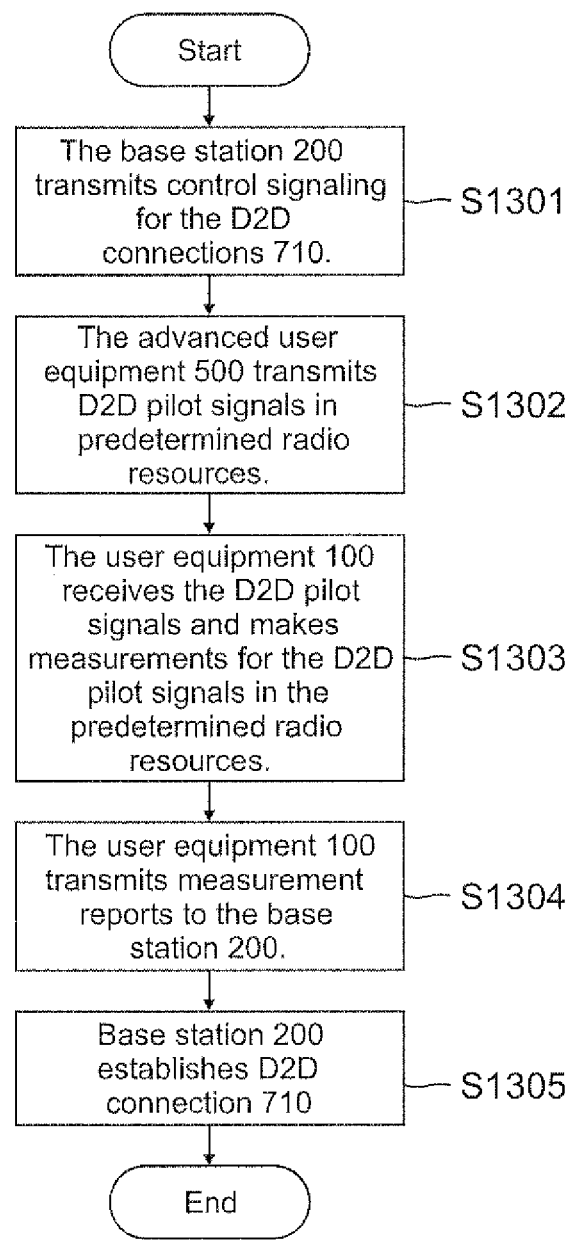
FIG. 20 is a flowchart for a user equipment traffic measurement method.

Referring to FIG. 20, an operation of the mobile communication system in accordance with an embodiment is described. The operation is related to the establishment of the D2D connection 710 as discussed earlier for step S804 of FIG. 12. In a step S1301, base station 200 transmits control signaling for the D2D connection 710 to user equipment 100 and advanced user equipment 500. The control signaling may be transmitted over the LTE connections set up in steps S802 and S803 in FIG. 12. Alternatively, the control signaling may be transmitted as parts of broadcast information to user equipment 100 and advanced user equipment 500.

The control signaling transmitted in step S1301 may include at least one of information on: frequency resource for D2D pilot signals, time resource for the D2D pilot signals, and code resource for D2D pilot signals. Some examples for the D2D pilot signals are explained later The control signaling may also include information on transmission power for the D2D pilot signals. More specifically, the transmission power for the D2D pilot signals may be transmitted as one information element of the control signaling. In addition, the control signaling may include information on measurement behaviors in user equipment 100. Moreover, the control signaling may include information on transport formats in D2D connection 710. The details of the transport formats are explained below.

Figure 21:
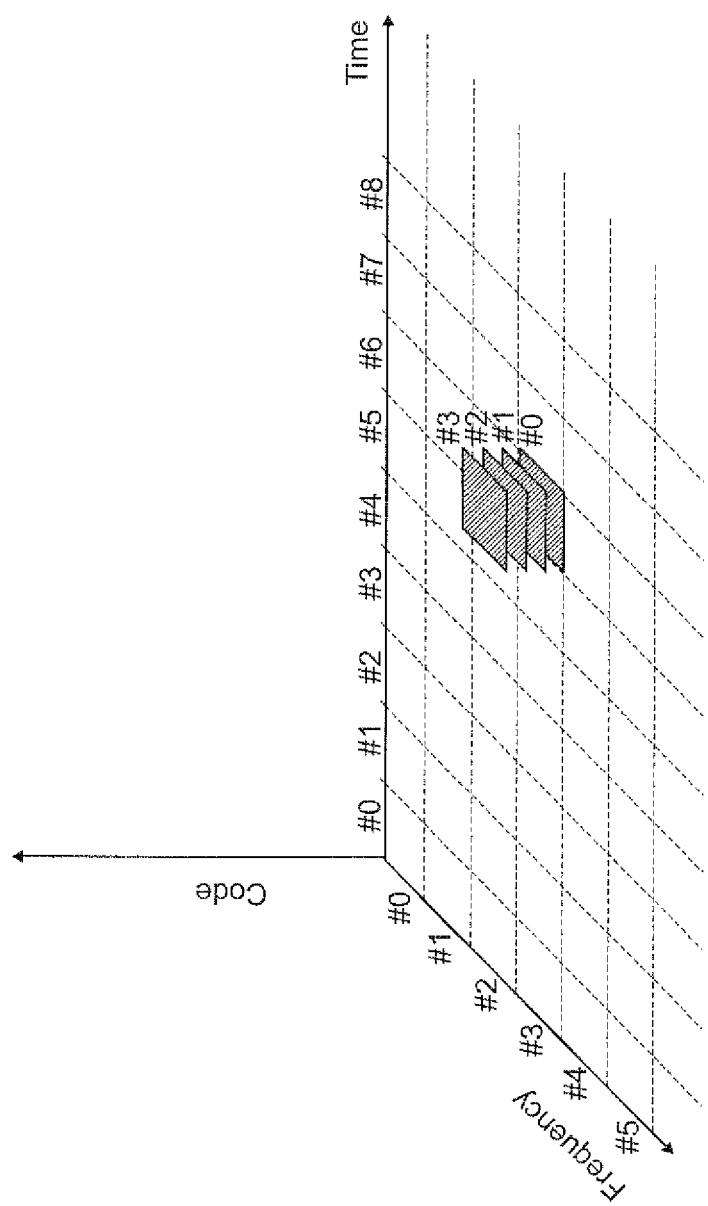
FIG. 21 illustrates the time, frequency, and code relationship for a plurality of D2D pilot signals.

In a step S1302, advanced user equipment 500 transmits the D2D pilot signals in predetermined radio resources. For example, advanced user equipment 500A, 500B, 500C of FIG. 19 transmit the D2D pilot signals in the predetermined radio resources (the time, frequency, or code resources assigned in step S1301). Information on the predetermined radio resources may be signaled by the control signaling described in the step S1301. More details of the D2D pilot signals are shown in FIG. 21 discussed further below.

In a step S1303, user equipment 100 receives the D2D pilot signals, decodes the D2D pilot signals in the predetermined radio resources, and measures the D2D pilot signals. More specifically, user equipment 100 obtains radio link quality of D2D connections between itself and the (potentially multiple) advanced user equipment through the measurements. The radio link quality may be at least one of path loss, received power of the D2D pilot signal, signal to interference ratio (SIR) of the D2D pilot signal, received quality of the D2D pilot signal, and related criteria. User equipment 100 may detect the advanced user equipment which has the highest radio link quality based on the measurements.

The path loss may be derived from the received power of the D2D pilot signals and the transmission power of the D2D pilot signals, which are included in the control signaling in step S1301. The received quality of the D2D pilot signal may be the ratio of the receive power of the D2D pilot signal to the total received signal strength.

In a step S1304, the user equipment 100 transmits measurement reports to the base station 200. The measurement reports include the measurement results obtained in the step S1303. More specifically, the measurement reports may include the information on the advanced user equipment with the highest radio link quality. In other words, user equipment 100 may report the best advanced user equipment in terms of the radio link quality of D2D connections in step S1304. The information on the advanced user equipment may include an identification number of the advanced user equipment and the radio link quality of the advanced user equipment.

Furthermore, the measurement report may include information on the advanced user equipment with a less-than-highest radio link quality, i.e. the measurement report may include information on the advanced user equipment with the second or third highest radio link quality. Other radio link qualities such as a fourth highest or more may be included. Base station 200 in step S1301 may indicate how many radio link qualities should be included in the measurement report. Alternatively, the measurement reports may identify those advanced user equipment for which the radio link quality is higher than a threshold value. Base station 200 may set this threshold value in step S1301. In yet another alternative embodiment, the measurement reports may identify the advanced user equipment for which the radio link quality is lower than a threshold value as set by base station 200 in step S1301.

In a step S1305, base station 200 establishes the D2D connection 710. More specifically, the base station 200 establishes a radio link between user equipment 100 and the advanced user equipment with the highest radio link quality as reported in step S1304.

Base station 200 may assign the radio resource to the D2D connection 710 in addition to the establishment of D2D connection 710. More specifically, base station 200 may assign the radio resource between user equipment 100 and the advanced user equipment with the highest radio link quality as reported in step S1304. Base station 200 may assign a radio resource that is not used by other user equipment. For example, base station 200 may assign a radio resource that is not used by the D2D connection between the advanced user equipment with the highest radio link quality and other user equipment.

Furthermore, base station 200 may assign the radio resource that is not used by the advanced user equipment with the second or third highest radio link quality as reported in step S1304. The resulting D2D connection that is established in step S1305 can thus avoid interference with other D2D connections. Alternatively, base station 200 may assign a radio resource that not used by other advanced user equipment located near the advanced user equipment with the highest radio link quality. The base station may have location information for the advanced user equipment 500.

The transmission of D2D pilot signals in predetermined radio resources as discussed with regard to step S1302 may be better understood with regard to the example radio resource assignment shown in FIG. 21. In this example resource assignment, the frequency resource #3 is assigned as the frequency radio resource, and the time resource #6 is assigned as the time radio resource. Furthermore, the code resources are uniquely assigned to the advanced user equipment. For example, a code resource #0, a code resource #1, and a code resource #2 may be assigned to advanced user equipment 500A, 500B, and 500C, respectively. It is noted that the D2D connections are controlled by base station 200 as explained above, and therefore time synchronization is achieved for all the D2D connections, i.e. time slots for all the D2D connections are aligned with each other and the synchronization is achieved by the Macro2UE and Macro2D links. That is, the transmission timing of the D2D connections are based on the signals transmitted by base station 200, and therefore the transmission timing of the D2D connections are aligned with each other.

Figure 21A:
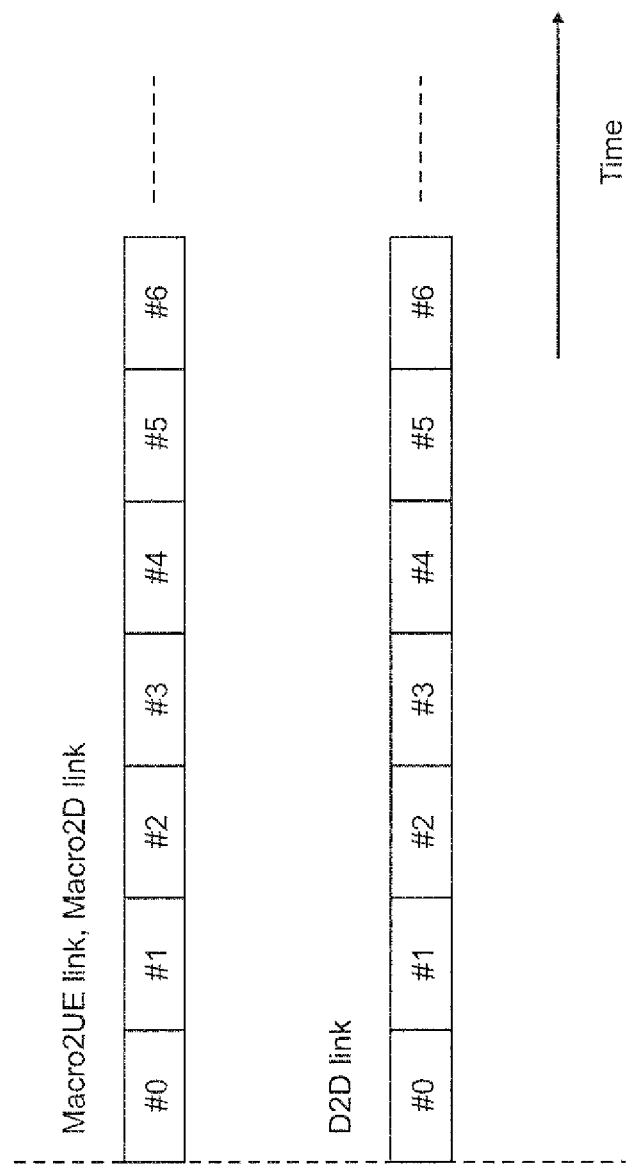
FIG. 21A shows a D2D link that is synchronized with a Macro2UE link.
Figure 21B:
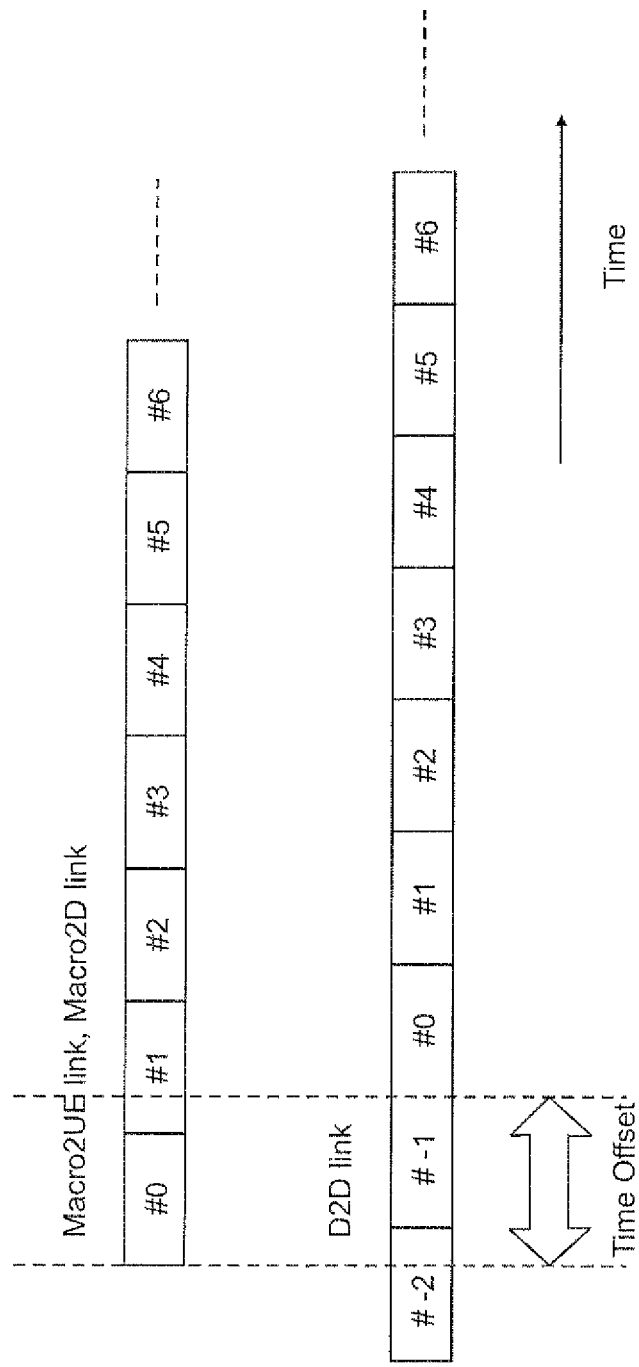
FIG. 21B shows a D2D link that is offset in time with regard to the Macro2UE link

Time synchronization based on the Macro2UE and Macro2D links will be explained further below. For example, as illustrated in FIG. 21A, the time slots for the D2D links may be completely aligned with those for the Macro2UE and Macro2D links. Alternatively, as illustrated in FIG. 21B, there may be a time offset between the time slots for the D2D links and the ones for the Macro2UE and Macro2D links.

Figure 21C:
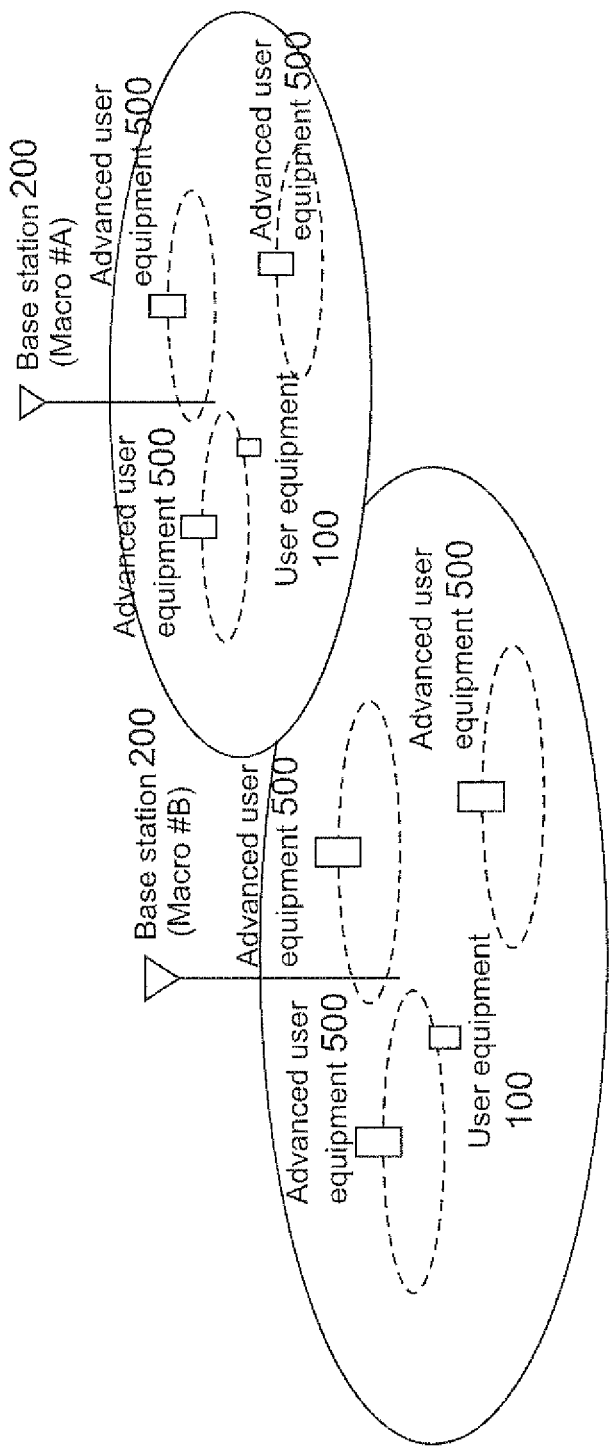
FIG. 21C illustrates multiple cells each having a plurality of advanced user equipment.
Figure 21D:
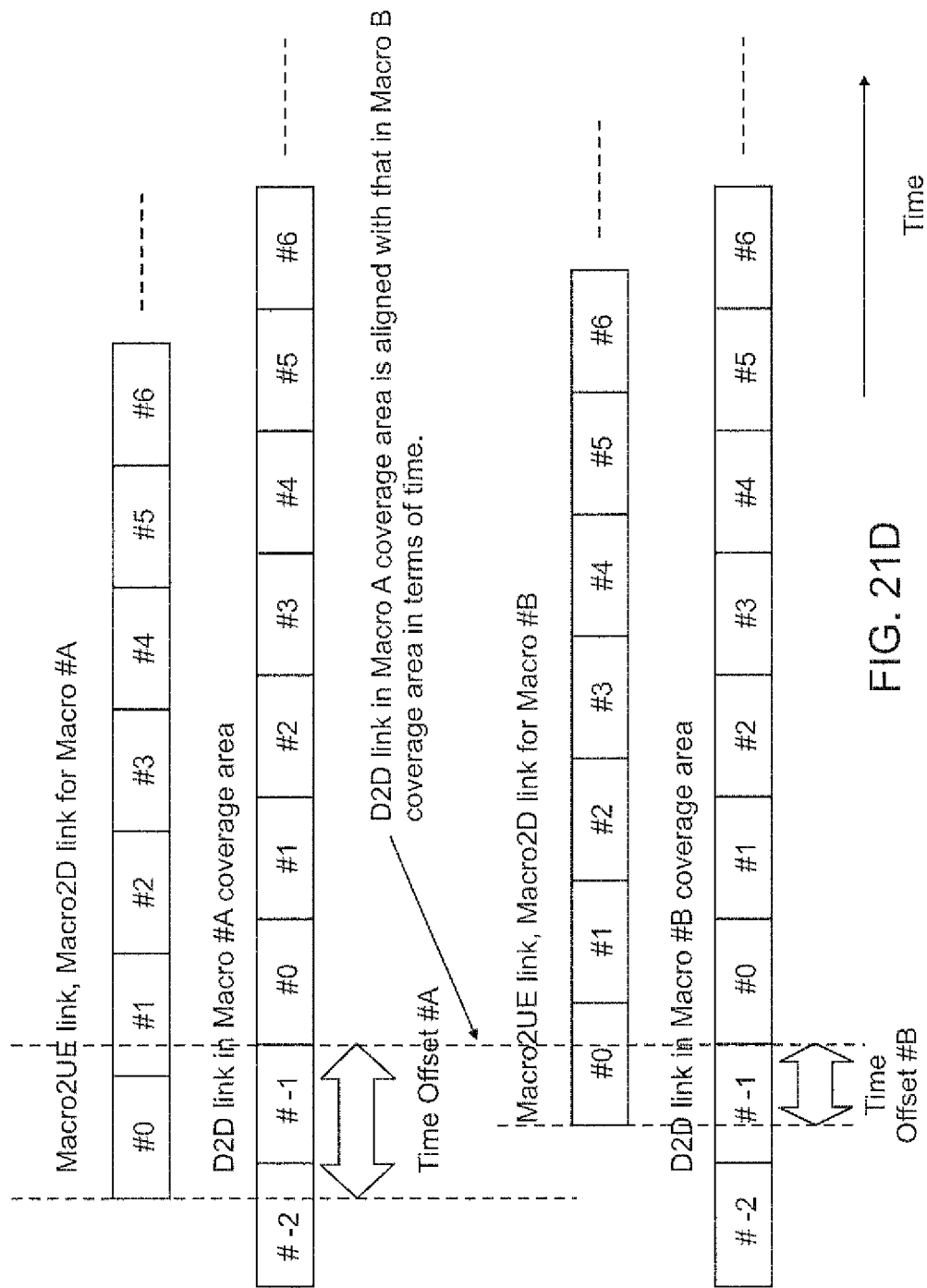
FIG. 21D illustrates a timing relationship between the D2D links in a plurality of macrocell coverage areas and the corresponding Macro2UE/Macro2D links.

Further details regarding a time offset embodiment are illustrated in FIGS. 21C and 21D. FIG. 21C illustrates explanatory views showing two macro coverage areas, where some advanced user equipment are deployed. The time offset between the time slots for the D2D links and the ones for the Macro2UE and Macro2D links may be individually specified for each macro coverage area. FIG. 21D illustrates explanatory views showing the time relation of Macro2UE links, Macro2D links and D2D links. A time offset # A is specified for the macro # A coverage area, and a time offset # B is specified for the macro # B coverage area. Each time offset can be specified so that all D2D links can be aligned with each other in terms of time. The base station may inform the user equipment and the advanced user equipment of the time offset value (time offset # A or time offset # B in FIG. 21D) as part of the control signaling. The time offset value may be included in the control signaling in step S1301 of FIG. 20. As a result, even if there is no time synchronization for the macro network, i.e. Macro # A is not aligned with Macro # B in terms of time, D2D links in the macro # A coverage area can be aligned with those in the macro # B coverage area as illustrated in FIG. 21D.

Referring again to FIG. 21, user equipment 100 need only decode the D2D pilot signals transmitted by multiple advanced user equipment in the predetermined radio resources (the frequency resource #3 and the time resource #6) so that power consumptions for decoding the D2D pilot signals can be minimized. In this fashion, user equipment 100 does not have to achieve battery-consumed time synchronization with multiple advanced user equipment (as analogously performed for conventional time synchronization in LTE using PSS/SSS) because the synchronization has already been achieved by the Macro2UE and Macro2D links. The resulting synchronization reduces complexity for cell identification and thus reduces the power consumption for the cell identification.

With regard to code resources, a CAZAC (Constant Amplitude Zero AutoCorrelation) sequence may be used for the code. More specifically, a Zadoff-Chu sequence may be used for the code resource. Alternatively, a Walsh sequence or other suitable orthogonal sequences may be used for the code resource. In an orthogonal code embodiment, the code sequences from a given advanced user equipment are orthogonal to the sequences used by neighboring advanced user equipment. In addition, partially orthogonal code sequences may used for the advanced user equipment. In such an embodiment, some code sequence pairs may be orthogonal with each other, but others may not be orthogonal with each other.

Orthogonal code sequences do not interfere with each other. As a result, so-called pilot pollution problems can be avoided, even when the D2D pilot signals transmitted by multiple advanced user equipment collide with each other. Moreover, power consumptions for cell search and measurements can be reduced, because SIR for the D2D pilot signals can be improved by avoiding the pilot pollution problems.

In yet another alternative embodiment, a physical random access channel (PRACH) or a physical channel similar to PRACH may be used for the D2D pilot signals. PRACH is defined as an LTE physical channel in TS 36.211. Under such a scheme, advanced user equipment 500 transmits a random access preamble in the predetermined radio resource. The random access preamble may be assigned to advanced user equipment 500 by the base station 200. In this sense, the random access preamble is equivalent to a dedicated random access preamble. User equipment 100 can re-use the function of the conventional LTE function and reduce the complexity to support the D2D connections by using PRACH as the D2D pilot signals.

The D2D pilot signals may be transmitted infrequently as described above. For example, the D2D pilot signals may be transmitted once per second. Since time synchronization is achieved by utilizing the Macro2UE or Macro2D link, the D2D pilot signals do not have to be transmitted frequently. As a result, user equipment 100 need only decode the D2D pilot signals once per 1 second, which minimizes power consumptions for the measurements. Furthermore, the D2D pilot signals are transmitted much less frequently than the common reference signals or the synchronization signals in LTE, which minimizes interference caused by the D2D pilot signals. The periodicity of the D2D pilot signals may be very large, e.g. 1 second or 2 seconds, or may be reasonably large, e.g. 100 milliseconds or 200 milliseconds. In very large periodicity embodiments, the power consumption for measurements and the interference issues can be reduced significantly, but the user equipment 100 may need more time to detect neighbor advanced user equipment and make measurements for them because it needs some measurement samples to achieve good accuracy. As a result, latency of mobility procedures may be increased. In case that the periodicity is reasonably large, the power consumption for measurements and interference issues may be reduced to some extent, but the latency will be decreased. So, the periodicity of the D2D pilot signals can be optimized based on the above aspects, such as power consumption for measurements, interference issues, latency of mobility procedures, and the like. The periodicity of the D2D pilot signals may be network configurable so that base station 200 may inform the user equipment and advanced user equipment of the periodicity by utilizing the control signaling such as in step S1301.

If the user equipment does not support multiple radio frequency components to enable simultaneous transmission/reception for a frequency carrier in LTE connection 720 and for a frequency carrier in D2D connection 710, the user equipment may stop transmitting/receiving signals in LTE connection 720 during the time when the D2D pilot signals are transmitted so that the user equipment can make measurements for D2D connection 710. In this case, the base station may consider such behaviors of the user equipment in its scheduling of the LTE connection 720, i.e. the base station may avoid assigning radio resource to the user equipment 100 during the time when the D2D pilot signals are transmitted.

Similarly, if the advanced user equipment does not support multiple radio frequency components to enable simultaneous transmission/reception for a frequency carrier in LTE connection 730 and for a frequency carrier for the D2D connection 710, the advanced user equipment 500 may stop transmitting/receiving signals in LTE connection 730 during the time when the D2D pilot signals are transmitted so that the advanced user equipment can send the D2D pilot signals in D2D connection 710. In this case, the base station may consider such behaviors of the advanced user equipment 500 in its scheduling for LTE connection 730, i.e. the base station may avoid assigning radio resource to advanced user equipment 500 during the time when the D2D pilot signals are transmitted.

The D2D pilot signal may be denoted as a D2D sounding reference signal or a D2D synchronization signal. The D2D pilot signal may be distributed in the frequency domain so that signal strength fluctuation due to Rayleigh fading may be suppressed and more accurate measurements for the radio link quality may be achieved.

Figure 22:
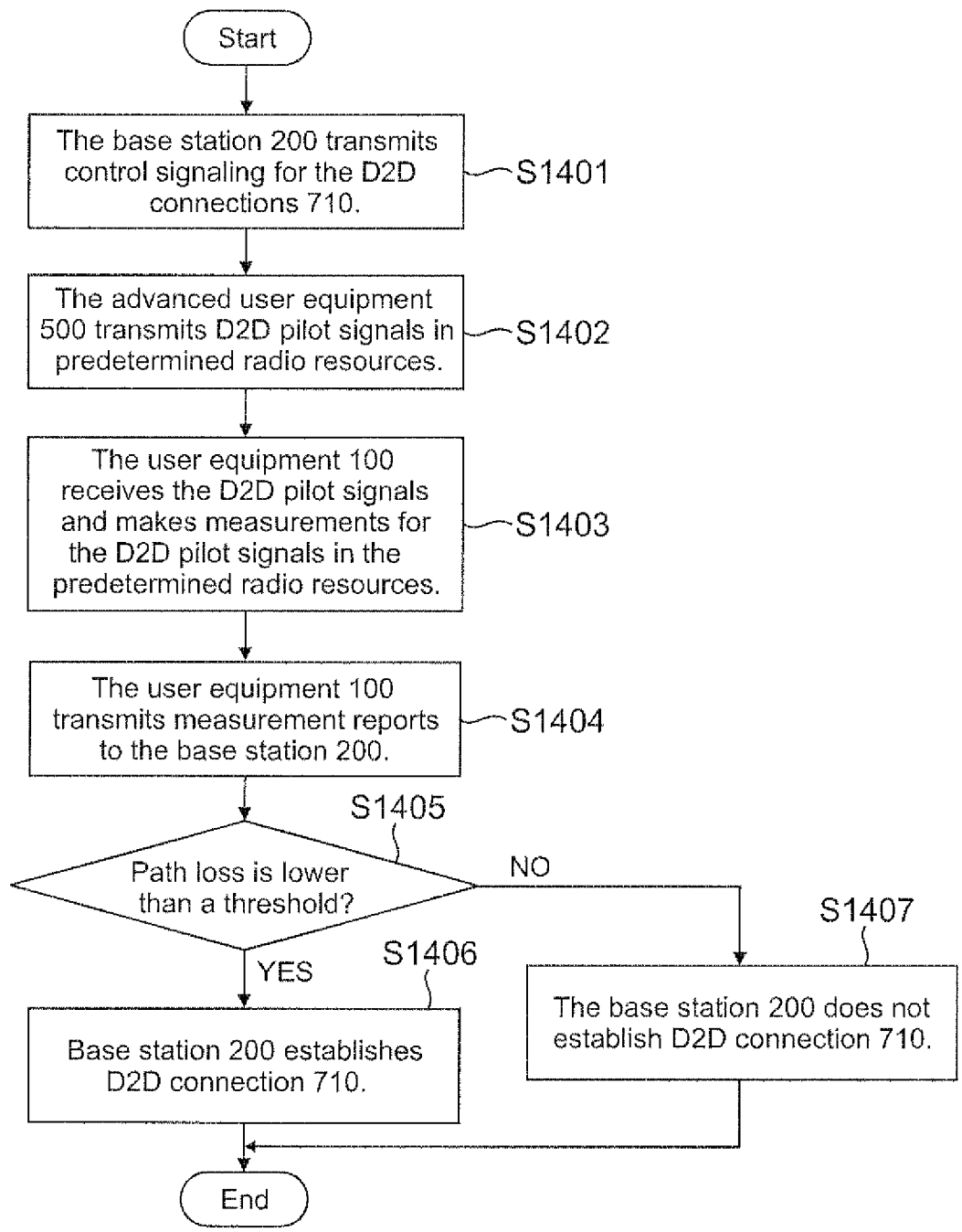
FIG. 22 is a flowchart for a D2D link establishment method.

Referring to FIG. 22, a method of operating a mobile communication system is illustrated for implementing step S804 of FIG. 12 with regard to the establishment of the D2D connection. Initial steps S1401 to S1404 are the same as steps S1301 to S1304 described above with regard to FIG. 20. In a step S1405, base station 200 determines whether the path loss is lower than a threshold. More specifically, base station 200 determines whether the path loss for the advanced user equipment with the highest radio link quality is lower than the threshold.

If the determination in step S1405 is positive, base station 200 establishes the D2D connection 710 in the step S1406 (such an establishment may also be considered to include the assignment of the radio resources). Step S1406 is thus analogous to step S1305 discussed above. Conversely, if the determination in step S1405 is negative, base station 200 does not assign the radio resources for the D2D connection 710 in a step S1407 (which means of course that the D2D connection is not established). In such a case, user equipment 100 communicates with server 600 only over LTE connection 720 (there being no D2D connection). By denying a D2D connection in this fashion, interference issues are mitigated since otherwise the required transmission power in the D2D connection would be excessive to address the high path loss. Step S1405 could be performed using alternative criteria to the path loss, such as the received power of the D2D pilot signal, the received quality of the D2D pilot signal, the SIR of the D2D pilot signal, and other suitable factors.

In yet another alternative embodiment, the difference between the highest radio link quality and the second highest radio link quality may be utilized in lieu of the path loss determination of step S1405. If the difference is higher than a threshold, base station 200 may assign the radio resources to the D2D connection 710 (S1406). Conversely, if the difference is not higher than the threshold, base station 200, base station assigns no radio resources to the D2D connection 710 (S1407). If the difference is small, the D2D connection may cause interference with other connections. Therefore, such interference issues may be mitigated by utilizing the magnitude of the difference. The thresholded-difference embodiment may apply to a case where the advanced user equipment with the second or third highest radio link quality has D2D connections with other user equipment.

FIG. 23 is directed to an instantiation of steps S1103 through S1105 in FIG. 15. In the flowchart of FIG. 23, steps S1501 to S1503 are almost the same as the steps S1301 to S1303 of FIG. 20. The sole difference is that steps S1301 to S1303 are conducted before the D2D connection has been established whereas steps S1501 to S1503 are conducted after a D2D connection is already established. Even though the D2D connection is established, the user equipment has to make measurement for known or unknown neighbor cells.

In a step S1504, user equipment 100 determines whether neighbor advanced user equipment is closer to user equipment 100 than the serving advanced user equipment. As discussed previously, a "serving advanced user equipment" refers to the advanced user equipment that is currently communicating with user equipment 100. As discussed above, the radio link quality is used a proxy with regard to determining whether a neighboring advanced user equipment is closer than the serving advanced user equipment. Thus, if the radio link quality of the neighbor advanced user equipment is determined to be higher than that of the serving advanced user equipment, the determination in step S1504 is deemed to be positive.

In such a determination, hysteresis may be taken into account according to the following expression:

(Radio link quality of Neighbor cell)>(Radio link quality of Serving cell)+Hyst where Hyst corresponds to the hysteresis. For example, Hyst may be 3 dB. A time domain hysteresis may also be used such as a time-to-trigger. If the determination in step S1504 is positive, user equipment 100 transmits measurement reports to the base station 200 in a step S1505. The measurement reports report the positive detection of a closer neighbor advanced user equipment.

In a step S1506, base station 200 transmits a handover command to user equipment 100 and the neighbor advanced user equipment. Furthermore, base station 200 may inform the serving advanced user equipment that user equipment 100 is being handed over to the neighbor advanced user equipment.

In a step S1507, user equipment 100 conducts handover to the neighbor advanced user equipment.

If the determination in step S1504 is negative (the serving advanced user equipment being closest), user equipment 100 maintains the D2D connection with the advanced user equipment 500 in a step S1508.

Figure 24:
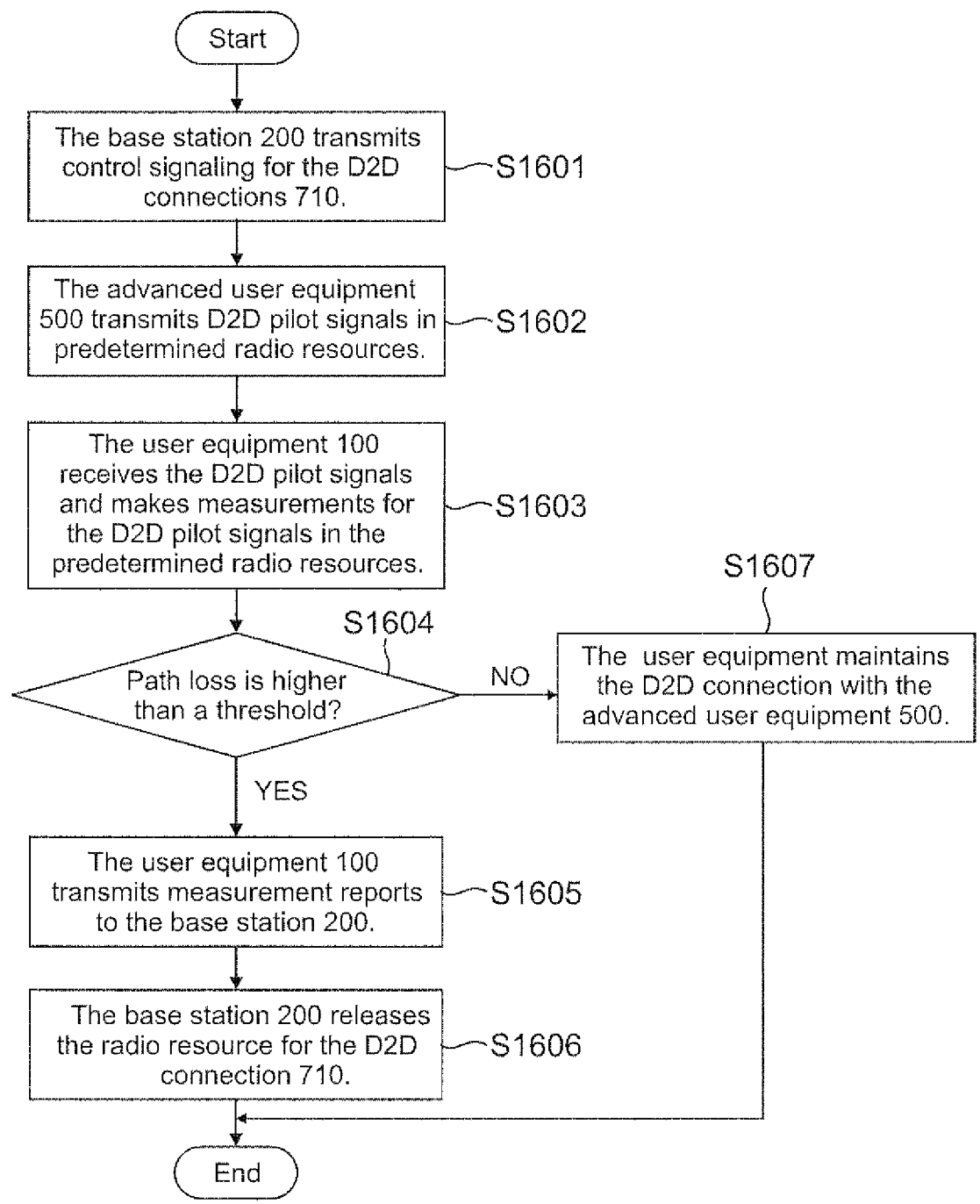
FIG. 24 is a flowchart for a D2D link measurement and release method.

Referring to FIG. 24, an operation of the mobile communication system according to the embodiment of the present invention is described. The operation is related to mobility control in the D2D connection 710 conducted while the D2D connection is already established. An initial set of steps S1601 to S1603 correspond identically to the set of steps S1501 to S1503 of FIG. 23.

In a step S1604, user equipment 100 determines whether or not the path loss for the serving advanced user equipment is higher than a threshold. Base station 200 may inform user equipment 100 of the threshold through the control signaling in step S1601. In steps S1602 and 1603, user equipment 100 measures the path loss by using the D2D pilot signals, but other signals or channels may be used for the path loss measurements. For example, pilot signals for the channel estimation or demodulation in D2D connection 710 may be used for the path loss measurements. The pilot signals for the channel estimation or demodulation may provide better accuracy for path loss measurements than the D2D pilot signals, which are used for mobility measurements. User equipment 100 may calculate the path loss based on the received power of the other signals or channels and the transmission power of the other signals or channels.

If the determination in step S1604 is positive, user equipment 100 transmits measurement reports to base station 200 in a step S1605. The measurement reports indicate that the path loss for the serving advanced user equipment is higher than the threshold.

In a step S1606, base station 200 releases the radio resource for D2D connection 710. More specifically, base station 200 sends control messages to command a release of the D2D connection 710. As a result, the D2D connection 710 is released accordingly.

If the determination in step S1604 is negative, user equipment 100 maintains the D2D connection with the advanced user equipment 500 in a step S1607. Step S1604 could be performed using alternative criteria to the path loss, such as the received power of the D2D pilot signal, the received quality of the D2D pilot signal, the SIR of the D2D pilot signal, and other suitable factors. Based on the radio resource management described in FIG. 24, non-interfering D2D connections may be maintained whereas interfering D2D connections may be released so that good system quality is maintained.

Figure 25:
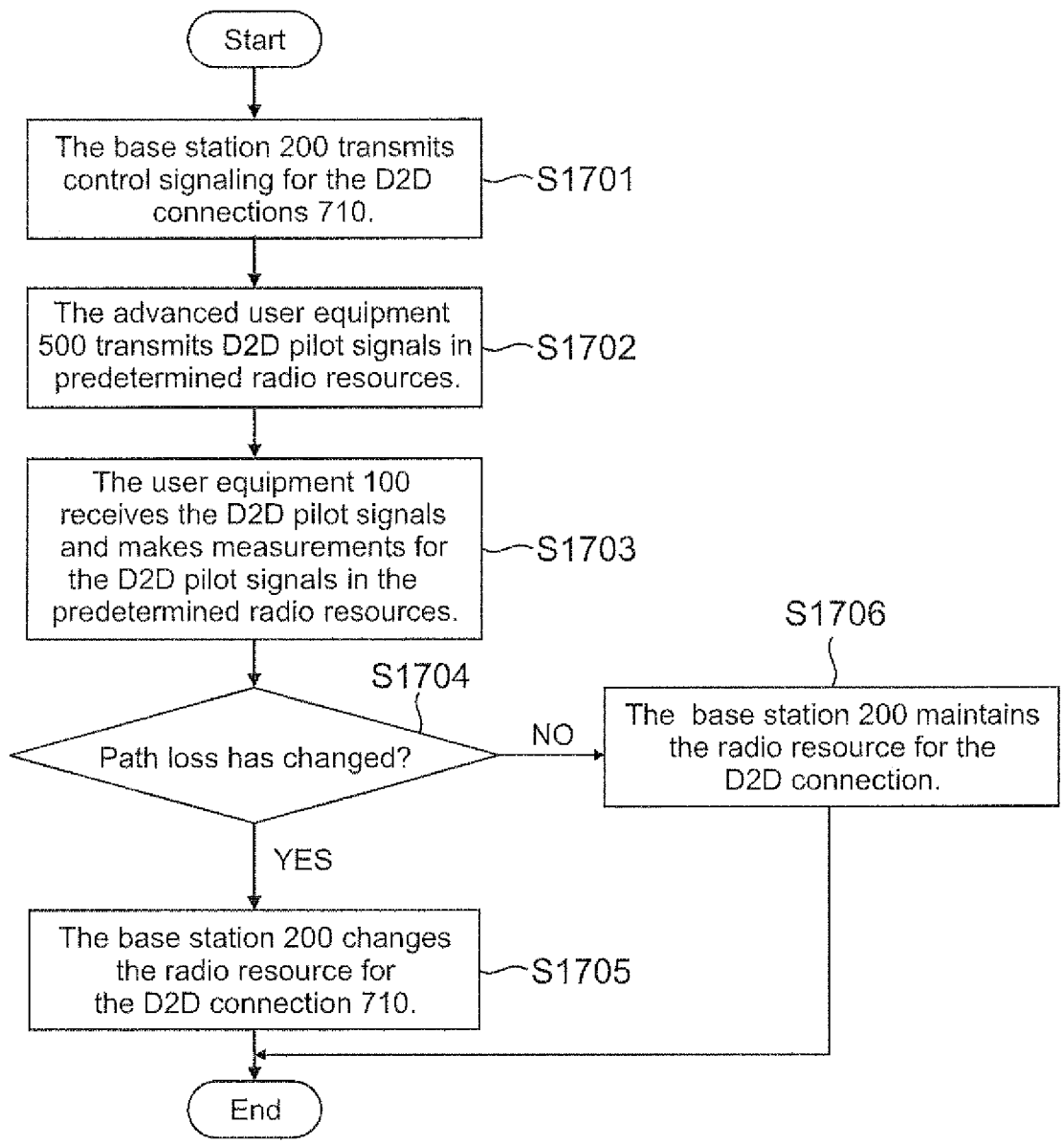
FIG. 25 is a flowchart for a D2D link measurement and radio resource re-allocation method.

Referring to FIG. 25, an operation of the mobile communication system related to radio resource control in D2D connection 710 is illustrated. The steps in FIG. 25 are conducted while the D2D connection is already established. An initial set of steps S1701 through S1703 correspond identically to the set of steps S1501 to S1503 of FIG. 23.

In a step S1704, user equipment 100 determines whether or not the path loss has changed. More specifically, user equipment 100 determines whether or not the path loss for the serving advanced user equipment has changed. For example, if the path loss has changed by a specific amount, such as 3 dB, the determination may be deemed positive. The amount of 3 dB is just an example such that other values may be utilized. The specific value may be signaled by base station 200 in step S1701. Alternatively, if the path loss has become larger than a threshold value or has become smaller than a threshold value, it may be determined that the path loss has changed. The threshold values may also be signaled by base station 200 in step S1701.

In steps S1702 and 1703, the user equipment 100 measures the path loss by using the D2D pilot signals. However, other signals or channels may be used for the path loss measurements. For example, pilot signals for the channel estimation or demodulation in the D2D connection 710 may be used for the path loss measurements. The pilot signals for the channel estimation or demodulation may provide better accuracy for path loss measurements than the D2D pilot signals, which are used for mobility measurements.

If the determination in step S1704 is positive, user equipment 100 sends base station 200 a measurement report which reports that the path loss has changed, and base station 200 changes the radio resource for D2D connection 710 by assigning other radio resources for D2D connection 710 in a step S1705. The base station may order advanced user equipment 500 and user equipment 100 to change the radio resource by sending control messages for changing the radio resource. For example, if the path loss is higher than a threshold, base station 200 may assign radio resources in which advanced user equipment 500 and/or user equipment 100 can transmit signals with higher transmission power. In general, if there is no victim system that can be interfered through operation of advanced user equipment 500 and/or the user equipment 100, advanced user equipment 500 and/or the user equipment 100 can transmit with higher transmission power. As a result, good quality communication can be enabled without interfering with other systems.

Alternatively, if the path loss is lower than a threshold, base station 200 may assign radio resources in which advanced user equipment 500 and/or the user equipment 100 has to transmit signals with lower transmission power. In general, if there is a victim system whose operation is interfered by the transmission from advanced user equipment 500 and/or user equipment 100, advanced user equipment 500 and/or user equipment 100 may have to transmit with lower transmission power. As a result, the radio resources in which advanced user equipment 500 and/or user equipment 100 can transmit signals with higher transmission power can be assigned to other D2D connections which require higher transmission power to achieve more efficient use of the radio resources.

If the determination in step S1704 is negative, base station 200 maintains the radio resource for the D2D connection 710 in a step S1706 such that the previously-assigned radio resources are maintained. Step S1704 could be performed using alternative criteria to the path loss, such as the received power of the D2D pilot signal, the received quality of the D2D pilot signal, the SIR of the D2D pilot signal, and other suitable factors. In the steps S1704-S1706, user equipment 100 transmits measurement report, which reports that the path loss has changed, and base station 200 may conduct the control described in the steps S1705 and S1706. Alternatively, user equipment 100 may transmit information on the path loss periodically, and base station 200 may determine whether or not the path loss has changed.

Figure 26:
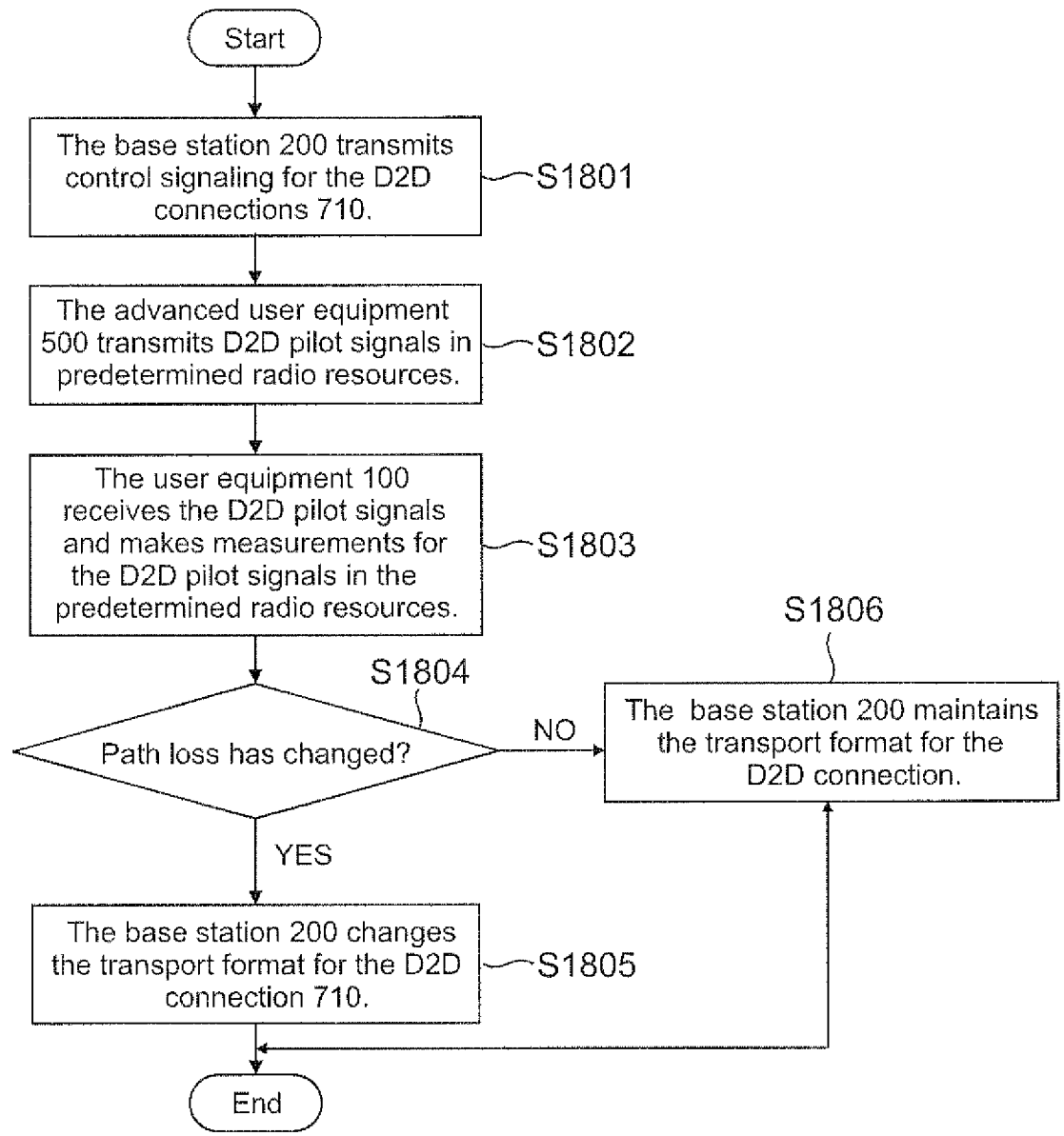
FIG. 26 is a flowchart for a D2D link measurement and transport format reconfiguration method.

Referring to FIG. 26, an operation of the mobile communication system related to radio resource control in D2D connection 710 is illustrated. The steps in FIG. 26 are conducted while the D2D connection is already established. An initial set of steps S1801 through S1803 correspond identically to the set of steps S1501 to S1503 of FIG. 23.

A step S1804 determines whether the path loss has changed as discussed with regard to analogous step S1704 of FIG. 25. If the path loss change determination of step S1804 is positive, user equipment 100 sends base station 200 a measurement report which reports that the path loss has changed, and base station 200 changes transport formats for the D2D connection 710 in a step S1805 so that advanced user equipment 500 and user equipment 100 use a new transport format for D2D connection 710. The base station may order the change in the transport formats by sending control messages for changing the transport formats. The transport format may consist of at least one of: a modulation scheme, the number of resource blocks, coding rate, transport block size, the number of MIMO layers, the number of sub-frames, the maximum transmission power, target SIR, and the similar parameters. The modulation scheme may be one of QPSK, 16QAM, 8PSK or 64QAM. The number of resource blocks may be a frequency resource amount. The number of sub-frames may be a time resource amount. The transport formats may be identified through identification numbers. For example, the MCS index (modulation and coding scheme index) in the reference (TS 36.213, 7.1.7) for LTE may be used as transport format identification numbers.

Figure 27:
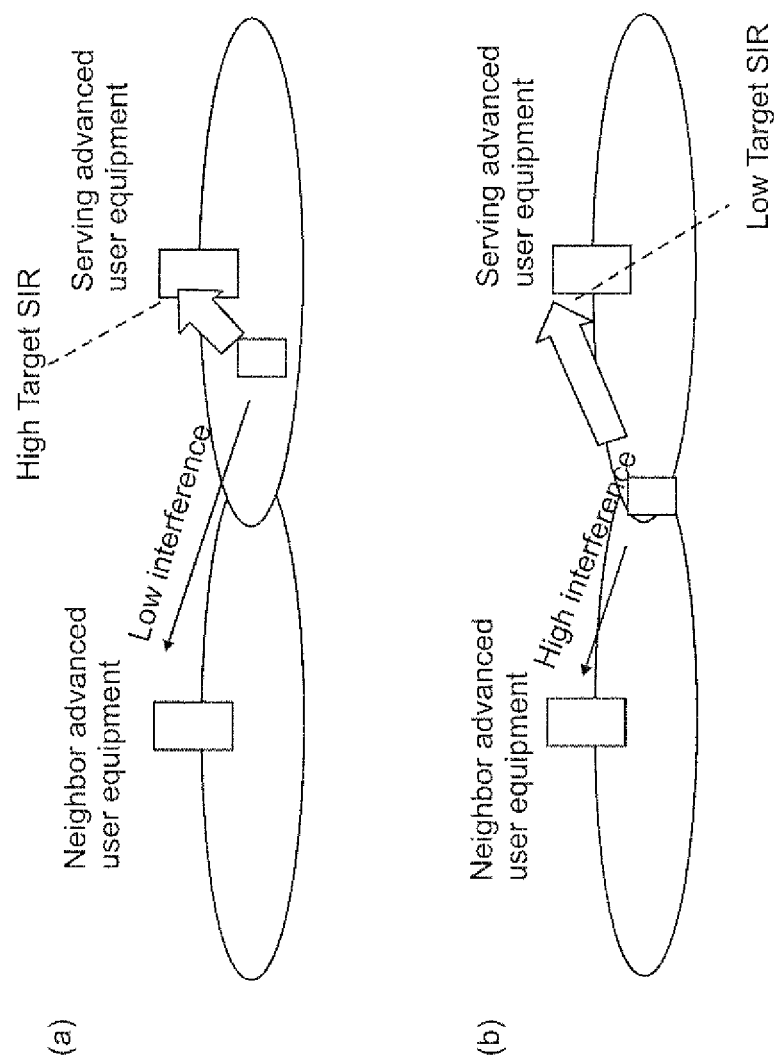
FIG. 27 (a) illustrates a serving advanced user equipment having a low interference with a neighbor advanced user equipment.

The desired transport format may be determined as illustrated in FIGS. 27 (a) and 27 (b). As shown in FIG. 27 (a), a user equipment that is relatively close to the serving advanced user equipment can use a transport format that requires a higher signal-to-interference ratio (SIR) as opposed to the user equipment of FIG. 27 (b) that is relatively far from the serving advanced user equipment. In contrast, the user equipment of FIG. 27 (b) should use a transport format that requires a lower SIR to avoid interference at the neighbor advanced user equipment. For example, the transport format may be determined using the table shown in FIG. 28. This table consists of the modulation scheme, the coding rate, the target SIR, the number of MIMO layers, the number of resource blocks, and the path loss. The base station may derive the transport formats from the path loss and the table. For example, if the path loss is 70 dB, an index #2 in the table is selected, which then determines the modulation scheme, the coding rate, the target SIR, the number of MIMO layers, and the number resource blocks for such a path loss. The table is just an example, and it may consist of some parts of the parameters listed in the table, or may consist of other parameters not listed in the table in addition to the ones listed in the table. As illustrated in the table, the transport formats which require higher received power (which results in relatively higher transmission power) are selected if the path loss is relatively small. Conversely, the transport formats which require lower received power (which results in relatively lower transmission power) are selected in the table of FIG. 28 if the path loss is relatively large.

Referring back to FIG. 26, if the determination in step S8104 is negative (no change in path loss), base station 200 maintains the already-established transport format for D2D connection 710 in a step S1806. In other words, the transport format is unchanged in step S1806. Step S1804 could be performed using alternative criteria to the path loss, such as the received power of the D2D pilot signal, the received quality of the D2D pilot signal, the SIR of the D2D pilot signal, and other suitable factors. In the steps S1804-S1806, user equipment 100 transmits measurement report, which reports that the path loss has changed, and base station 200 may conduct the control described in the steps S1805 and S1806. Alternatively, user equipment 100 may transmit information on the path loss periodically, and base station 200 may determine whether or not the path loss has changed.

Figure 29:
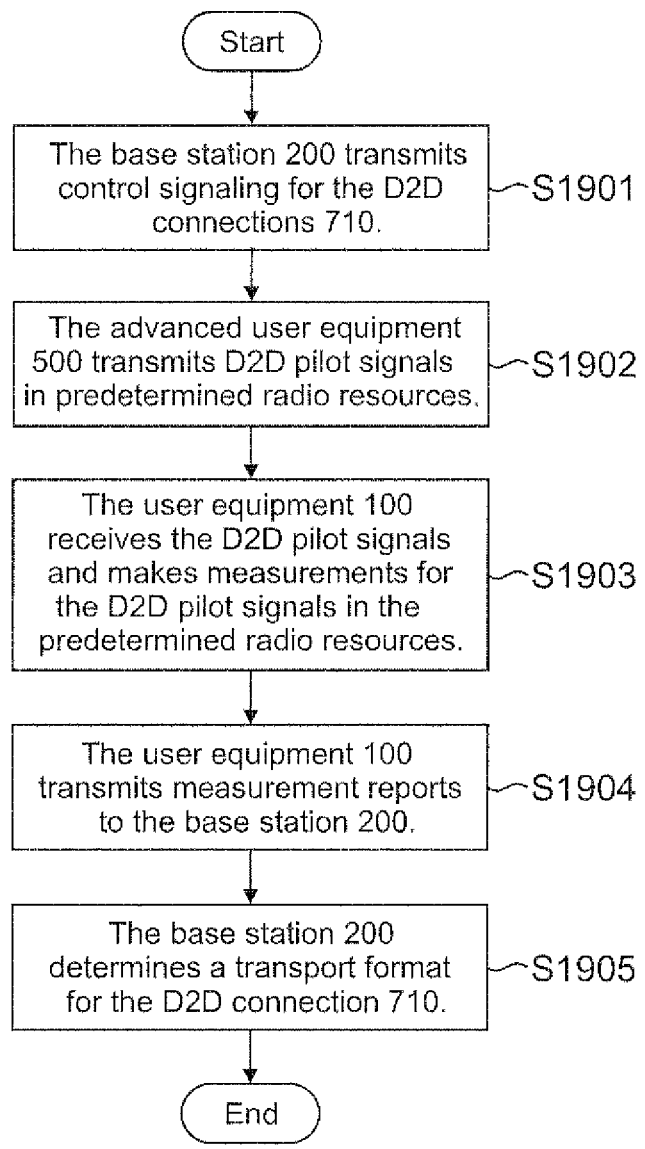
FIG. 29 is a flowchart for a D2D transport format determination.

Referring now to FIG. 29, an operation of the mobile communication system related to radio resource control or link adaptation control for D2D connection 710 is illustrated. Steps S1901 through S1904 are identical to steps S1301 to S1304 of FIG. 20.

In a step S1905, the base station determines a transport format for D2D connection 710. Step S1905 may be conducted simultaneously with step S1305 of FIG. 20. Base station 200 determines the transport format for D2D connection 710 based on the radio link quality of D2D connection 710. The radio link quality of the D2D connection 710 may be the path loss, the received power of the D2D pilot signals, the SIR of the D2D pilot signals, the received quality of the D2D pilot signals, or other suitable parameters. The transport formats can be determined based on the path loss and the table in FIG. 28. Base station 200 may inform user equipment 100 and advanced user equipment 500 of the transport formats determined in step S1905 by using control signaling.

In alternative embodiments, the user equipment 100 may transmit the D2D pilot signals and advanced user equipment 500 may receive the D2D pilot signals. For example, the base station may inform the user equipment and the advanced user equipment which device should transmit the D2D pilot signals. For example, such information may be included in the control signaling in the step S1301. The control signaling may include an identification number of the device that should transmit the D2D pilot signals.

Traffic Measurements

In mobile communication systems, it is quite important to collect measurement results in the radio interface. The measurement results can be utilized for parameter optimization, determining whether additional base stations should be installed, handing off to additional base stations or additional carriers, etc. This parameter optimization may be denoted as network optimization in general. In addition, the measurement results can be utilized for self-organized network (SON) purposes. The measurement results can be given to the SON entity and the SON entity modifies some of parameters based on the measurement results. Generally speaking, as the number of nodes increases, complexity and cost for such measurements increases. Therefore, if network operators utilize a lot of small nodes, such as Pico base stations or Femto base stations, how to collect such measurement results efficiently is a challenging problem.

Figure 30:
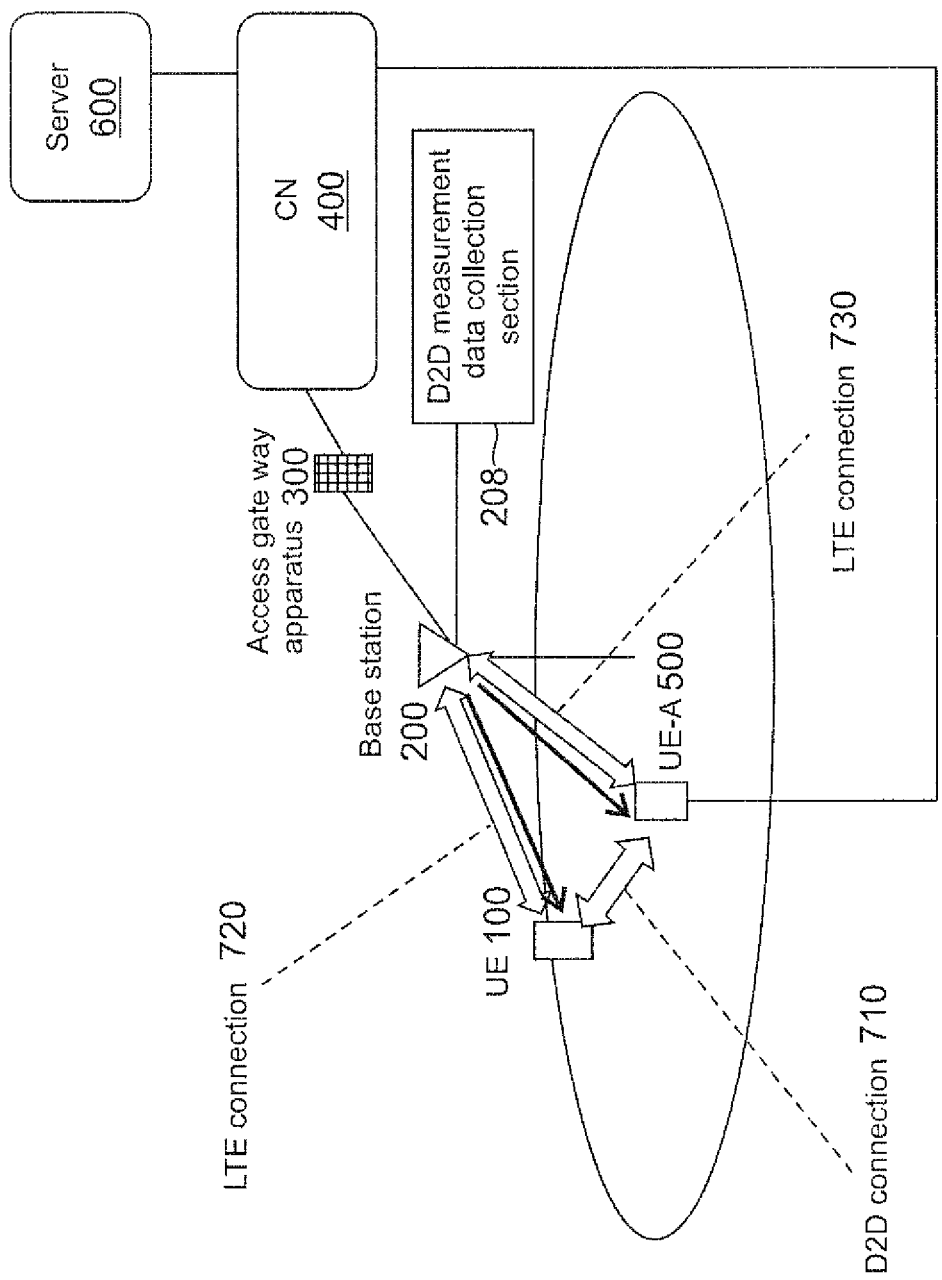
FIG. 30 illustrates a modification of the architecture shown in FIG. 7 to include a D2D measurement data collection section.

In the present disclosure, the addition of the advanced user equipment presents such a measurement problem. Since the number of the advanced user equipment is larger than the existing deployed base stations, more efficient measurement procedures and network optimization are required. These measurement procedures may be explained as follows:

FIG. 30 illustrates an example communication system. As compared to the system discussed with regard to FIG. 7, the system of FIG. 30 is analogous except that a D2D measurement data collection section 208 for base station 200 is added. D2D measurement data collection section 208 is configured to collect measurement data for the D2D link.

Figure 31:
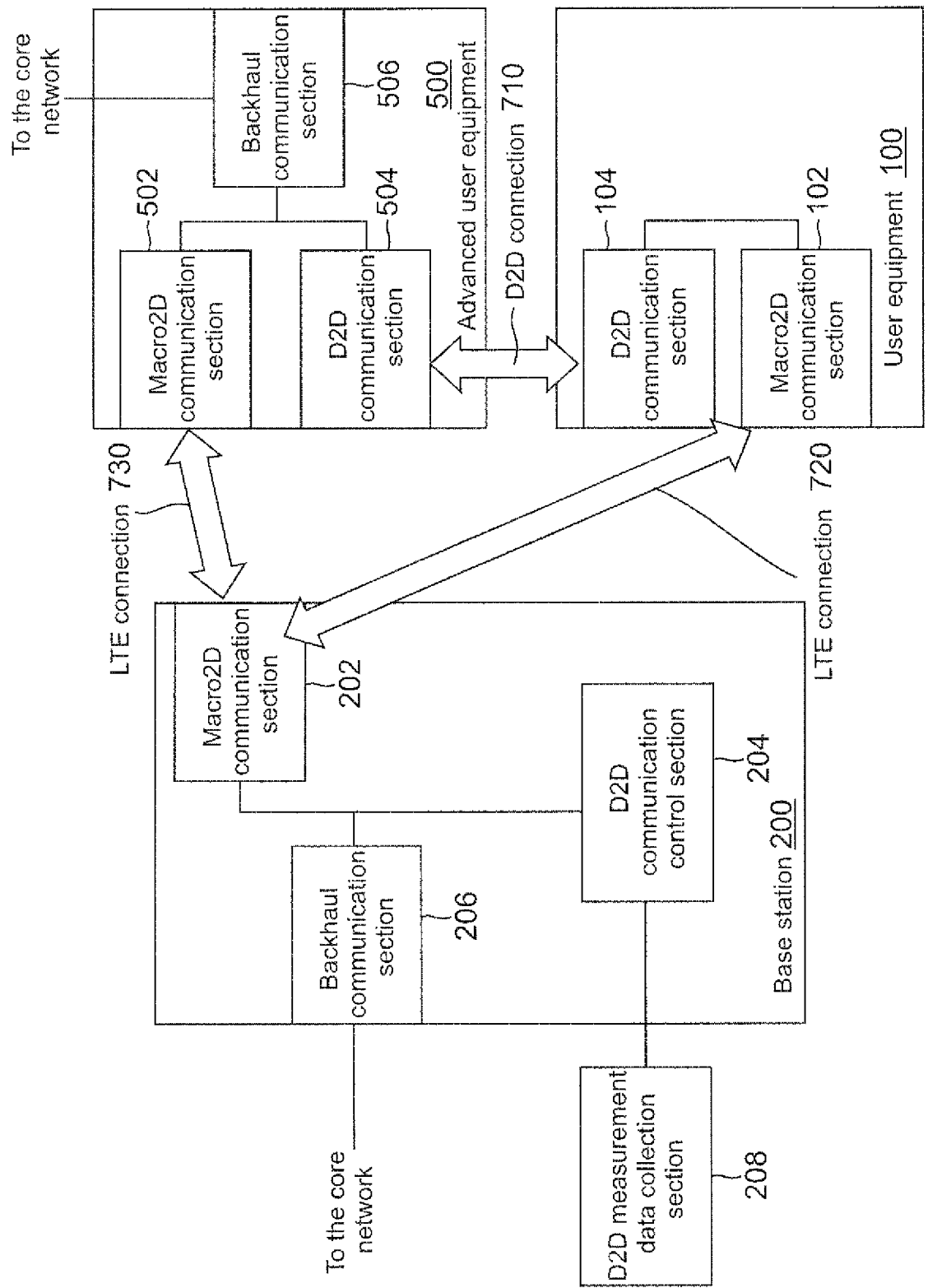
FIG. 31 illustrates a functional relationship between the elements in the advanced user equipment, the user equipment, and the base station.

FIG. 31 illustrates a functional block diagram of base station 200, user equipment 100, advanced user equipment 500, and D2D measurement data collection section 208 to better explain the measurement procedures in the radio communication system. The functional blocks in FIG. 31 are the same as those described above for FIGS. 9, 10, and 11. Thus, only the functions related to the measurement procedures will be explained with regard to the system of FIG. 31 such that explanation of other functions will be omitted in the following.

In FIGS. 30 and 31, D2D measurement data collection section 208 is located outside the base station 200, but it may be located inside the base station 200 and may be a integrated into base station 200. Alternatively, the D2D measurement data collection section 208 may be located in other nodes, such as access gateway 300 or a node in core network 400. There are two kinds of measurement data in the hybrid D2UE and Macro2UE system. One is the measurement data which are measured in base station 200, and the other is the measurement data which are measured in advanced user equipment 500. In the following, these two kinds of measurement data will be explained separately.

Measurement Data Measured in the Base Station 200:

FIG. 32 shows examples of measurements conducted by base station 200. In this embodiment, D2D communication control section 204 performs the measurements listed in FIG. 32 because section 204 conducts radio link connection control for D2D connection 710 as described above and can thus readily make the measurements. The radio link connection control includes at least one of establishing/configuring/re-configuring/re-establishing/releasing D2D connection 710. Furthermore, the radio link connection control may include handover or radio link failure handling for D2D connection 710.

D2D communication control section 204 makes the measurements and sends the measurement results to D2D measurement data collection section 208. Referring to FIG. 32, measurement items are illustrated.

Measurement index #0 corresponds to the number of D2D connections. The number of D2D connections may be the total number of D2D connections in the macro cell coverage area in which base station 200 provides radio communication service for user equipment 100. Alternatively, the number of D2D connections may equal the D2D connections for the advanced user equipment. According to this measurement item, network operators can detect how many D2D connections are utilized in the macro coverage area or in each advanced user equipment. Such information can be utilized when network operators determine whether or not new advanced user equipment should be installed. If the number of the D2D connections in advanced user equipment 500 is larger than a threshold value, network operators may determine that new advanced user equipment should be installed.

Alternatively, network operators may determine that radio resources for the advanced user equipment should be increased if the number of the D2D connections for advanced user equipment 500 is larger than a threshold value. The radio resource may be the frequency resource. For example, network operators may determine that frequency carriers for the D2D connections handled by the advanced user equipment should be increased if the number of the D2D connections in the advanced user equipment 500 is larger than the threshold value.

In addition to the number of D2D connections, the number of logical channels in the D2D connections may be measured as part of measurement item #0. Alternatively, the number of D2D connections may be measured for each logical channel. More specifically, the number of D2D connections in which logical channel supporting best effort packets is transferred may be measured.

A measurement index #1 corresponds to the radio resources used by the D2D connections. The radio resources for the D2D connections may correspond to the radio resources for all D2D connections in the macro cell coverage area. Alternatively, the radio resources may correspond to those used by each advanced user equipment. Responsive to this measurement item, network operators can detect how much radio resource is utilized for the D2D connections in the macro coverage area or in each advanced user equipment. Such information can be utilized when network operators determine whether new advanced user equipment should be installed. For example, if the amount of the radio resources in the D2D connections used by the advanced user equipment is larger than a threshold value, network operators may determine that new advanced user equipment should be installed. Alternatively, network operators may determine that radio resources for the advanced user equipment should be increased if the amount of the radio resources in the D2D connections for the advanced user equipment is larger than the threshold value.

The radio resource may be the frequency domain resource. For example, network operators may determine that frequency carriers for the D2D connections handled by the advanced user equipment should be increased if the amount of the radio resource for the advanced user equipment is larger than the threshold value. Alternatively, the radio resource may be the time-frequency resource.

The measurements of the radio resource may be done separately for DL (from the advanced user equipment to the user equipment) and UL (from the user equipment to the advanced user equipment). Instead of the actual radio resource, the usage of the radio resource may be measured. The usage of the radio resource ($usage_{\#1}$) may be calculated as follows:

$$usage_{\#1} = \frac{r(T)}{total\_r(T)}$$

where r(T) is the amount of assigned radio resource during time period T, total_r(T) is the amount of available radio resource during time period T, and T is the time period during which the measurement is performed.

Measurement index #2 corresponds to a data rate in the D2D connections. The data rate in the D2D connections may be the total data rate in the D2D connections in the macro cell coverage area. Alternatively, the data rate in the D2D connections may be the data rate in each advanced user equipment. According to this measurement item, network operators can detect how much data rate is achieved for the D2D connections in the macro coverage area or for each advanced user equipment.

The data rate may be calculated in the Physical layer, the MAC layer, the RLC layer, or the PDCP layer. Moreover, the data rate may be calculated for each logical channel in the D2D connections. The data rate may be calculated separately for downlink (from the advanced user equipment to the user equipment) and uplink (from the user equipment to the advanced user equipment). A status report may be utilized for the calculation. For example, the actual data transmission is conducted in D2D connection 710 but the status report for D2D connection 710 may be transmitted to base station 200 utilizing LTE connection 720 through Macro2D communication section 102 in user equipment 100. The status report transmission from the user equipment to the base station is illustrated in FIG. 33. The status report (which may include status for each logical channel) may be thus transmitted both in D2D connection 710 and in LTE connection 720. As a result, D2D communication control section 204 in base station 200 can easily utilize the status report to see how many bits are transmitted in the D2D connection per second. The number of bits per second corresponds to the data rate in the D2D connection 710. Alternatively, D2D communication control section 204 may calculate the amount of transferred data in D2D connection 710 utilizing a sequence number in the status report. The change of the sequence number during one time duration corresponds to the amount of transferred data during the time duration.

In the above example, user equipment 100 transmits the status report to base station 200. However, Macro2UE communication section 502 in advanced user equipment 500 may alternatively transmit a status report to base station 200 through LTE connection 730. The data rate may correspond to one D2D connection in one advanced user equipment. Alternatively, the data rate may be the sum of the data rate for multiple D2D connections in a single advanced user equipment. In yet another embodiment, the data rate may be the sum of the data rate for all the D2D connections in the macro coverage area. For example, a total data rate (Total_data_rate) for all the D2D connections may be calculated using the following equation:

$$\text{Total\_data\_rate} = \sum_{n=1}^{N} \text{data\_rate}(n)$$

where data_rate is the Data rate for one D2D connection, n is the index of the D2D connections, and N is the total number of the D2D connections. Such information can be utilized by network operators to determine whether new advanced user equipment should be installed as discussed above with regard to the analogous user-equipment-reported data rate measurement.

Measurement index #3 of FIG. 32 corresponds to a success rate of D2D connection establishment. The success rate of the D2D connection establishment ($\text{Rate}_{\#3}$) may be defined as follows:

$$\text{Rate}_{\#3} = \frac{N_1}{N_1 + N_2}$$

where $N_1$ is the number of successful D2D connection establishments and $N_2$ is the number of unsuccessful D2D connection establishments. The success rate of the D2D connection establishment may be that for all the D2D connections in the macro cell coverage area. Alternatively, the success rate of the D2D connection establishment may be determined for each advanced user equipment. A failure rate of the D2D connection establishment may be measured instead of the success rate of the D2D connection establishment. The failure rate of the D2D connection establishment may be defined as follows:

(Failure rate of D2D connection establishment)=1−(Success rate of D2D connection establishment)

According to the success (or failure) of the D2D connection establishment, network operators can determine whether some radio interface parameters should be modified. For example, if the success rate is lower than a threshold value, network operators require a change in the radio interface parameters.

A measurement index #4 corresponds to a handover success rate in the D2D connections. The handover success rate ($\text{Rate}_{\#4}$) may be defined as follows:

$$\text{Rate}_{\#4} = \frac{N_3}{N_3 + N_4}$$

where $N_3$ is the number of successful handovers in the D2D connections and $N_4$ is the number of unsuccessful handover in the D2D connections. The handover success rate may be that for all the D2D connections in the macro cell coverage area. Alternatively, the success rate of the D2D handover for individual advanced user equipment may be measured. In yet another alternative embodiment, the handover failure rate in the D2D connections may be measured instead of the success rate. The handover failure rate in the D2D connections may be defined as follows:

(Failure rate of the handover in the D2D connections)=1−(Success rate of the handover in the D2D connections)

According to this handover success (or failure) measurement item, network operators can determine whether the handover parameters should be modified. For example, if the handover success rate is lower than a threshold value, network operators may require a modification of the handover parameters.

Measurement index #5 corresponds to a success rate of D2D connection re-establishments. The success rate of the connection re-establishments in the D2D connections ($\text{Rate}_{\#5}$) may be defined as follows:

$$\text{Rate}_{\#5} = \frac{N_5}{N_5 + N_6}$$

where $N_5$ is the number of successful connection re-establishments in the D2D connections, and $N_6$ is the number of unsuccessful connection re-establishments in the D2D connections. The success rate of the D2D connection re-establishments may be that for all the D2D connections in the macro cell coverage area. Alternatively, the success rate may correspond to individual D2D connections. Alternatively, a failure rate of the D2D connection re-establishments may be measured instead of the success rate of the connection re-establishments in the D2D connections. The failure rate of the connection re-establishments in the D2D connections may be defined as follows:

(Failure rate of the connection re-establishments in the D2D connections)=1−(Success rate of the connection re-establishments in the D2D connections).

Responsive to this measurement item, network operators can determine whether some D2D connection re-establishments parameters should be modified. For example, if the success rate of the D2D connection re-establishments is lower than a threshold value, network operators may determine that some D2D connection re-establishments parameters should be modified.

Measurement index #6 corresponds to the number of D2D connection handovers in the D2D connections. This number may be that for all the D2D connections in the macro cell coverage area. Alternatively, the number may be that for the D2D connection handovers for the advanced user equipment. Responsive to this measurement item, network operators can determine whether D2D connection handover parameters should be modified. For example, if the number of handovers in the D2D connections is higher than a threshold value (which may imply that some ping-pong problems exist in the handovers), network operators may require some modifications for the handover parameters.

Measurement index #7 corresponds to the number of radio link failures in the D2D connections. This number may be that for all the radio link failures in the macro cell coverage area. Alternatively, the number may that for advanced user equipment radio link failures. The number of radio link failures may be reported by the user equipment 100 over LTE connection 720. Alternatively, it may be reported by advanced user equipment 500 over LTE connection 730. The report on the radio link failures may be included in the control signaling in the step S1301. Through this measurement item, network operators can determine whether some of the radio interface parameters should be modified. For example, if the number of radio link failures in the D2D connections is higher than a threshold value (which may imply that some of the radio interface parameters are not optimized), network operators may determine that some of the radio interface parameters should be modified.

Finally, a measurement index #8 of FIG. 32 corresponds to the number of D2D connection re-establishments. This number may be that for all the D2D connections in the macro cell coverage area. Alternatively, the number may be that the D2D connection re-establishments in each of the advanced user equipment. Using this measurement item, network operators can determine whether some of the radio interface parameters should be modified. For example, if the number of connection re-establishments in the D2D connections is higher than a threshold value (which may imply that some of the radio interface parameters are not optimized), network operators may determine that some of the radio interface parameters should be modified.

Measurement Data in the Advanced User Equipment 500:

FIG. 34 shows examples of measurement items which are measured in the advanced user equipment 500. D2D communication section 504 (FIG. 31) makes the measurement listed in FIG. 34 whereas Macro2D communication section 502 sends the measurement results to the base station via the LTE connection 730. The measurement results may be sent to base station 200 as part of the control signaling. The measurement results are transferred to the D2D measurement data collection section 208. The D2D measurement data collection section 208 can thus readily obtain the measurement results for the D2D connections by utilizing LTE connection 730, which makes the collection of the measurements very efficient.

A measurement index # A0 of FIG. 34 corresponds to a central processing unit (CPU) usage rate in advanced user equipment 500. The CPU usage rate may be used to determine whether or not a congestion level in the advanced user equipment is relatively high. For example, if the CPU usage rate is higher than a threshold value, the network operators may determine that new advanced user equipment should be installed.

A measurement index # A1 corresponds to a memory usage rate in advanced user equipment 500. The memory usage rate may also be utilized to determine whether the congestion level in the advanced user equipment is relatively high. For example, if the memory usage rate is higher than a threshold value, the network operators may determine that new advanced user equipment or additional memory should be installed.

A measurement index # A2 corresponds to a buffer usage rate of buffer in the advanced user equipment 500 and is thus analogous to measurement index # A1. The buffer usage rate may also be utilized to determine whether the congestion level in the advanced user equipment is relatively high. For example, if the buffer usage rate is higher than a threshold value, the network operators may determine that new advanced user equipment or additional memory should be installed.

A measurement index # A3 is a baseband processing usage rate in the advanced user equipment. The baseband usage rate may also be utilized to determine whether the congestion level in the advanced user equipment is relatively high. The indices A0 through A3 thus correspond to a processing load in the advanced user equipment.

A measurement index # A4 corresponds to an amount of radio resources in the D2D connections. The radio resources may correspond to that which is actually utilized for data transmission as opposed to that which is assigned by base station 200 for the D2D connections. In such a case, the utilized radio resource may correspond to the congestion level in the D2D connections. The amount of the utilized radio resource in the D2D connections may thus be used to determine whether the congestion level in advanced user equipment 500 is relatively high as compared to a threshold value. If the threshold value is exceeded, network operators may require that new advanced user equipment be installed. The measurements of the utilized radio resource may be done separately for DL (from the advanced user equipment to the user equipment) and UL (from the user equipment to the advanced user equipment).

A measurement index # A5 corresponds to a backhaul usage rate in the advanced user equipment to determine whether the congestion level in the backhaul link is relatively high as compared to, for example, a threshold value. If the threshold value is exceeded, the network operators may determine that additional bandwidth for the backhaul link should be installed.

Figure 35:
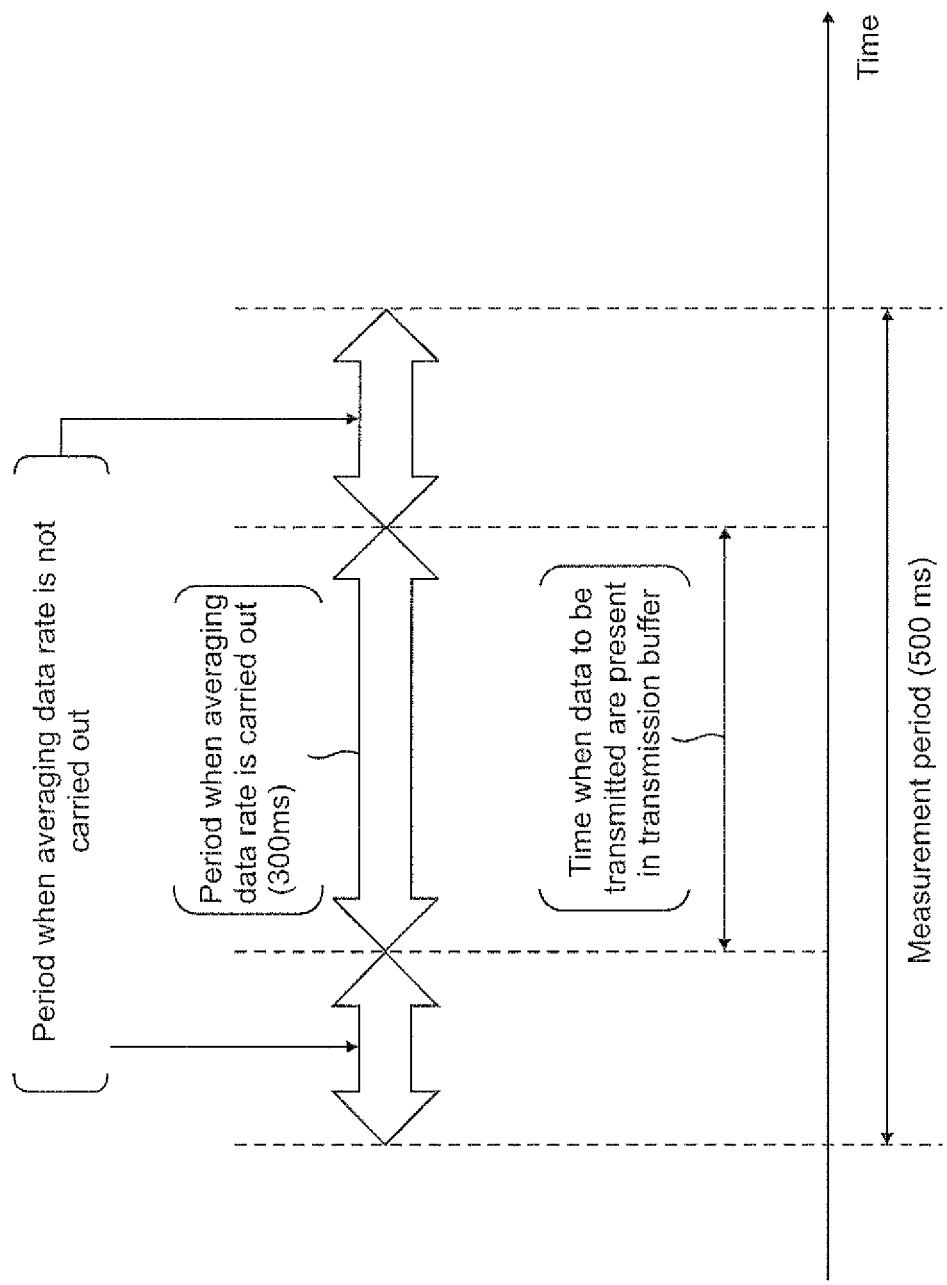
FIG. 35 illustrates a measurement period corresponding to active data transmission on the D2D link.

A measurement index # A6 correspond to the D2D connection data rate. The data rate may be calculated in the Physical layer, the MAC layer, the RLC layer, or the PDCP layer. The data rate may be calculated by setting an average period as a time when data to be transmitted are present in the transmission buffer. For example, if there is data only in a period of 300 ms in a measurement period of 500 ms, the data rate is calculated by averaging over the period of 300 ms and not over the remaining periods as shown in FIG. 35. Alternatively, the data rate may be calculated over all the measurement period regardless of the presence/absence of the data to be transmitted in the transmission buffer. The measurements of the data rate may be done separately for DL (from the advanced user equipment to the user equipment) and UL (from the user equipment to the advanced user equipment). The data rate may be calculated for each logical channel in the D2D connections.

The data rate in the D2D connections may be utilized to determine whether the congestion level in advanced user equipment 500 is relatively high. For example, the amount of the data rate may be compared to a threshold value. If the threshold value is not exceeded, network operators may determine that the congestion level is relatively high such that new advanced user equipment should be installed.

A measurement index # A7 corresponds to a time duration for communications in the D2D connections. In some embodiments, the radio resource for the D2D connections is assigned by base station 200, but the radio resource is used only when there is data to be transmitted in the D2D connections. The time duration for D2D communications thus corresponds to a time duration when data is actually transmitted. The time duration may be utilized to investigate data traffic patterns, i.e. to investigate whether data is bursty or not.

In contrast to index # A7, a measurement index # A8 corresponds to a time duration for which there is no data communications in the D2D connections. This time duration can also be used to investigate data traffic patterns.

A measurement index # A9 corresponds to the path loss in the D2D connection. The path loss may be utilized to estimate actual coverage area in which the advanced user equipment provides radio communication services. The network operators may utilize such information as compared to a threshold to determine whether new advanced user equipment should be installed in the area. The path loss measurement may be an average value of the path loss for the D2D connections which are handled by advanced user equipment 500.

A measurement index # A10 corresponds to a radio link quality in the D2D connection. The radio link quality may be utilized to estimate the communication quality in the coverage area for which the advanced user equipment provides radio communication services. The network operators may utilize such information to determine whether some of the radio interface parameters should be modified. The radio link quality may be an average value of the radio link quality for the D2D connections which are handled by the advanced user equipment 500. The radio link quality may be at least one of a signal-to-interference ratio in the D2D connections and a channel quality indicator (CQI) in the D2D connections. More specifically, if the radio link quality for the D2D connections is lower than a threshold, the network operators may determine that some of the radio interface parameters should be modified. The measurements of the radio link quality may be done separately for DL (from the advanced user equipment to the user equipment) and UL (from the user equipment to the advanced user equipment).

A measurement index # A11 corresponds to a block error rate (BLER) for the D2D connection. The BLER may be utilized to estimate communication quality in the advanced user equipment 500 coverage area. The network operators may utilize such information to determine whether or not some of the radio interface parameters should be modified. The BLER may be average value of the BLER for the D2D connections that are handled by advanced user equipment 500. A bit error rate may be utilized instead of the BLER. If the BLER for the D2D connections is higher than a threshold, the network operators may determine that some of the radio interface parameters should be modified. The measurements of the BLER may be done separately for DL (from the advanced user equipment to the user equipment) and UL (from the user equipment to the advanced user equipment).

A measurement index # A12 corresponds to a received signal power for the D2D connections. The received signal power is utilized to estimate communication quality in the advanced user equipment coverage area. The network operators may utilize such information when they determine whether or not some of the radio interface parameters should be modified. The received signal power may be an average value of the received signal power for the D2D connections that are handled by the advanced user equipment 500. If the received signal power for the D2D connections is higher than a threshold, the network operators may determine that some of the radio interface parameters should be modified. The measurements of the received signal power may be done separately for DL (from the advanced user equipment to the user equipment) and UL (from the user equipment to the advanced user equipment). For DL, the user equipment may report the received signal power to the advanced user equipment.

A measurement index # A13 corresponds to a transmitted signal power for the D2D connections. The transmitted signal power is utilized to estimate communication quality in the advanced user equipment coverage area in which the advanced user equipment 500 provides radio communication services. The network operators may utilize such information when they determine whether or not some of the radio interface parameters should be modified. The transmitted signal power may be an average value of the transmitted signal power for the D2D connections which are handled by the advanced user equipment 500. The measurements of the transmitted signal power may be done separately for DL (from the advanced user equipment to the user equipment) and UL (from the user equipment to the advanced user equipment). For UL, the user equipment 100 may report the transmitted signal power to the advanced user equipment 500. If the transmitted signal power for the D2D connections is higher than a threshold, the network operators may determine that some of the radio interface parameters should be modified.

A measurement index # A14 corresponds to an interference power for the D2D connections. The interference power is utilized to estimate communication quality in the coverage area which advanced user equipment 500 provides radio communication services. The network operators may utilize such information when they determine whether some of the radio interface parameters should be modified. The interference power may be an average value of the interference power for the D2D connections which are handled by the advanced user equipment 500. If the interference power for the D2D connections is higher than a threshold, the network operators may determine that some of the radio interface parameters should be modified. The measurements of the interference power may be done separately for DL (from the advanced user equipment to the user equipment) and UL (from the user equipment to the advanced user equipment). For DL, the user equipment 100 may report the interference power to the advanced user equipment 500.

A measurement index # A15 corresponds to location information of the advanced user equipment 500. The location information may be utilized for SON operation.

A measurement index # A16 corresponds to the number of user equipment for which data to be transmitted is present in the transmission buffer. This number may be utilized to determine whether the congestion level in advanced user equipment 500 is relatively high. If the number of user equipment for which data to be transmitted is present is higher than a threshold value, network operators may determine that the congestion level is relatively high and new advanced user equipment should be installed. The measurements of the number of user equipment for which data to be transmitted is present may be done separately for DL (from the advanced user equipment to the user equipment) and UL (from the user equipment to the advanced user equipment). For UL, user equipment 100 may report to advanced user equipment 500 whether there is data to be transmitted in its transmission buffer. The number of user equipment having data to be transmitted may be calculated for each logical channel in the D2D connections, i.e. the number of logical channels having data to be transmitted may be calculated. User equipment for which data to be transmitted is present may be regarded as an active user.

A measurement index #A17 corresponds to the number of user equipment whose data rate is lower than a threshold. This number may be utilized to determine whether the congestion level in the advanced user equipment is relatively high. If the number of user equipment whose data rate is lower than a threshold is higher than another threshold value, network operators may determine that the congestion level is relatively high and new advanced user equipment should be installed. The measurements of the number of user equipment for whose data rate is lower than a threshold may be done separately for DL (from the advanced user equipment to the user equipment) and UL (from the user equipment to the advanced user equipment). The number of user equipment whose data rate is lower than a threshold may be calculated for each logical channel in the D2D connections.

A measurement index #A18 corresponds to a number of inactive user equipment in the D2D connections. In some embodiments, the radio resource for the D2D connections is assigned by the base station, but the radio resource is used only when there is data to be transmitted. Thus there is a time duration when there is no data to be transmitted. The inactive user equipment corresponds to the ones that have no data to be transmitted in the D2D connection.

Regardless of whether the user equipment or the advanced user equipment make the traffic measurements, D2D measurement data collection section 208 may utilize some parts of the measurement data described above for call admission control of the D2D connections. For example, D2D measurement section 208 may determine that new D2D connections should be prohibited if the number of D2D connections in the advanced user equipment is higher than a threshold. Other measurement items, such as the amount of the utilized radio resources may be used for the call admission control instead of the number of D2D connections. The call admission control may be performed by D2D communication control section 204, instead of the D2D measurement data collection section 208.

Resource Allocation and Transport Format Selection

In general, radio resource allocation methods involve a trade-off between signaling overhead and flexibility. If control signaling for the radio resource allocation is transmitted relatively very frequently, the radio resources can be assigned in a flexible manner. This flexibility provides some benefits, such as multi-user scheduling diversity gain or interference coordination, although the overhead of the control signaling is high. On the other hand, if the control signaling for the radio resource allocation is transmitted infrequently, the radio resource cannot be assigned in a flexible manner and it is difficult to obtain the above benefits, although the overhead of the control signaling is reduced.

Furthermore, traffic data is not always present. For example, in web browsing no traffic data exist while users are reading web sites contents. If the radio resource is released or is not used during the time when no traffic data exist, the radio resource can be utilized more efficiently because the released or unused radio resource can be assigned to other communications. However, if the radio resource is frequently assigned or released to achieve such efficient resource allocation, the overhead of the control signaling increases.

It is also noted that how to detect whether data to be transmitted exists in the transmission buffer is quite important with regard to efficient resource allocation. If the transmission buffer detection is easily performed, it is also easy to achieve an efficient resource allocation. On the other hand, if it is not easily detected that the transmission buffer has no data to be transmitted, it is difficult to achieve an efficient resource allocation even if the control signaling for the radio resource allocation is frequently transmitted.

In general, if a node that conducts radio resource allocation procedures also has a transmission buffer, it is easy to detect whether data to be transmitted exist in the transmission buffer. Otherwise, it is not easy to detect whether data to be transmitted exist in the transmission buffer because the transmission buffer is remote from the observing node. For example, when a base station conducts resource allocation procedures for communication with user equipment, it is easy to have information on buffer status in DL, but not easy to have information on buffer status in UL.

The selection of transport formats is highly related to the radio resource allocation procedures because the transport formats are decided when the radio resource is allocated. In that regard, a radio resource allocation can be considered to include the selection of the transport format. If the control signaling is frequently transmitted and indicates not only the radio resource allocation information but also the transport format information, the transport formats can be changed frequently and flexibly. The transport formats may be selected based on the radio link quality utilizing an adaptive modulation and coding technique as generally used in a link adaptation techniques. In an adaptive modulation and coding technique, information on the radio link quality is quite important. If the information for the radio link quality is inaccurate, the transport formats selected may not be suitable for the actual radio link so that performance is degraded. In this sense, how the radio link quality is obtained and how to select transport formats may be regarded as part of radio resource management.

In WCDMA dedicated channels, for example, the radio resource for the dedicated channels is assigned by the Radio Network Controller (RNC) using RRC signaling. The radio resource corresponds to a code domain resource. User equipment is notified of an identification number of a code used for a dedicated channel in the RRC signaling. If there are more than one WCDMA carriers in a cell, the RNC may assign one of the carriers as well to the user equipment as part of the radio resource allocation. In this case, the radio resource may not be frequently changed or assigned/released because the number of RRC signaling transmissions should be minimized.

In LTE DL, on the other hand, the radio resource for the physical downlink shared channel (PDSCH) is assigned by the LTE base station using the physical downlink control channel (PDCCH). The radio resource corresponds to a frequency domain resource, i.e. user equipment is notified of an identification number of a resource block or a resource block group in the PDCCH. The PDCCH is transmitted in each sub-frame (each 1 msec) and it notifies the user equipment which user equipment should receive PDSCH in each sub-frame, which transport format is used in PDSCH, and which radio resource is used in PDSCH. In this sense, PDCCH notifies the user equipment of not only the frequency domain resource, but also the time domain resource, because PDCCH indicates when PDSCH is transmitted.

The PDCCH notifies the user equipment of the radio resource of the PDSCH transmitted in the sub-frame in which the PDCCH is transmitted. Thus, the radio resource can be assigned and be released relatively frequently (1 msec by 1 msec). Since PDCCH is transmitted every 1 msec, the overhead of PDCCH is large. But, the multi-user scheduling diversity gain can thus be obtained. Furthermore, when no traffic data to be transmitted exist in the transmission buffer of the user equipment, the radio resource is not used because no PDCCH is transmitted to the user equipment. As a result, efficient resource allocation can be achieved.

In LTE DL, the transport formats can be changed 1 msec by 1 msec, because PDCCH is transmitted in each sub-frame. The user equipment transmits channel state information to the LTE base station, whereupon the LTE base station selects the transport formats of PDSCH based on the channel state information. As a result, accurate adaptive modulation and coding can be achieved. For LTE UL, the radio resource for the physical uplink shared channel (PUSCH) is assigned by the LTE base station using PDCCH, similarly to LTE DL. In this case, the user equipment sometimes transmits buffer status report or scheduling request to the LTE base station so that the LTE base station can detect whether or not data to be transmitted exist in the UL transmission buffer.

Here, it is important which node should assign the radio resource. In the above WCDMA examples, RNC assigns the radio resource to the user equipment. In the above LTE examples, the LTE base station assigns the radio resource to the user equipment.

In short, the radio resource allocation should be appropriately conducted in the mobile communication systems in order to achieve reasonable resource allocation flexibility, to minimize control signaling overhead, and to achieve efficient link adaptation.

In the hybrid D2UE and Macro2UE system disclosed herein, radio resource allocation procedures are conducted for the D2D connection to achieve efficient resource allocation, minimize control signaling overhead, and achieve efficient link adaptation. In the hybrid D2UE and Macro2UE system, complexity of advanced user equipment 500 needs to be minimized. Otherwise, some benefits of the hybrid D2UE and Macro2UE system are lost. That is, it may be preferable that most of the radio resource allocation procedures are conducted by the base station, instead of the advanced user equipment. However, if the base station assigns the radio resource to D2D connection 710 similarly to the LTE DL allocation (i.e., by sending PDCCH for the D2D connection 710 in each sub-frame), the overhead of the control signaling cannot be negligible. On the other hand, if the base station assigns the radio resource to the D2D connection 710 similarly to the WCDMA dedicated channels, it is difficult to avoid assigning the radio resource to communications in which no data to be transmitted exist. Furthermore, how to select transport formats for the D2D connection 710 needs to be specified.

As discussed previously, base station 200 controls the RRC layer for D2D connection 710. In the following embodiments, base station 200 also controls the MAC layer for D2D connection 710 with regards to radio resource allocation and also transport format selection. However, in alternative embodiments, UE-A could control the MAC layer. Thus, in such alternative embodiments, UE-A would manage radio resource allocation and transport format selection in an analogous fashion as discussed below for base-station-controlling-the-MAC-layer embodiments or in a fashion analogous to conventional LTE base station controlling the MAC/physical layers.

In the following examples, it is assumed as discussed above that the carrier frequency in the D2D connection is 3.5 GHz whereas the LTE connections between the base station and the user equipment and between the base station and the advanced user equipment is 2 GHz. It is noted that the frequency bands are just examples, and other frequency bands can be applicable in other embodiments.

Figure 36A:
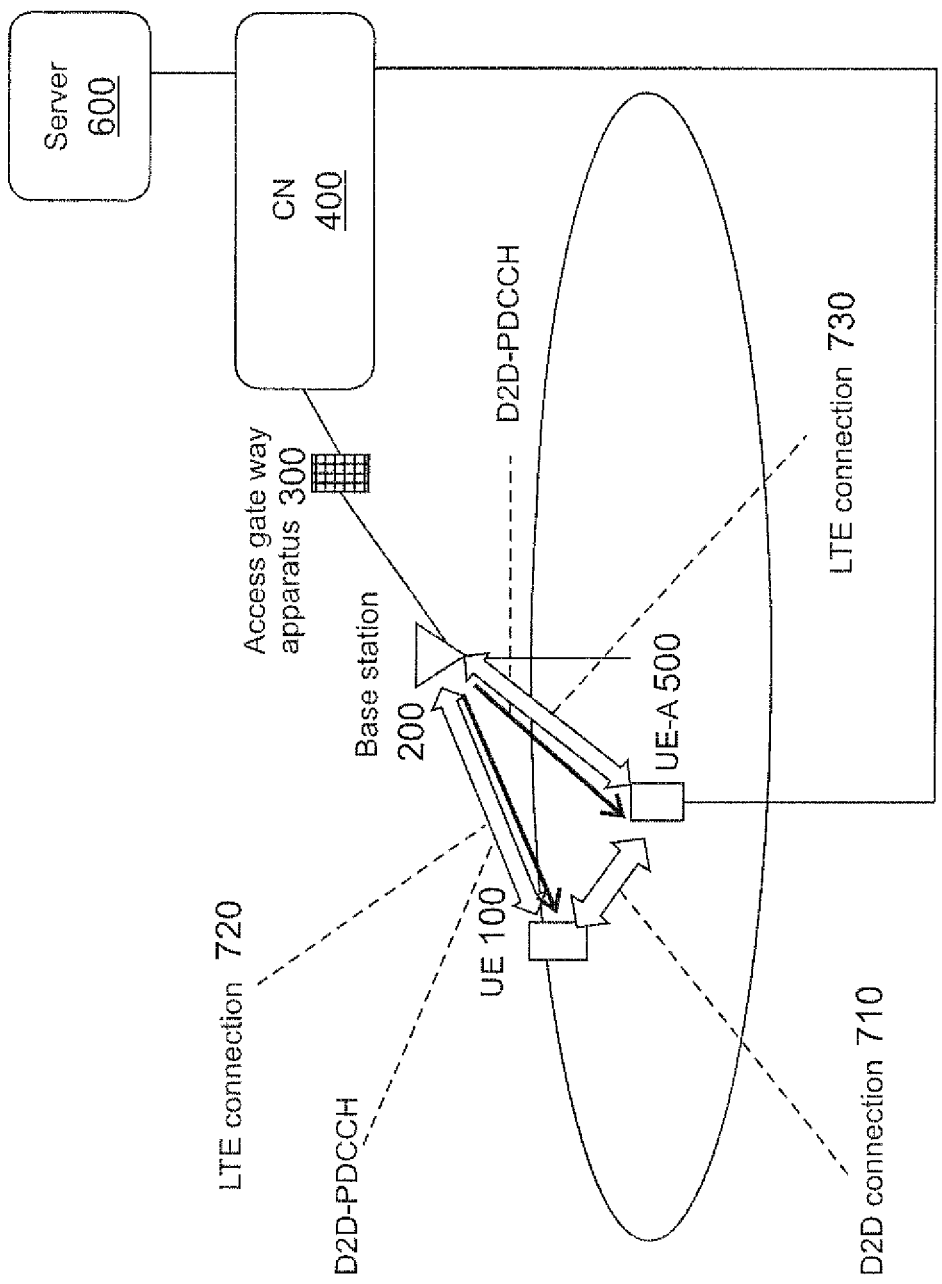
FIG. 36A illustrates a modification of FIG. 7 to show the D2D PCCH transmissions.
Figure 36B:
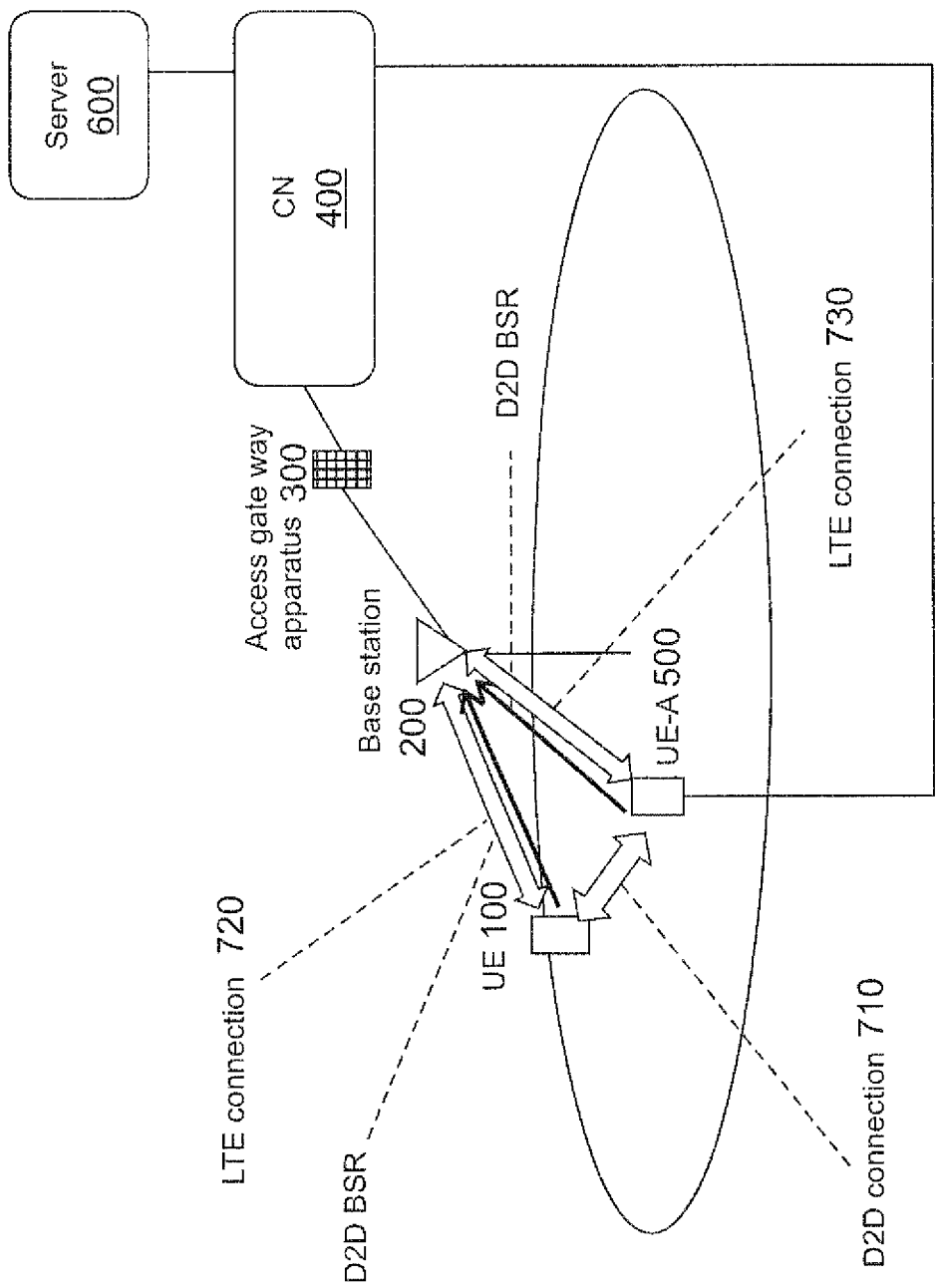
FIG. 36B illustrates a modification of FIG. 7 to show the D2D BSR transmissions.

FIGS. 36A and 36B illustrate connections in a radio communication system that is analogous to that shown in FIG. 7. However, in FIG. 36A, a D2D-PDCCH transmission is shown between base station 200 and user equipment 100 and between base station 200 and advanced user equipment 500. D2D-PDCCH is thus transmitted in the Macro2UE link and in the Macro2D link, respectively. D2D-PDCCH constitutes control signaling that notifies the user equipment and the advanced user equipment of resource assignment information for D2D connection 710.

In FIG. 36B, a D2D-Buffer Status Report (BSR) is shown illustrated being transmitted to base station 200 by user equipment 100 and/or the advanced user equipment 500 in the Macro2UE link and/or in the Macro2D link, respectively. The D2D-BSR constitutes control signaling that notifies the base station whether there is data (or the amount of such data) to be transmitted for the D2D connection 710.

Figure 37:
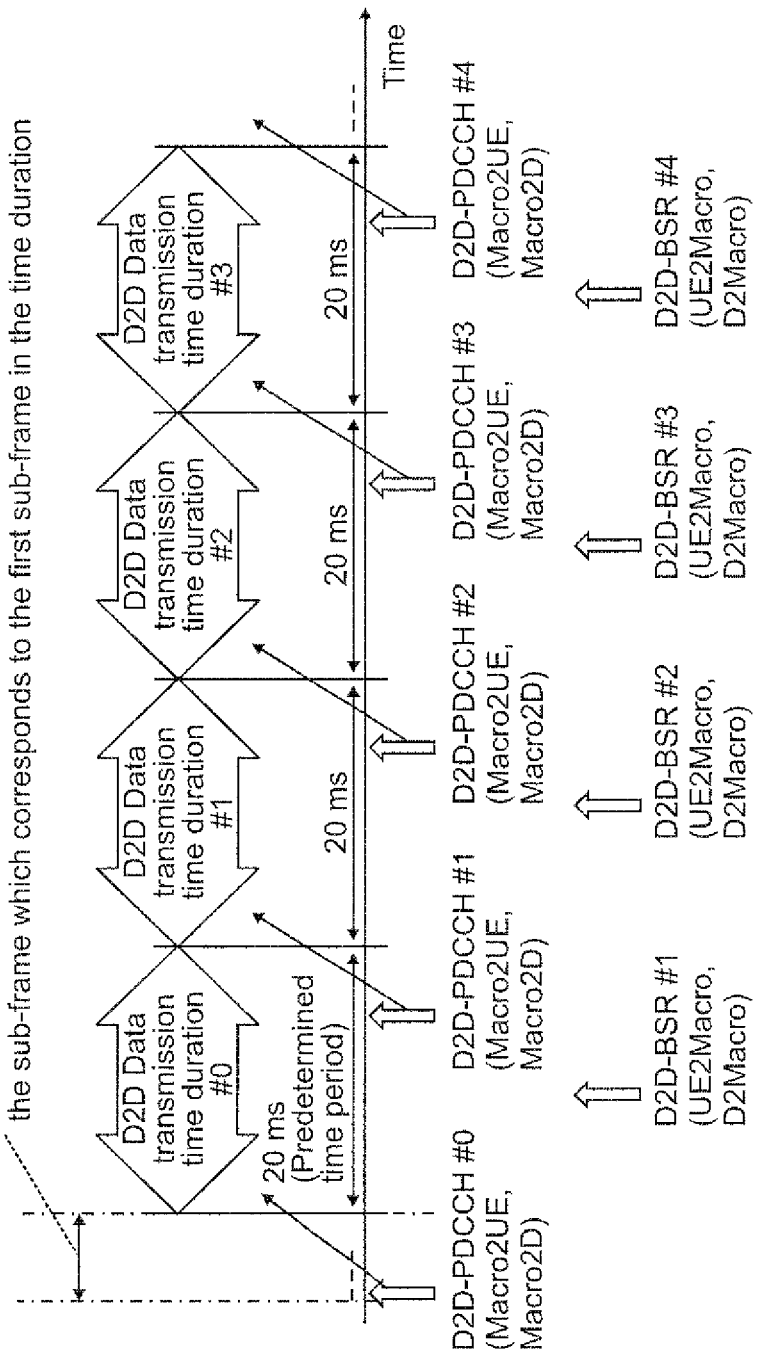
FIG. 37 illustrates a plurality of D2D data transmission durations.

Details of time frame structure for the radio resource allocation methods are described with reference to FIG. 37. Here, D2D-PDCCH is transmitted periodically according to a predetermined time period. For example, the predetermined time period may be 20 msec or 40 msec or other values. In the illustrated embodiment, the predetermined time period is 20 msec as an example. D2D-PDCCH notifies the user equipment and the advanced user equipment of radio resource for D2D data transmission time duration following the sub-frame when D2D-PDCCH is transmitted. For example, D2D-PDCCH #0 assigns the radio resource for the D2D data transmission time duration #0, D2D-PDCCH #1 assigns the radio resource for the D2D data transmission time duration #1, and so on.

When there is no traffic data to be transmitted in the D2D connection 710, no D2D-PDCCH is transmitted for the D2D connection 710 and no radio resource is used in the D2D connection 710, similarly to PDCCH in LTE. As a result, efficient radio resource assignment can be achieved. The base station may notify the user equipment and the advanced user equipment of the predetermined time period in the broadcast channels. Alternatively, the base station may notify the user equipment and the advanced user equipment of the predetermined time period in the control signaling for establishing or reconfiguring the D2D connections. The radio resource assignments may need to be conducted frequently in some deployment scenarios, and not so frequently in others. The predetermined time period can be adjusted based on such deployment scenarios by the above procedures, in which the base station notifies the user equipment 100 and the advanced user equipment of the predetermined time period in some control signaling.

The length of the D2D data transmission time duration following the sub-frame when D2D-PDCCH is transmitted may be the same as the predetermined time period. In this sense, the base station may notify the user equipment and the advanced user equipment of the length of the D2D data transmission time duration instead of the predetermined time period.

The time difference between the sub-frame in which D2D-PDCCH is transmitted and the sub-frame which corresponds to the first sub-frame in the D2D data transmission time duration may be predetermined. For example, the time difference may be 8 msec or other values. Alternatively, the time difference may have a range of values, i.e. the time difference may be from 8 msec to 12 msec.

Parameters for radio resource assignment which are transmitted in D2D-PDCCH may be the same as or be similar to the ones which are transmitted in PDCCH of LTE. For example, the parameters transmitted in D2D-PDCCH may include at least one of "assignment information of resource blocks," "ID of the user equipment," "ID of the advanced user equipment," "the number of streams," "information about Pre-coding Vector," "data size," "modulation scheme," "information about HARQ (hybrid automatic repeat request)," "transmission power control command," "information about demodulation reference signal," and similar parameters. If there are more than one D2D carriers, a carrier indicator may also be included in the parameters for the radio resource assignment.

Furthermore, the parameters transmitted in D2D-PDCCH may include the ones for both downlink and uplink. The downlink corresponds to the link from the advanced user equipment to the user equipment, and the uplink corresponds to the link from the user equipment to the advanced user equipment. Alternatively, two D2D-PDCCHs may be transmitted in order to indicate the parameters for downlink and uplink.

Furthermore, the parameters transmitted in D2D-PDCCH may include information on the downlink/uplink assignment in the D2D data transmission time duration as illustrated in FIGS. 38, 38A, and 39. The D2D-PDCCH parameters may notify the user equipment and the advanced user equipment whether a sub-frame is for a DL or UL transmission. There may be one or more than one sub-frames in which neither DL transmission nor UL transmission is conducted as illustrated for sub-frames #12, #13, #14, and #15 in FIG. 38A. In FIGS. 38, 38A, and 39, the length of the D2D data transmission time duration is 20 msec. In FIG. 38, information which indicates for each sub-frame whether the sub-frame is for downlink (DL) or uplink (UL) assignment is transmitted. In FIG. 38, # n is an arbitrary identification number for the D2D data transmission time duration (consisting of 20 sub-frames). Alternatively, some patterns for the downlink and uplink assignment are defined as illustrated in FIG. 39 such that an identification number of the pattern may be transmitted in the D2D-PDCCCH. The number of patterns is a design parameter and can be greater than the two shown in FIG. 39.

The above-mentioned ID of the user equipment and the advanced user equipment may be replaced with an ID of D2D connection 710. In this case, the base station may assign one ID of D2D connection 710 to the user equipment and the advanced user equipment. The base station may notify the user equipment and the advanced user equipment of the ID of the D2D connection in the control signaling for establishing or reconfiguring the D2D connection. For example, the ID of D2D connection 710 may correspond to a Radio Network Temporary Identifier (RNTI) and designated as D2D-RNTI. Since one RNTI is used for both the user equipment and the advanced user equipment, the overhead of control signaling may be reduced.

When the user equipment and the advanced user equipment receive D2D-PDCCH, the user equipment and the advanced user equipment communicate with each other in the D2D data transmission time duration identified in the D2D-PDCCH in D2D connection 710. Radio resource information and transport format information in the D2D data transmission time duration may be included in the D2D-PDCCH. For example, the user equipment and the advanced user equipment communicate with each other over D2D data transmission time duration #0 when they receive D2D-PDCCH #0, the user equipment and the advanced user equipment communicate with each other in the D2D data transmission time duration #1 when they receive D2D-PDCCH #1, and so on as illustrated in FIG. 37.

When the user equipment or the advanced user equipment transmits data in D2D connection 710, a transmission power (TXPOW) may be calculated in the following equation:

$$TXPOW = \min(MaxPOW, 10\log_{10}(M + P_0 + \alpha \cdot PL + f))$$

where MaxPOW is the maximum transmission power in D2D connection 710, M is the transmission bandwidth, $P_0$ is a parameter for power control (called Parameter # A hereinafter), $\alpha$ is a parameter for power control (called Parameter # B hereinafter), PL is the path loss, and f is a value calculated from TPC commands. The transmission bandwidth may be included as part of control information in D2D-PDCCH. For example, it may correspond to the number of resource blocks. Alternatively, the base station may notify the user equipment and the advanced user equipment of the maximum transmission power in the control signaling for establishing or reconfiguring the D2D connection. Parameters # A and # B may be included as part of control information in D2D-PDCCH. Alternatively, the base station may notify the user equipment and the advanced user equipment of parameters # A and # B in the control signaling for establishing or reconfiguring the D2D connection. Path loss may be calculated by the user equipment and the advanced user equipment. The value f may be calculated from TPC commands. For example, it may be derived from accumulating received TPC commands.

In one embodiment, parameter # B can be set to 1.0 so that it can be expected that received SIR is almost the same for all D2D connections irrespective of the path loss. Alternatively, Parameter # B can be set to 0.8 so that it can be expected that received SIR is small when the path loss is large whereas received SIR is large when the path loss is small. As a result, interference can be mitigated when the path loss is large, while throughput can be enhanced without causing interference with other connections when the path loss is small. Parameter # B thus applies fractional power control on D2D connection 710. Parameter # A can adjust initial transmission power at the beginning of the communication so that transmission power can be adjusted based on the TPC commands. Examples for using the TPC commands will be described below with reference to FIG. 44.

If the user equipment and the advanced user equipment do not receive D2D-PDCCH, they do not communicate with each other in the D2D data transmission time duration corresponding to the D2D-PDCCH in D2D connection 710. For example, the user equipment and the advanced user equipment do not communicate with each other in the D2D data transmission time duration #0 if they do not receive D2D-PDCCH #0, they do not communicate with each other in the D2D data transmission time duration #1 if they do not receive D2D-PDCCH #1, and so on.

D2D-PDCCH may be transmitted in LTE connection 720 or in LTE connection 730 in the same way as PDCCH in LTE, i.e. D2D-PDCCH may be transmitted in the first one, two, or three OFDM symbols in a sub-frame. Alternatively, D2D-PDCCH may be transmitted in the LTE connection 720 or in the LTE connection 730 similarly to R-PDCCH in LTE. In yet another alternative embodiment, D2D-PDCCH may be transmitted in the LTE connection 720 or in the LTE connection 730 as part of PDSCH or as data mapped to PDSCH in LTE.

If D2D-RNTI is used, one D2D-PDCCH is transmitted to both the user equipment and the advanced user equipment. In this case, LTE connection 720 is the same as the LTE connection 730 in terms of D2D-PDCCH. As illustrated in FIG. 37, D2D-BSR is transmitted once per a predetermined time period. For example, the predetermined time period may be 20 msec or 40 msec or other values. In FIG. 37, the predetermined time period is 20 msec as an example. The predetermined time period for D2D-BSR may be the same as that for D2D-PDCCH or may be different from D2D-PDCCH. The predetermined time period for D2D-BSR may be transmitted to the user equipment and the advanced user equipment by the base station analogously to the predetermined time period transmission for D2D-PDCCH described above.

The user equipment notifies the base station of buffer status in the user equipment using D2D-BSR. Similarly, the advanced user equipment notifies the base station of its buffer status using D2D-BSR. There are three options for how to transmit D2D-BSR. At least one of the three options may be utilized as follows:

First Option for Transmitting D2D-BSR.

In this case, only the user equipment transmits D2D-BSR to the base station 200. The user equipment may transmit its buffer status for D2D UL (from the user equipment to the advanced user equipment). Alternatively, the user equipment may transmit the buffer status and its data reception history for D2D DL (from the advanced user equipment to the user equipment). The data reception history may correspond to the data reception history in the previous D2D data transmission time duration. For example, the data reception history may correspond to the data reception history in the D2D data transmission time duration #0 and #1 when D2D-BSR #3 is transmitted as shown in FIG. 37. The user equipment 100 does not have information on buffer status for D2D DL, because the transmission buffer for D2D DL exists in the advanced user equipment. However, the buffer status for D2D DL may be estimated by the data reception history in the user equipment. If the data reception history indicates that the user equipment has recently received data over the D2D DL, it then can be estimated that data remains to in the advanced user equipment transmission buffer for D2D DL. If there is no data reception history of recently received data, it then can be estimated that no data remains to be transmitted in the transmission buffer for D2D DL.

The base station may notify the user equipment of the number of D2D data transmission time durations that should be considered to form the data reception history. If this number is large, the base station must wait a relatively long time to get D2D data but the information is relatively reliable because the buffer status is observed over a long period. On the other hand, if this number is small, the base station need not wait so long for D2D data but the information may be relatively unreliable because the buffer status is observed over a short period. For example, if traffic data is occasional, a relatively short buffer status observation period can indicate that there is no data to be transmitted. Therefore, the number of the D2D data transmission time durations that should be considered in forming the data reception history represents a trade-off between information delay and reliability. The base station may notify the user equipment of the number of the D2D data transmission time durations which should be considered in the data reception history when it transmits the control signaling for establishing or reconfiguring the D2D connections. If the radio resource for D2D connection 710 is assigned by D2D-PDCCH but there exists no actual data to be transmitted in the corresponding D2D data transmission time duration even if some header data or padding bits must be transmitted, it may be regarded as no data transmission in the data reception history. No actual traffic data may be regarded as zero-byte-data-size data.

Second Option for Transmitting D2D-SSR

In this embodiment, only the advanced user equipment transmits D2D-BSR to the base station. In this case, the advanced user equipment may transmit only buffer status for D2D DL. Alternatively, the advanced user equipment may transmit the buffer status and the data reception history for D2D UL. The data reception history may correspond to the data reception history in the previous D2D data transmission time duration(s). For example, the data reception history may be formed using the D2D data transmission time durations #0 and #1 when D2D-BSR #3 is transmitted as shown in FIG. 37.

The advanced user equipment does not have information on buffer status for D2D UL, because that transmission buffer status is known only by the user equipment. However, the buffer status for D2D UL may be estimated by the data reception history in the advanced user equipment. If the data reception history indicates that the advanced user equipment has recently received data in D2D UL, it can be estimated that there is data to be transmitted in the transmission buffer for D2D UL. Conversely, if the data reception history indicates that the advanced user equipment has not recently received data over the D2D DL, it can be estimated that there is no data to be transmitted in the transmission buffer for D2D UL.

The base station may notify the advanced user equipment of the number of the D2D data transmission time durations which should be used to form the data reception history. If this number is large, the base station must wait a relatively long time to get the buffer status for the D2D UL is delayed but this status will be reliable because the buffer status is observed over this relatively long period. Conversely, if the number of D2D data transmission time durations over which the data reception history is gathered is relatively small, the base station will get the buffer status information more frequently but it will be less reliable. Therefore, "the number of the D2D data transmission time durations which should be considered in the data reception history" represents a trade-off between information delay and reliability. The actual duration of the data collection period may be used in lieu of specifying the number of D2D data transmission time durations. The base station may notify the advanced user equipment of the number of the D2D data transmission time durations which should be considered in the data reception history when it transmits the control signaling for establishing or reconfiguring the D2D connections. If the radio resource for D2D connection 710 is assigned by D2D-PDCCH but there is no actual traffic data to be transmitted (even if some header data or padding bits are transmitted), the data reception history may consider this as constituting no data transmission in the data reception history. No actual traffic data may be regarded as zero-byte-data-size data.

Third Option for Transmitting D2D-BSR

Both the user equipment and the advanced user equipment 500 transmit D2D-BSR to the base station. The D2D-BSR may indicate the data amount in the data buffer or may indicate amount of the data in the data reception history. Alternatively, the D2D-BSR may indicate whether data exist in the data buffer or whether data is actually transmitted in the data reception history. For example, a flag bit may be used to indicate that there is data to be transmitted.

PUCCH may be utilized for transmitting D2D-BSR in LTE connection 720 or in LTE connection 730. For example, a scheduling request for D2D connections may be used for transmitting D2D-BSR. Alternatively, PUSCH may be utilized for transmitting D2D-BSR in LTE connections 720 and 730. That is, D2D-BSR may be mapped to PUSCH. In another embodiment, two types of D2D-BSR may be transmitted. A first type indicates the amount of the data in data buffer or in the data reception history. A second type indicates whether data exist in the data buffer or whether data is actually transmitted in the data reception history. The first type may be transmitted less frequently than the second type. For example, the former may be transmitted every 80 msec and the latter may be transmitted every 20 msec. In some embodiments, the latter may be transmitted by both the user equipment and the advanced user equipment whereas the former may be transmitted only by the user equipment. The signaling overhead for the latter is not so large so even though it is transmitted by both the user equipment and the advanced user equipment, its transmission does not increase the signaling overhead so much. Furthermore, the signaling overhead for the former is comparable to a buffer status report in conventional LTE, i.e. there is no additional overhead. Therefore, the increase of the signaling overhead can be minimized.

Figure 37A:
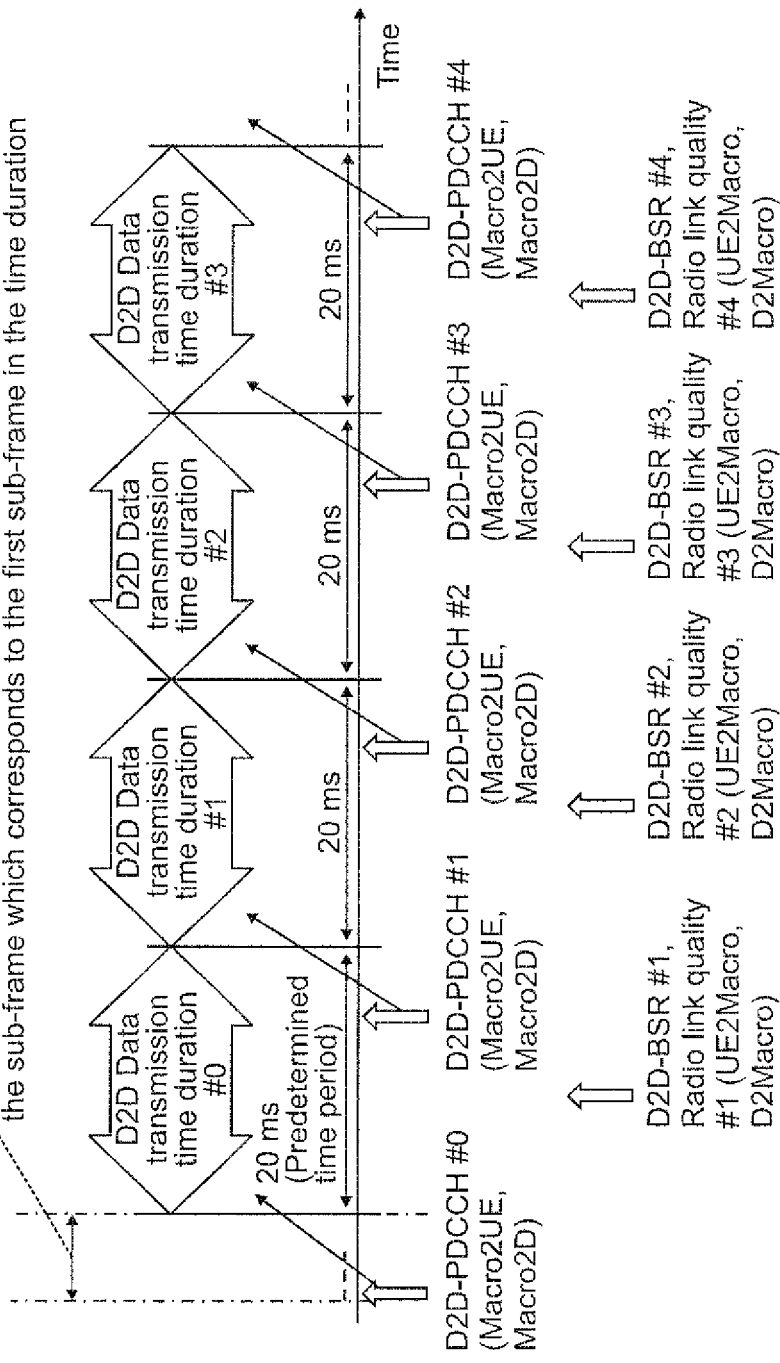
FIG. 37A illustrates a plurality of D2D data transmission durations.

The base station utilizes D2D-BSR to determine whether or not it should transmit D2D-PDCCH to the user equipment and the advanced user equipment. For example, if D2D-BSR indicates that there is data to be transmitted over the D2D link, the base station transmits D2D-PDCCH to the user equipment and the advanced user equipment. Conversely, if there is no data to be transmitted over the D2D link according to the D2D-BSR, the base station does not transmit D2D-PDCCH to the user equipment and the advanced user equipment. As a result, the base station can avoid assigning the radio resources to an idle D2D link to maximize efficient resource assignment. Furthermore, the D2D-related radio link quality may be transmitted in the Macro2UE link and/or in the Macro2D link as illustrated in FIG. 37A. The radio link quality may correspond to at least one of pilot signal received power in the D2D connection, path loss in the D2D connection, signal-to-interference ratio (SIR) in the D2D connection, channel state information in the D2D connection, channel quality indicator in the D2D connection, and received signal strength indicator in the D2D connection. The base station may utilize the D2D-related radio link quality to determine transport formats in the D2D connection 710. For example, the base station may determine the transport formats in the D2D connection based on its path loss and a look-up table shown in FIG. 40. In this lookup table, the path loss is utilized to select the transport formats. In other embodiments, parameters besides the path loss, such as the pilot signal received power, the SIR, the channel state information, the channel quality indicator, and the received signal strength may be used to determine the transport formats.

Figure 41:
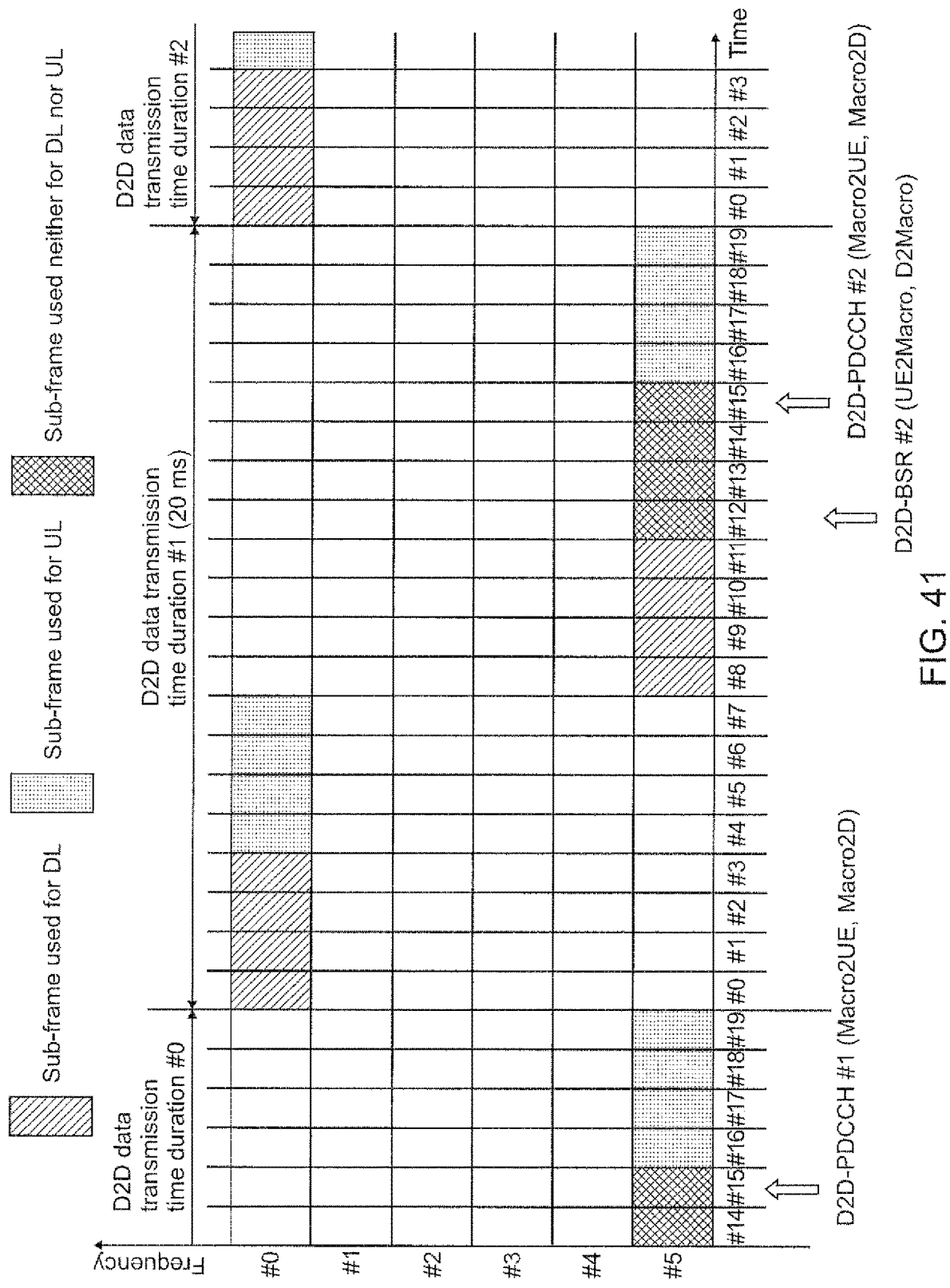
FIG. 41 illustrates a plurality of sub-frames for both the UL and DL in the D2D link.

FIG. 41 illustrates the time domain and frequency domain radio resources for the D2D connection. The sub-frames #0, #1, #2, #3, #8, #9, #10, and #11 are used for D2D DL in the D2D data transmission time durations #0, #1 and #2. For the sub-frames #0, #1, #2, and #3, the frequency resource #0 is assigned whereas for sub-frames #8, #9, #10, and #11, the frequency resource #5 is assigned. D2D-PDCCH #1 notifies the user equipment and the advanced user equipment of the radio resource assignment for the D2D data transmission time duration #1. The sub-frames #4, #5, #6, #7, #16, #17, #18, and #19 are used for D2D UL in the D2D data transmission time durations #0, #1 and #2. For sub-frames #4, #5, #6, and #7, the frequency resource #0 is assigned whereas for sub-frames #16, #17, #18, and #19, the frequency resource #5 is assigned. D2D-PDCCH #1 notifies the user equipment 100 and the advanced user equipment 500 of the radio resource assignment for the D2D data transmission time duration #1. In this case, D2D-PDCCH #1 may indicate the radio resource for both DL and UL, or for only DL, or for only UL. Alternatively, two D2D-PDCCHs #1 may be transmitted in order to indicate the radio resource for DL and UL.

In FIG. 41, data transmission is conducted in all the D2D data transmission time durations #0, #1, and #2, but it may be conducted in just some of the D2D data transmission time durations #0, #1, and #2. This selection depends on whether there is data to be transmitted in the D2D connection 710. If there is no data, a D2D-PDCCH is not transmitted for the D2D data transmission time duration and no transmissions are conducted in the D2D data transmission time duration.

In sub-frames #12, #13, #14, and #15, no data is transmitted in the D2D connection. Thus, neither a D2D DL nor a D2D UL transmission is conducted. During sub-frames #12, #13, #14 and #15, D2D-PDCCH may be transmitted in the LTE connection 720 or 730. During sub-frames #12, #13, #14 and #15, D2D-BSR may be transmitted in the LTE connection 720 or 730.

The time domain resources may thus be divided into two parts. A first part may be utilized for the D2D connection whereas the second part may be utilized for transmissions of D2D-PDCCH or D2D-BSR in LTE connection 720 (Macro2UE link) or LTE connection 730 (Macro2D link) as illustrated in FIG. 41. The user equipment or the advanced user equipment may transmit data in the second part of the time domain resources using LTE connection 720 or LTE connection 730, respectively. The user equipment or the advanced user equipment may switch its radio frequency components and interfaces in the transition between the two parts. As a result, the user equipment or the advanced user equipment can service their LTE connection and their D2D connection in a time-division multiplexing manner without carrier aggregation functions. According to the time frame structure illustrated in FIG. 41, the base station can transmit control signaling for radio resource assignments on the D2D connection in a timely manner. Similarly, the user equipment and the advanced user equipment may transmit buffer status report for the D2D connection 710 in a timely manner.

FIGS. 42 (*a*) and 42 (*b*) illustrate examples of a sub-frame format for D2D DL and of a sub-frame format for D2D UL. The sub-frame format for D2D DL may consist of DL control information, UL control information, and a data part, as illustrated in FIG. 42 (*a*). The sub-frame format is just an example and may be varied in alternative embodiments. The DL control information may consist of a HARQ process ID for the data part, a New Data Indicator (NDI) for the data part, and a Redundancy Version (RV) parameter for the data part. In an alternative embodiment, transmission power in the sub-frame may be included in the DL control information.

The UL control information may consist of a HARQ process ID for D2D UL, an Acknowledgement information (ACK/NACK) for D2D UL, and a Transmission Power Control command (TPC command) for D2D UL. The HARQ process ID represents the process ID for the ACK/NACK for D2D UL. The TPC command may be derived from the received SIR and the target SIR in D2D UL. The target SIR may be set to a different value for each transport format. For example, the target SIR may be set to a higher value for 16QAM as opposed to the target SIR value for QPSK. For example, the target SIR may be 0 dB for the transport format #1 and may be 10 dB for the transport format #3 in the table shown in FIG. 40. Thus, the target SIR may be decided based on the path loss.

The sub-frame format for D2D UL may consist of UL control information, DL control information, and a data part, as illustrated in FIG. 42 (b). The UL control information may consist of a HARQ process ID for the data part, a New Data Indicator (NDI) for the data part, and a Redundancy Version (RV) parameter for the data part. In an alternative embodiment, transmission power in the sub-frame may be included in the UL control information.

The DL control information may consist of a HARQ process ID for D2D DL, an Acknowledgement information (ACK/NACK) for D2D DL, and a Transmission Power Control command (TPC command) for D2D DL. The HARQ process ID represents the process ID for the ACK/NACK for D2D DL. The TPC command may be derived from the received SIR and the target SIR in D2D DL. The target SIR may be set to a different value for each transport format as discussed above with regard to the D2D DL sub frame format.

FIG. 43 illustrates examples of the DL control information and the UL control information in D2D DL, and of the UL control information and the DL control information in D2D UL in one D2D data transmission time duration. In the DL control information, new transmissions are conducted in the sub-frame #0, #1, #2 and #3 for the HARQ process #0, #1, #2, and #3, respectively, and data are correctly decoded for HARQ process #0 and #1, while data are not correctly decoded for the HARQ process #2 and #3. That is, NACKs are transmitted for the HARQ process #2 and #3 in the DL control information of the D2D UL transmission in the sub-frame #6 and #7, respectively (ACKs are transmitted for the HARQ process #0 and #1 in the DL control information of the D2D UL transmission in the sub-frame #4 and #5, respectively). Then, new transmissions are conducted in the sub-frames #8 and #9 (NDI is toggled), and retransmissions are conducted in the sub-frames 10 and #11 (NDI is not toggled). RV parameters may be changed for the retransmissions.

For D2D UL, new transmissions are conducted in the sub-frame #4, #5, #6 and #7 for the HARQ process #0, #1, #2, and #3, respectively, and data are correctly decoded for the HARQ process #1 and #3, while data are not correctly decoded for the HARQ process #0 and #2. That is, NACKs are transmitted for the HARQ process #0 and #2 in the UL control information of the D2D DL transmission in sub-frames #8 and #10, respectively (ACKs are transmitted for the HARQ process #1 and #3 in the UL control information of the D2D DL transmission in sub-frames #9 and #11, respectively). Then, new transmissions are conducted in the sub-frames #17 and #19 (NDI is toggled), and retransmissions are conducted in the sub-frames 16 and #18 (NDI is not toggled). RV parameters may be changed for the retransmissions.

FIG. 44 illustrates examples of the control information contained in D2D-PDCCH. For example, the control information may consist of frequency domain resource information, time domain resource information and transport format information. The frequency domain resource information may correspond to the identification number of the frequency domain resource, such as #0, #1, #2, #3, #4, and #5 in FIG. 41. Alternatively, the frequency domain resource information may correspond to an identification number for resource blocks or resource block groups. The time domain resource information may correspond to the information illustrated in FIGS. 38, 38A and 39. The transport format information may correspond to the information which is illustrated in FIG. 40. More specifically, the transport format information may include at least one of modulation scheme, coding rate, and data size.

Figure 45:
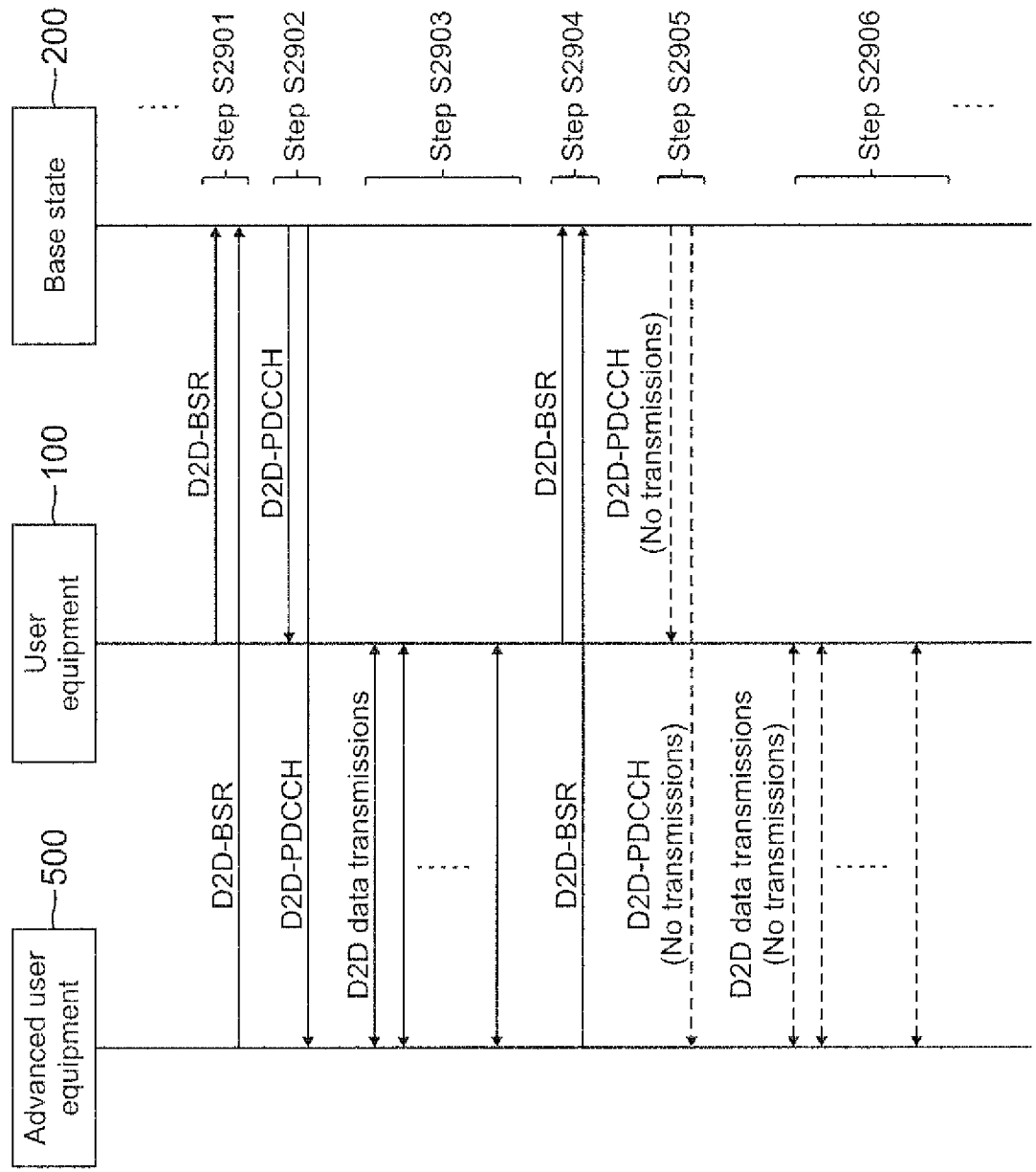
FIG. 45 illustrates the call flow for the D2D-PDCCH and D2D-BSR transmissions.

Turning now to FIG. 45, a process flow for a mobile communication system is described. In a step S2901, the user equipment transmits D2D-BSR to the base station, and the advanced user equipment transmits D2D-BSR to the base station. Alternatively, just one of the user equipment and the advanced user equipment may transmit D2D-BSR as described above. Here, D2D-BSR indicates that there is data to be transmitted in the D2D connection.

In a step S2902, the base station transmits D2D-PDCCH to the user equipment and the advanced user equipment in response to the D2D-BSR indication that there is data to be transmitted in the D2D connection.

In a step S2903, the user equipment and the advanced user equipment communicate with each other using D2D connection 710 responsive to the control information in D2D-PDCCH. For example, transmissions may be conducted for 20 msec or 40 msec durations in the D2D connection as described above. Step S2903 corresponds to step A805 in FIG. 12A. Data transmitted from the user equipment in the D2D connection are transferred to server 600 over the D2D connection. Similarly, data transmitted from server 600 to the user equipment are transferred in the D2D connection 710.

In a step S2904, the user equipment transmits D2D-BSR to the base station, and the advanced user equipment transmits D2D-BSR to the base station. Alternatively, one of the user equipment and the advanced user equipment may transmit D2D-BSR as described above. Here, D2D-BSR indicates that there is no data to be transmitted in D2D connection 710.

In a step S2905, the base station does not transmit D2D-PDCCH to the user equipment 100 and the advanced user equipment 500. Thus, in a step S2906, there are no transmissions in the D2D connection 710.

Figure 46:
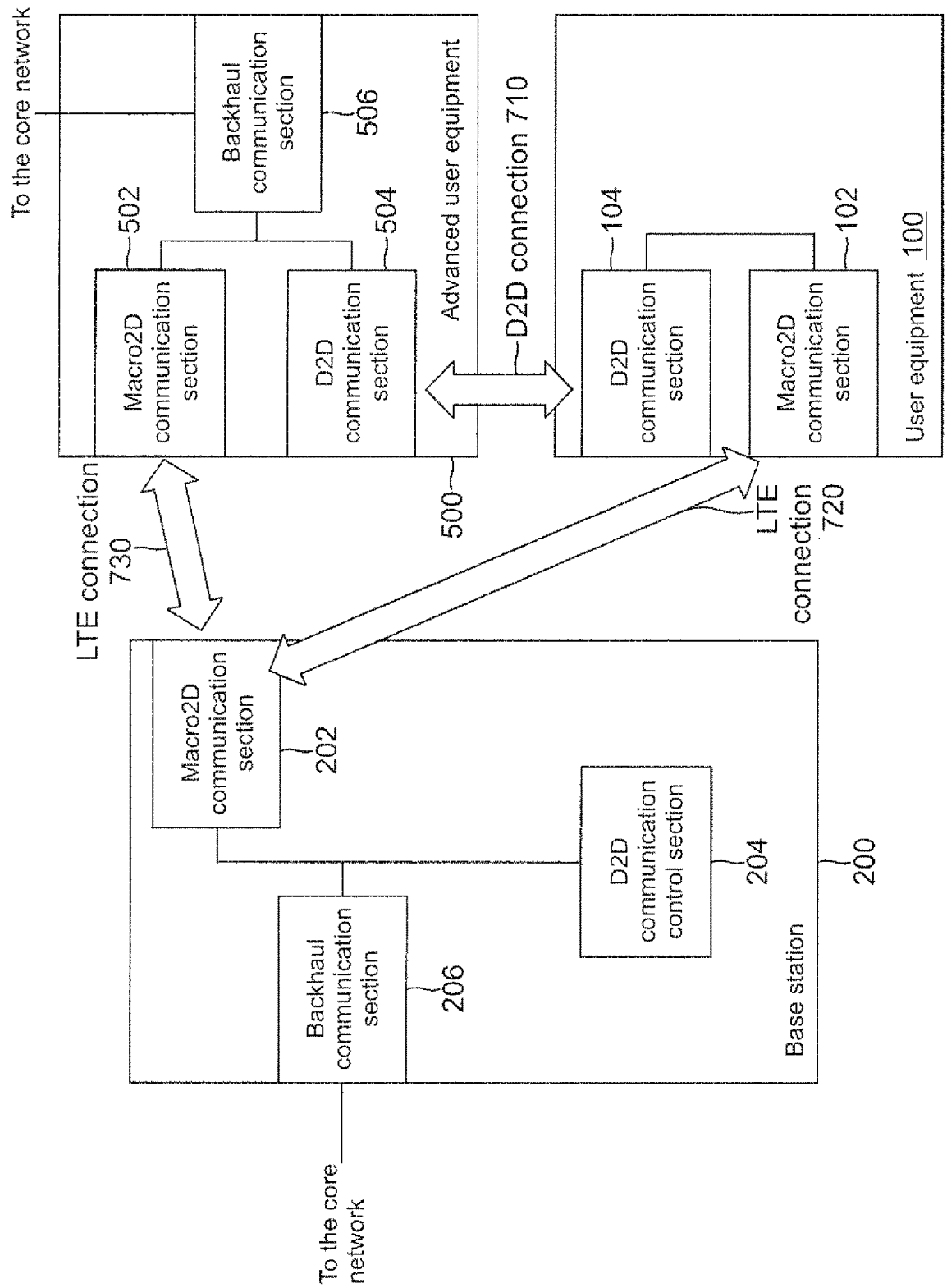
FIG. 46 illustrates the functional relationship between elements of the enhanced local access radio system.

FIG. 46 illustrates a functional block diagram of the base station, the user equipment, and the advanced user equipment to illustrate the measurement procedures in the radio communication system. The functional blocks in FIG. 46 is the same as the ones in FIGS. 9, 10, and 11, and therefore only functions related to the radio resource allocation procedures will be explained and explanation of other functions will be omitted in the following. In steps S2901 and S2904, Macro 2D communication section 502 in advanced user equipment 500 transmits D2D-BSR to base station 200, and Macro2D communication section 102 in user equipment 100 transmits D2D-BSR to the base station. Macro2D communication section 502 may receive information on buffer status on the D2D connection 710 from the D2D communication section 504. The Macro2D communication section 102 may receive information on buffer status on the D2D connection 710 from the D2D communication section 104. D2D-BSR is transmitted to the D2D communication control section 204 via the Macro2D communication section 202 in the base station 200.

In steps S2902 and S2905, the D2D communication control section 204 decides radio resource which should be assigned to the D2D connection 710, decides a transport format used in the D2D connection 710, and transmits D2D-PDCCH, which transmits information on the radio resource and the transport format, to the user equipment 100 and the advanced user equipment 500 via the Macro2D communication section 202. The D2D communication control section 204 may decide that no D2D-PDCCH should be transmitted in case that there is no data to be transmitted in the D2D connection 710, as described in the step S2905. The information of D2D-PDCCH is transmitted to the D2D communication section 504 in the advanced user equipment 500. The information of D2D-PDCCH is transmitted to the D2D communication section 104 in the user equipment 100.

In the steps S2903 and S2906, the D2D communication section 104 in the user equipment 100 and the D2D communication section 504 in the advanced user equipment 500 communicate with each other based on the information of D2D-PDCCH. According to the embodiments of the invention, the base station 200 mainly conducts the radio resource assignment procedures, and therefore the complexity of the advanced user equipment 500 may be minimized. According to the embodiments of the invention, the base station 200 transmits D2D-PDCCCH in the predetermined time period, such as 20 msec and 40 msec, and therefore the flexibility of the radio resource assignment can be achieved to some extent. For example, in case that no data to be transmitted exist in the transmission buffer for a D2D connection, the base station 200 does not transmit D2D-PDCCH to the D2D connection. As a result, efficient resource allocation can be achieved. The base station 200 can easily detect whether data to be transmitted exist in the transmission buffer or not, utilizing D2D-BSR, as described above.

As described above, if a node, which conducts radio resource allocation procedures, does not have a transmission buffer, it is not easy to detect whether data to be transmitted exist in the transmission buffer. In conventional radio communication system, buffer status report or scheduling request is transmitted so that the node can get information on status of the transmission buffer, but transmission of the buffer status report or the scheduling request is not frequently transmitted so that overhead of such signaling should be minimized. D2D-PDCCH or D2D-BSR can be transmitted as frequently as such signaling as the buffer status report or the scheduling request in the conventional radio communication system. In this sense, the flexibility of the radio resource assignment can be maintained in the hybrid D2UE and Macro2UE system, compared to the conventional radio communication system.

According to the embodiments of the invention, the base station 200 changes transport formats in the D2D connection based on the radio link quality which is reported by the user equipment 100 or the advanced user equipment 500. As a result, it is possible for the base station 200 to conduct the adaptive modulation and coding appropriately in the D2D connection.

In the above mentioned embodiment, the base station 200 notifies the user equipment 100 and the advanced user equipment 500 of not only the radio resource information, but also the transport information. In other embodiments, however, the base station 200 may notify the user equipment 100 and the advanced user equipment 500 of only the radio resource information. In this case, the advanced user equipment 500 or the user equipment 100 may decide the transport formats and notify each other of the decided transport formats in the D2D connection 710. In other embodiments, furthermore, the base station 200 may notify the user equipment 100 and the advanced user equipment 500 of only part of the radio resource information. In this case, the advanced user equipment 500 or the user equipment 100 may decide the remaining part of the radio resource and the transport formats and notify each other of the decided transport formats in the D2D connection 710. Here, the radio resource information may correspond to the time domain resource information and the frequency domain resource information, and the transport format information may correspond to at least one of the modulation scheme, coding rate, data size and the like.

Backhaul

Aspects of the backhaul link between the UE-A and the core network (and/or the Internet) will now be discussed. The backhaul design is complicated by the density of the deployed devices needing a backhaul link. When the density (number of devices per unit area) of the deployed base-stations or remote antenna units increases, some difficulties for the backhaul design emerge. For example, an operation cost of the backhaul is not negligible if the density increases, because the number of the backhaul links increases. Furthermore, there is sometimes no room for a wired backhaul link, or installation cost of such a wired backhaul is expensive. In this sense, it is desirable that the cost and complexity of the backhaul link should be reduced. A solution to reduce the cost and complexity of the backhaul link is to utilize D2D connections in the backhaul link because installation cost for a wireless link is much cheaper than that for a wired link.

Figure 47:
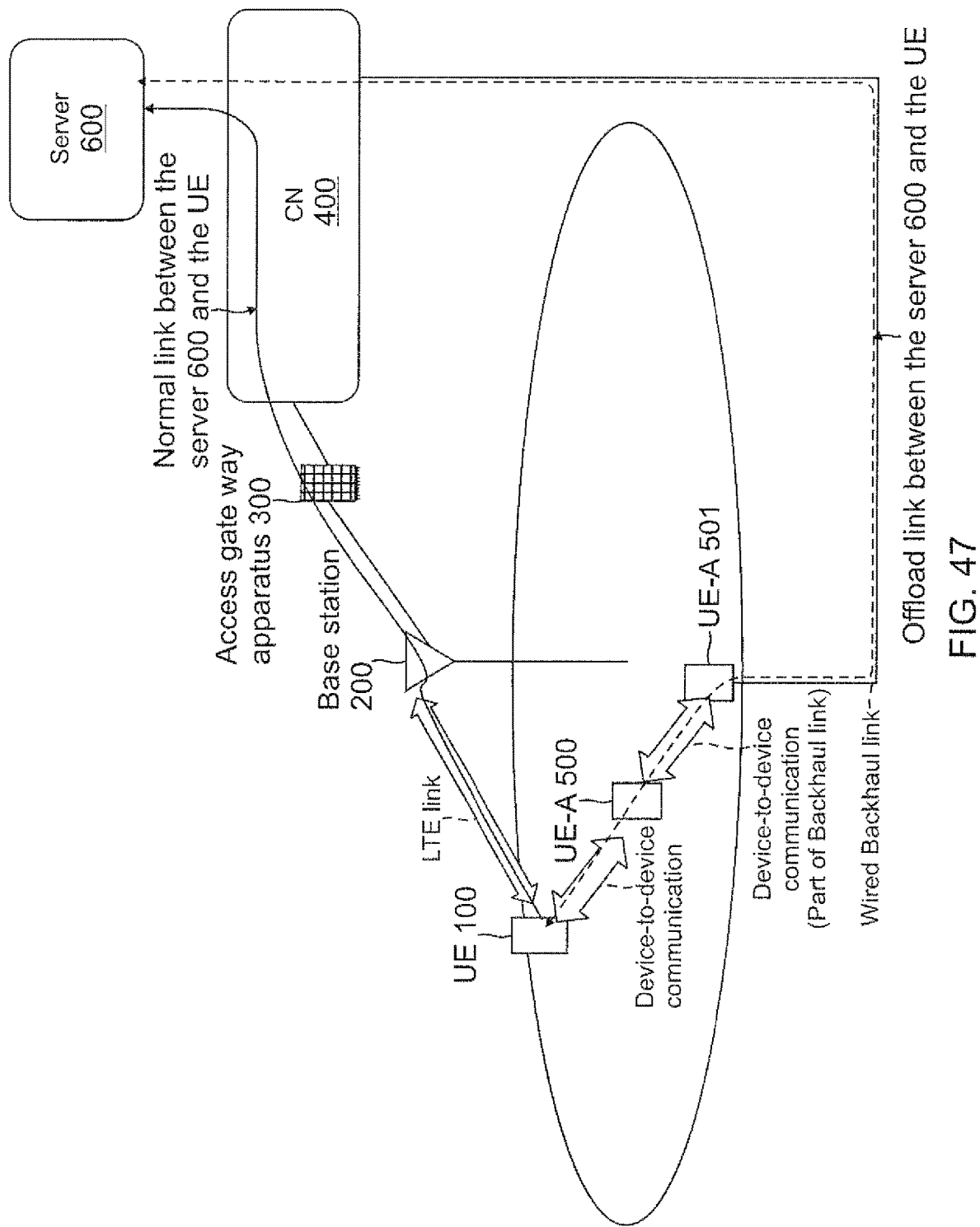
FIG. 47 illustrates an example architecture for an enhanced local area radio access system that includes a one-hop D2D backhaul communication link.

FIG. 47 illustrates an example backhaul embodiment in which the D2D connections are utilized not only for the D2UE link but also the backhaul link. The system shown in FIG. 47 is analogous to that shown in FIG. 2 except that the system of FIG. 47 includes an additional advanced user equipment (UE-A 501) an the backhaul link consists of a wired backhaul link and a D2D connection. Additional advanced user equipment (UE-A 501) relays data from advanced user equipment (UE-A 500) to the core network and vice versa. When user equipment 100 communicates with server 600, traffic data can be transported via the D2D communications and the backhaul link between advanced user equipment (UE-A) 500 and core network 400 for offload purposes. The backhaul link consists of a wired link between core network 400 and advanced user equipment (UE-A) 501 and a D2D (Device-to-Device) link between advanced user equipment (UE-A) 500 and advanced user equipment (UE-A) 501.

Figure 48:
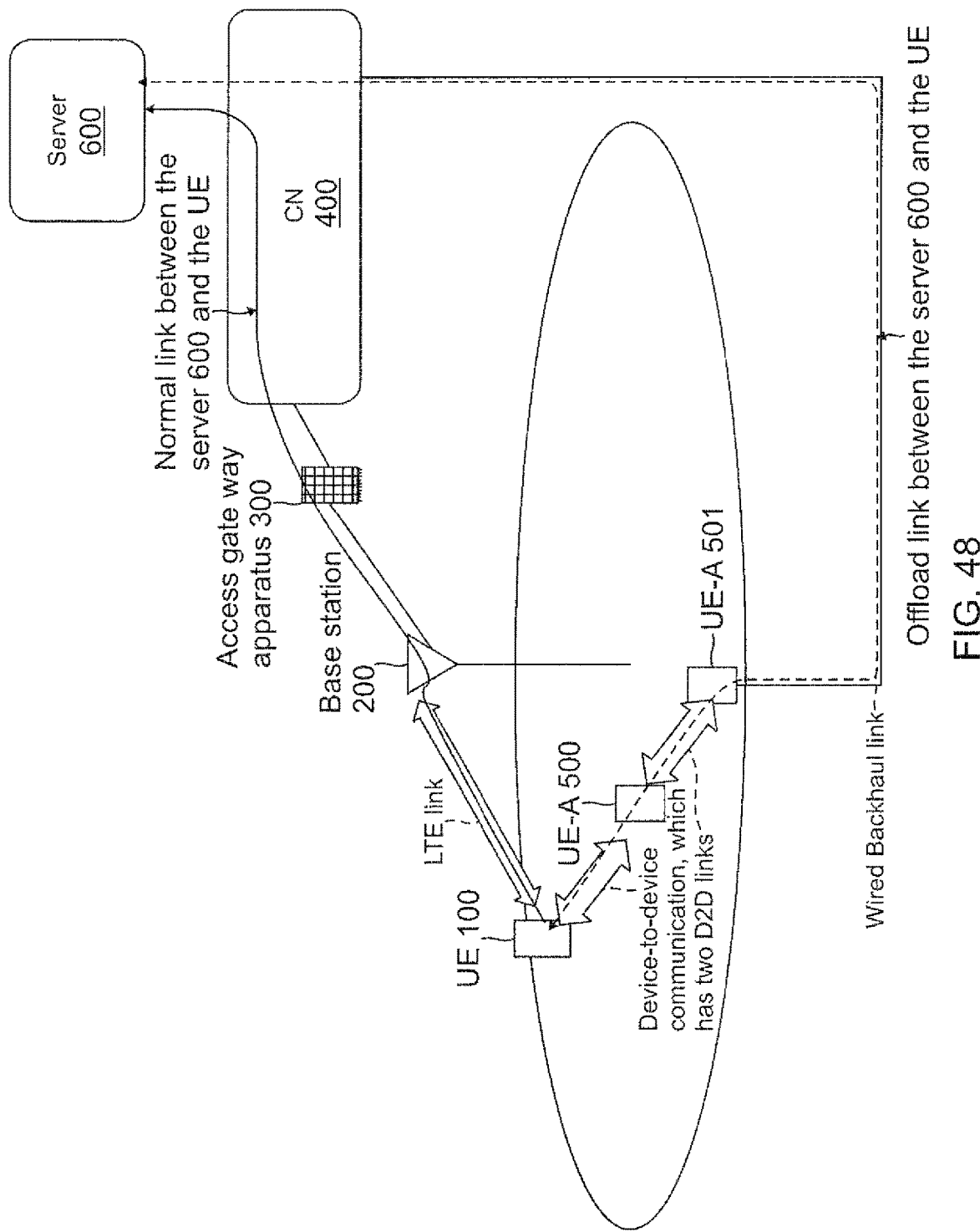
FIG. 48 illustrates additional features for the architecture of FIG. 47.

The system architecture shown in FIG. 47 may be better understood with reference to FIG. 48. As shown in FIG. 48, when user equipment 100 communicates with server 600, traffic data can be transported via the D2D communications and the backhaul link between advanced user equipment (UE-A) 501 and core network 400 for offload purposes. The D2D communications consist of the D2D link between user equipment 100 and advanced user equipment (UE-A) 500 and the D2D link between advanced user equipment (UE-A) 500 and advanced user equipment (UE-A) 501. That is, the D2D communications have a hopping function or a relay function. The resulting D2D link between advanced user equipment 500 and advanced user equipment 501 may be controlled by base station 200 in the same way as the D2UE link described above.

The D2D link between advanced user equipment 500 and advanced user equipment 501 may be always configured, or may be configured while data traffic exists.

In the system of FIG. 47 and FIG. 48, a one hop D2D link is used for a backhaul link, i.e. there are two advanced user equipment in the backhaul link. However, the number of backhaul D2D links may be more than one in alternative embodiments. Additional backhaul embodiments are described further as follows.

Figure 49:
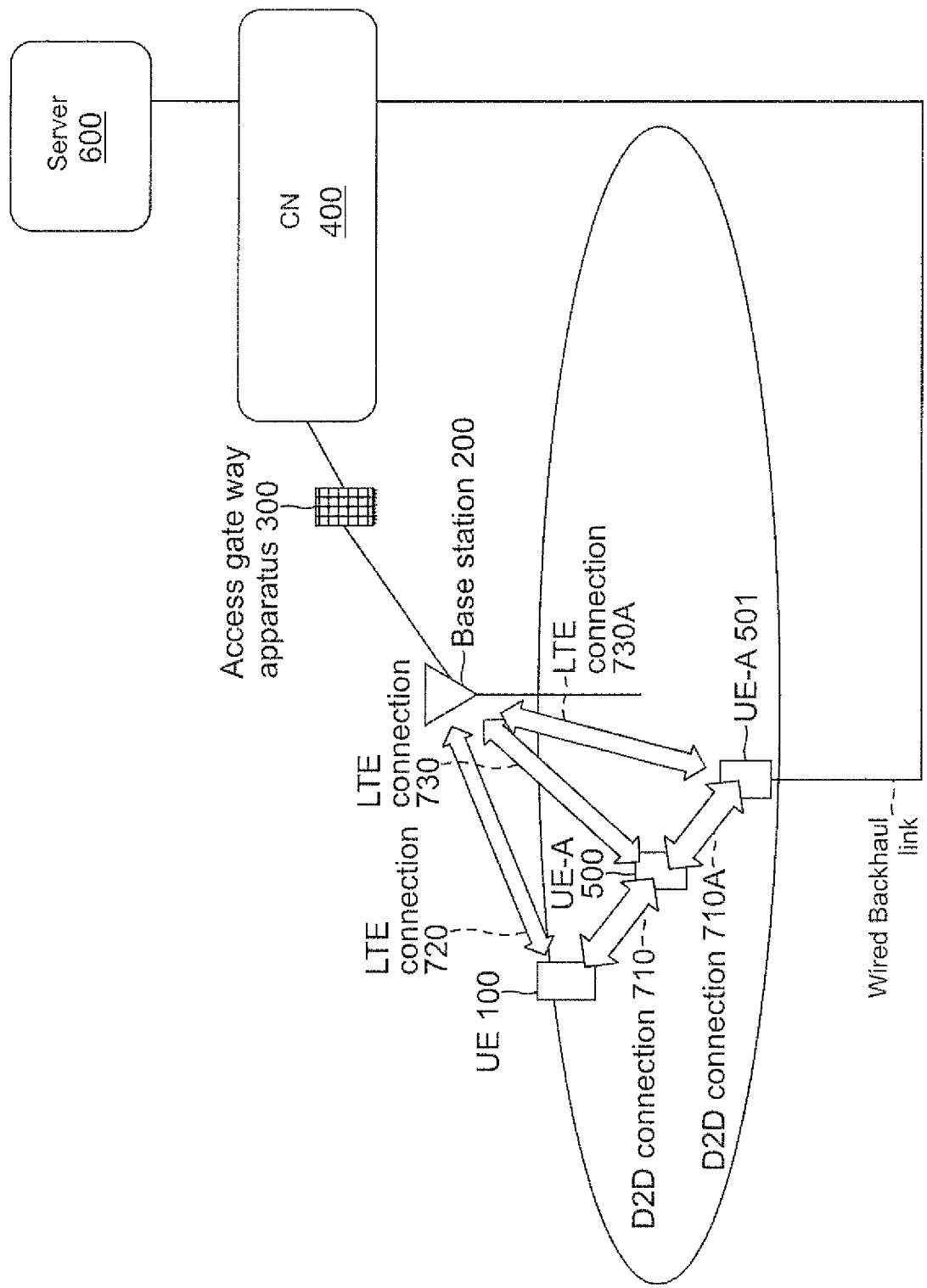
FIG. 49 illustrates the architecture of FIG. 47 with the communication links highlighted.

FIG. 49 illustrates the communication links in the one-hop backhaul link shown in FIGS. 47 and 48. As shown in FIG. 49, user equipment 100 communicates with base station 200 via LTE connection 720 and communicates with advanced user equipment 500 via D2D connection 710. Similarly, advanced user equipment 500 communicates with base station 200 via LTE connection 730, communicates with user equipment 100 via D2D connection 710, and communicates with advanced user equipment 501 via D2D connection 710A. In addition, advanced user equipment 501 communicates with base station 200 via LTE connection 730A, communicates with advanced user equipment 500 via the D2D connection 710A, and communicates with the core network 400 via a wired backhaul link.

Base station 200 communicates with user equipment 100, advanced user equipment 500, and advanced user equipment 501 via LTE connection 720, LTE connection 730, and LTE connection 730A, respectively. Base station 200 communicates with the access gate way apparatus 300 and the core network 400 as discussed above.

Because link 710A between UE-A 500 and UE-A 501 is a D2D link, the same functions discussed above with regard to D2D connection 710 apply also to D2D connection 710A. In this fashion, D2D connection 710A may be controlled by base station 200 analogously to how the base station controls D2D connection 710. As a result, the network operators can configure some parts of backhaul by utilizing the D2D link with low cost and complexity.

Figure 50:
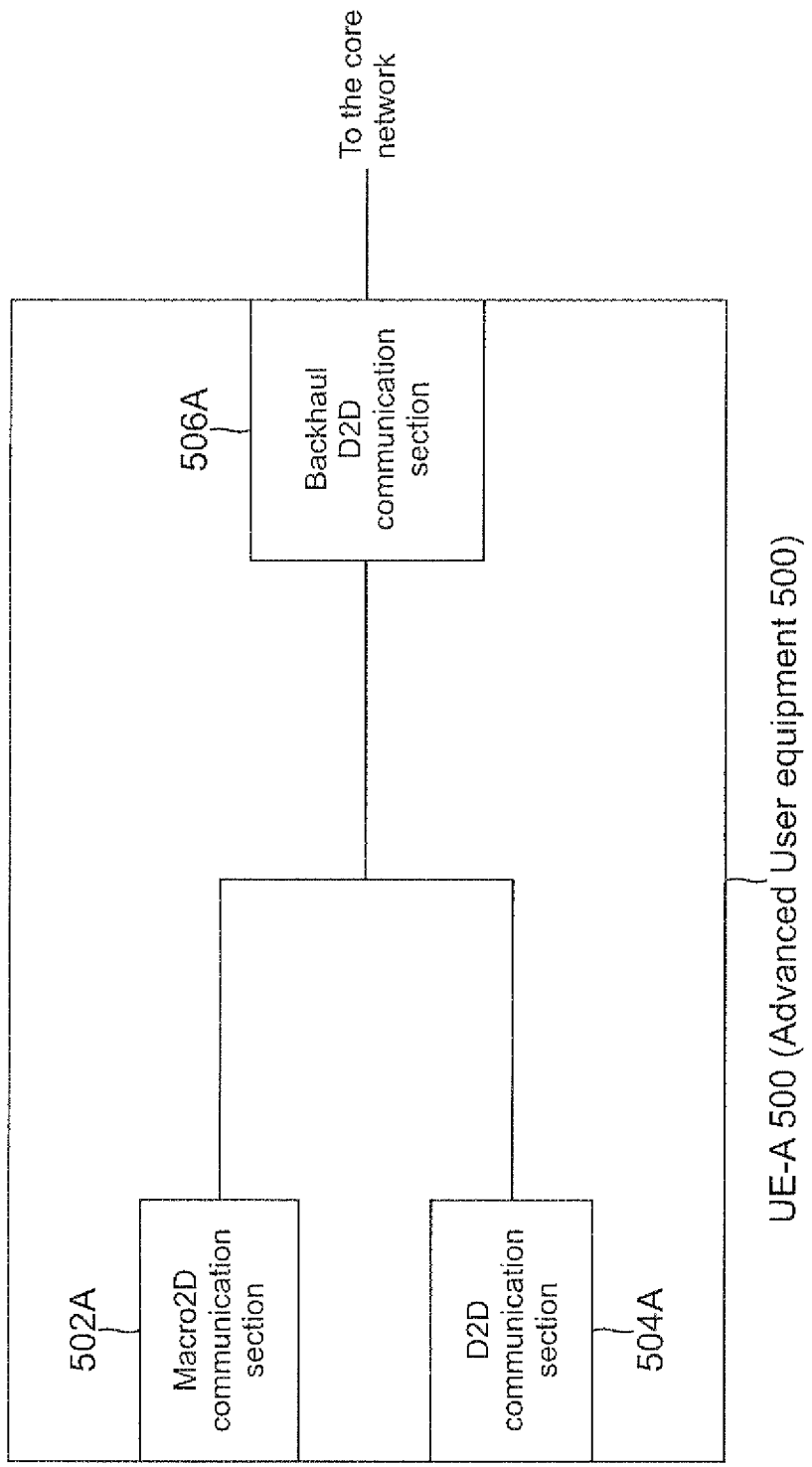
FIG. 50 is a block diagram for the advanced user equipment of FIG. 47 that is on the user equipment side of the one-hop D2D link in the backhaul.

Advanced user equipment 500 according to such a backhaul-including-a-D2D link embodiment will be described with reference to FIG. 50. Advanced user equipment 500 in FIG. 50 is analogous to advanced user equipment 500 discussed with regard to FIG. 9 except that a backhaul D2D communication section 506A drives D2D link 710A to advanced user equipment 501. D2D connection 710A may have the same functions as the D2D connection 710 in terms of the physical and link layer design point of view.

Figure 51:
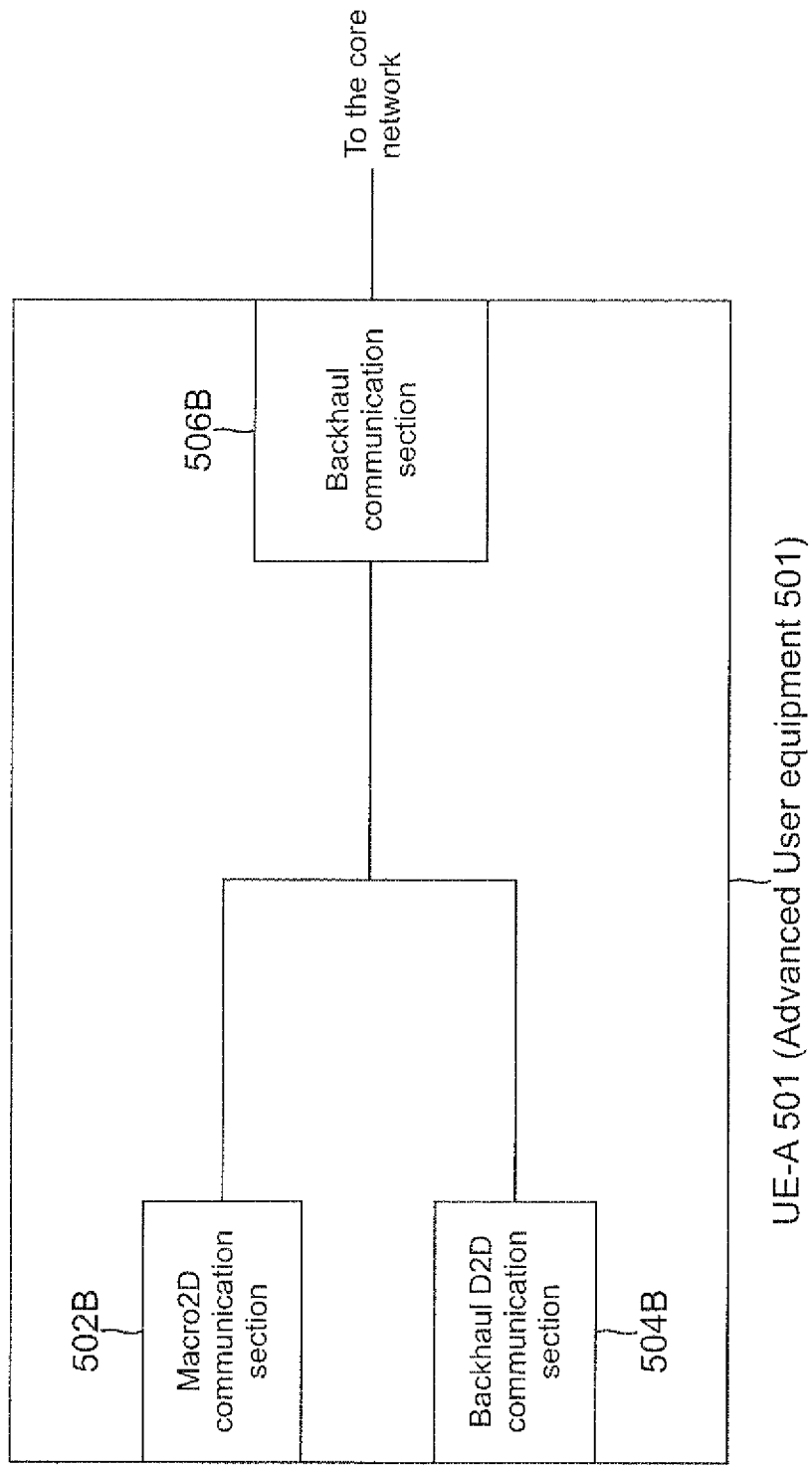
FIG. 51 is a block diagram for the advanced user equipment of FIG. 47 that is on the network side of the one-hop D2D link in the backhaul.

A block diagram for advanced user equipment 501 is shown in FIG. 51. Advanced user equipment 501 is also analogous to advanced user equipment 500 discussed with regard to FIG. 9 except that a backhaul D2D communications section 504B is configured to communicate with backhaul D2D communication section 506A of FIG. 50.

Referring again to FIG. 7, the offload link consists of one D2D connection (D2D connection 710) and a backhaul link. In contrast, the offload link of FIG. 49 consists of two D2D connections (D2D connection 710 and D2D connection 710A) and the wired backhaul link. In other embodiments, the link for offload may consist of more than two D2D connections and the wired backhaul link Control procedures for the D2D connection 710A may be the same as the ones discussed above for D2D connection 710. The control procedures may include at least one of connection establishment, connection management, connection reconfiguration, handover, connection release, radio resource selection management, power control, link adaptation, call admission control, radio bearer assignment, traffic measurement, radio measurement control, bearer management, security association and other suitable procedures.

ADDITIONAL FEATURES

The operation of the above-described base station 200, the user equipment 100 and the advanced user equipment 500 may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the base station apparatus 200, the user equipment, and the advanced user equipment 500. As a discrete component, such a storing medium and processor may be arranged in the base station 200, the user equipment 100, and the advanced user equipment 500.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

We claim:

1. A network device in a cellular telecommunications system, comprising:
   a first communication section configured to receive a first control-plane message from a base station over a first communication link;
   a second communication section configured to transmit user-plane data to a user equipment over a second communication link established responsive to the first control-plane message; and
   a third communication section configured to receive the user-plane traffic data from a server over a third communication link without passing through any base station,
   wherein the second communication link between the network device and the user equipment and a fourth communication link between the base station and the user equipment for transmitting user-plane data from the base station to the user equipment can use different carrier frequencies simultaneously.

2. The network device of claim 1, wherein the user equipment receives user plane data from the base station and the network device simultaneously.

3. A mobile station (user equipment) in a cellular telecommunication system, comprising:
   a first communication section configured to receive both control-plane data and first user-plane data from a base station over a wireless first communication link; and
   a second communication section configured to receive second user-plane data from a server through a network device using a second communication link without passing through any base station,
   wherein the first communication section is further configured to receive a first control-plane message from the base station over the first communication link,
   wherein the second communication section is further configured to establish the second communication link responsive to the first control-plane message, and
   wherein the first communication link between the user equipment and the base station and the second communication link between the user equipment and the network device can use different carrier frequencies simultaneously.

4. The mobile station of claim 3, wherein the user equipment receives the first user-plane data and the second user-plane data simultaneously.

5. A base station for controlling a user equipment (UE) and a network device in a cellular telecommunications network, comprising:
- a first communication section configured to exchange user-plane and control-plane data with the UE using a first communication link and to exchange control-plane data with the network device using a second communication link; and
- a control unit configured to control an establishment and also a release/reconfiguration/handover of a third communication link through a first control-plane message transmitted to at least one of the UE and the network device using the respective one of the first and second communication links,
- wherein the control unit is further configured to identify user-plane data to be exchanged between the UE and the network device using the third communication link,
- wherein the user equipment communicates user plane data with the base station and the network device simultaneously at a predetermined time,
- wherein the network device receives the user-plane data without passing through any base station, and
- wherein the first communication link between the base station and the UE and the third communication link between the UE and the network device can use different carrier frequencies simultaneously.

6. The base station of claim 5, wherein the UE receives the user-plane data from the base station and the network device simultaneously.

7. A method of communicating using a network device in a cellular telecommunication system, comprising:
- at the network device, receiving a first control-plane message from a base station over a first communication link;
- at the network device, establishing a second communication link responsive to the first control-plane message with a user equipment;
- at the network device, receiving downlink user-plane data from a server over a third communication link without passing through any base station; and
- from the network device, transmitting the downlink user-plane data over the second communication link to the user equipment, and
- wherein the second communication link between the network device and the user equipment and a fourth communication link between the base station and the user equipment for transmitting user-plane data from the base station to the user equipment can use different carrier frequencies simultaneously.

8. A method of communicating using a user equipment in a cellular telecommunication system, comprising:
- at the user equipment, receiving a first control-plane message and first user-plane data from a base station over a first communication link;
- at the user equipment, establishing a second communication link with a network device responsive to the first control-plane message; and
- at the user equipment, receiving second user-plane data from the network device over the second communication link without passing through any base station from a server, and
- wherein the first communication link between the user equipment and the base station and the second communication link between the user equipment and the network device can use different carrier frequencies simultaneously.

9. A method of communicating using a base station for controlling a user equipment (UE) and a network device in a cellular telecommunication system, comprising:
- at the base station, exchanging user-plane data and control-plane message with the UE using a first communication link and exchanging control-plane message with the network device using a second communication link;
- at the base station, controlling an establishment and also a release/reconfiguration/handover of a third communication link through a first control-plane message transmitted to at least one of the UE and the network device using the respective one of the first and second communication links; and
- at the base station, identifying user-plane data to be exchanged between the UE and the network device using the third communication link, and
- wherein the network device receives the user-plane data without passing through any base station from a server, and
- wherein the first communication link between the user equipment and the base station and the third communication link between the user equipment and the network device can use different carrier frequencies simultaneously.

\* \* \* \* \*